US008372190B2

(12) United States Patent
Tateishi et al.

(10) Patent No.: US 8,372,190 B2

(45) Date of Patent: Feb. 12, 2013

(54) INK SET, INKJET RECORDING METHOD AND RECORDED MATERIAL

(75) Inventors: Keiichi Tateishi, Shizuoka (JP); Hiroshi Yamamoto, Kanagawa (JP); Shigeaki Tanaka, Shizuoka (JP)

(73) Assignee: FUJIFILM Corporation, Tokyo (JP)

(*) Notice: Subject to any disclaimer, the term of this patent is extended or adjusted under 35 U.S.C. 154(b) by 350 days.

(21) Appl. No.: 12/740,515

(22) PCT Filed: Oct. 30, 2008

(86) PCT No.: PCT/JP2008/069795

§ 371 (c)(1), (2), (4) Date: Aug. 13, 2010

(87) PCT Pub. No.: WO2009/057712

PCT Pub. Date: May 7, 2009

(65) Prior Publication Data

US 2010/0302305 A1 Dec. 2, 2010

(30) Foreign Application Priority Data

Oct. 31, 2007 (JP) ................................ 2007-284049
Oct. 29, 2008 (JP) ................................ 2008-277984

(51) Int. Cl.
*C09D 11/02* (2006.01)

(52) U.S. Cl. .................. 106/31.5; 106/31.48; 106/31.52

(58) Field of Classification Search ................. 106/31.5, 106/31.52, 31.48; 347/100; 428/195.1; 427/256
See application file for complete search history.

(56) References Cited

U.S. PATENT DOCUMENTS 7,704,311 B2 * 4/2010 Tojo .......................... 106/31.52
7,731,788 B2 * 6/2010 Kitamura et al. .......... 106/31.48
7,736,427 B2 * 6/2010 Kitamura et al. .......... 106/31.48
7,740,695 B2 * 6/2010 Kitamura et al. ............ 106/31.5
8,070,869 B2 * 12/2011 Wachi et al. ................ 106/31.5
8,070,870 B2 * 12/2011 Wachi .......................... 106/31.5
8,080,099 B2 * 12/2011 Saito et al. ................... 106/31.5
8,101,011 B2 * 1/2012 Tateishi et al. ............... 106/31.5
8,262,789 B2 * 9/2012 Tateishi et al. ............. 106/31.48

FOREIGN PATENT DOCUMENTS

JP 2003-213167 A 7/2003
JP 2004-123777 A 4/2004
JP 2004-307819 A 11/2004
JP 2005-336377 A 12/2005
JP 2007-063520 A 3/2007
JP 2007-138124 A 6/2007
JP 2008-255330 A 10/2008

OTHER PUBLICATIONS

International Search Report (PCT/ISA/210) for PCT/JP2008/069795, dated Feb. 3, 2009.

International Preliminary Report on Patentability (PCT/ISA/237) for PCT/JP2008/069795, dated Feb. 3, 2009.

Office Action dated Jun. 14, 2012 on Chinese Application No. 200880114467.1.

* cited by examiner

*Primary Examiner* — Helene Klemanski

(74) *Attorney, Agent, or Firm* — Sughrue Mion, PLLC

(57) ABSTRACT

An ink set including at least a yellow ink composition, a magenta ink composition and a cyan ink composition, wherein the yellow ink composition contains, as the yellow colorant, at least one member selected from the group consisting of a compound represented by a specific structure and a salt thereof, each of the yellow colorant, the magenta colorant and the cyan colorant contained in the yellow ink composition, the magenta ink composition and the cyan ink composition, respectively, has at least one ionic hydrophilic group, the counter ion of the ionic hydrophilic group contains a lithium ion, and the lithium ion concentration is 70 mol % or more based on all cations in each ink composition.

26 Claims, No Drawings

INK SET, INKJET RECORDING METHOD AND RECORDED MATERIAL

TECHNICAL FIELD

The present invention relates to an ink set, particularly, an ink set capable of forming an image assured of high light fastness and high ozone fastness, excellent in the color density of both a single color and a mixed color, and reduced in the generation of a bronze phenomenon; an inkjet recording method; and a recorded material.

BACKGROUND ART

In recent years, the image recording material is predominated by a material for forming particularly a color image and, specifically, a recording material for an inkjet system, a recording material for a heat transfer system, a recording material for an electrophotographic system, a silver halide light-sensitive material of transfer type, a printing ink, a recording pen and the like are being actively utilized.

The inkjet recording method is abruptly spread and still making a progress because of low material cost and capability of high-speed recording, low-noise recording and easy color recording.

The inkjet recording method includes a continuous system of continuously flying a liquid droplet and an on-demand system of flying a liquid droplet according to image information signals, and the ejection system therefor includes a system of ejecting a liquid droplet by applying a pressure from a piezoelectric element, a system of ejecting a liquid droplet by generating a bubble in the ink under heat, a system using an ultrasonic wave, and a system of suctioning and ejecting a liquid droplet by an electrostatic force. As for the inkjet recording ink, an aqueous ink, an oil-based ink or a solid (fusion-type) ink is used.

The color image formation by an inkjet recording method using a plurality of color ink compositions is performed using three colors of a yellow ink composition, a magenta ink composition and a cyan ink composition or, if desired, using four colors additionally including a black ink composition. In some cases, a color image is formed using six colors including a light cyan ink composition and a light magenta ink composition in addition to the above-described four colors or using seven colors by further adding a dark yellow ink composition. Such a combination of two or more kinds of ink compositions is an ink set.

As regards the ink composition used for the formation of a color image, it is required that, for example, the ink composition of each color has good colorability (high optical density) by itself, a good intermediate color can be formed when ink compositions for a plurality of colors are combined, or the recorded material obtained is kept from discoloration or fading during storage.

The dyestuff used in such an inkjet recording ink is required to exhibit good solubility or dispersibility in a solvent, allow for high-density recording, provide a good color hue, be fast to light, heat and active gases in the environment (for example, an oxidative gas such as NOx and ozone, and SOx), be excellent in the resistance against water and chemicals, ensure good fixing and less blurring on an image-receiving material, give an ink with excellent storability, have high purity and no toxicity, and be available at a low cost.

However, it is very difficult to find out a dyestuff satisfying these requirements at a high level.

Improvement required of the ink set is, in addition to the colorability, fastness and storability of each ink composition constituting the ink set, to form particularly a mixed color portion (for example, a green part, a blue part, a red part and a gray part) that is also excellent in the color hue (the color reproduction region is wide), fastness and storability, assured of high tinctorial strength (the optical density is high) and at the same time, kept from a bronze phenomenon.

However, in the case where a recorded image having a high optical density is formed, there arises a problem that as the image is dried, the dyestuff crystal deposits on the recording material surface and the recorded image reflects light to cause a so-called bronze phenomenon of emitting metallic gloss. This phenomenon is considered to readily occur resulting from increase in the associating property (aggregability) of the dyestuff when the water solubility of the dyestuff is decreased so as to enhance the water resistance or an amino group as a hydrogen bonding group is introduced into the dyestuff structure. Since light is reflected due to generation of a bronze phenomenon, not only the optical density of the recorded image decreases but also the color hue of the recorded image comes to greatly differ from the desired color hue. Accordingly, it is technically difficult to find out an inkjet ink capable of exhibiting an excellent performance in all of bronze phenomenon suppression, color hue, optical density and the like in a single color part and a mixed color part.

As regards the method of suppressing a bronze phenomenon, Patent Document 1 discloses an yellow ink for inkjet recording, where the total amount, in the ink, of cations except for a monovalent metal ion, a hydrogen ion, an ammonium ion, an organic quaternary nitrogen ion and an ion produced resulting from proton addition of a nitrogen atom in a basic organic material is adjusted. Also, Patent Document 2 discloses an ink set for inkjet recording, where the counter cation of an anionic group of a dye contained in the ink set for inkjet recording is changed so as to make it difficult for the printed inks even when mixed to deposit and generate a bronze part. Furthermore, in Patent Document 3, it is disclosed that when the counter cation of an ionic hydrophilic group of a yellow dye contained in a yellow ink for inkjet recording is changed, an effect is obtained in terms of color hue and bronze phenomenon suppression. Particularly, in Patent Document 4, it is disclosed that when a combination of remarkably good yellow, magenta, cyan and black ink colorants is used in a most preferred embodiment as an ink set for inkjet recording, an effect is obtained in terms of bronze phenomenon suppression in each single color (yellow, magenta or cyan) part and a gray part.

In recent years, the ink set is suitably used for the printing of a photographic image and in the formation of a photographic image, it is strongly demanded to satisfy all of the above-described performances required of the water-soluble inkjet recording ink and develop a more excellent ink set. Above all, improving at the same time the bronze phenomenon also in a mixed portion (for example, a green part, a blue part, a red part and a gray part) at a high level is constantly required in view of high image quality.

Patent Document 1: JP-A-2004-123777 (the terms "JP-A" as used herein means an "unexamined published Japanese patent application"

Patent Document 2: JP-A-2004-307819

Patent Document 3: JP-A-2007-63520

Patent Document 4: JP-A-2007-138124

DISCLOSURE OF THE INVENTION

Problems that the Invention is to Solve

The present invention has been accomplished to solve the above-described problems and relates to an ink set capable of recording a good image on a recording medium in terms of improving the fastness, storability and bronze phenomenon of each ink composition constituting the ink set and at the same time, improving the bronze phenomenon of a mixed color portion (for example, a green part, a blue part, a red part and gray part) at a high level; an ink cartridge housing the ink set; an inkjet printer having loaded therein the ink cartridge; a recording method using the ink set; a recorded material recorded using the ink set; a method for improving fading of a colored image material formed using the ink cartridge; and a method for improving bronze gloss.

Means to Solve the Problems

The present inventors have made studies in detail on dyes having good color hue, good solubility and high fastness to light and gas (particularly, an ozone gas), as a result, it has been found that when dyes having a specific structure for respective colors are combined and the lithium ion concentration is set to 70 mol % or more based on all counter cations in each ink composition, the above-described problems can be solved. The present invention has been accomplished based on this finding.

The means to solve the above-described problems are as follows.

[1] An ink set, including:

at least a yellow ink composition; a magenta ink composition; and a cyan ink composition, wherein the yellow ink composition contains, as a yellow colorant, at least one member selected from the group consisting of a compound represented by the following formula (Y-I) and a salt thereof, each of a yellow colorant, a magenta colorant and a cyan colorant contained in the yellow ink composition, the magenta ink composition and the cyan ink composition, respectively, has at least one ionic hydrophilic group, a counter ion of the ionic hydrophilic group contains a lithium ion, and a lithium ion concentration is 70 mol % or more based on total cations in each ink composition:

Formula (Y-I):

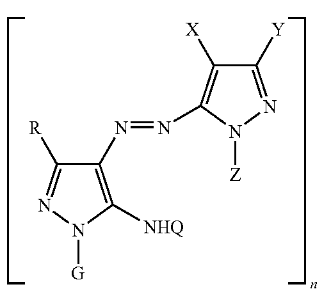

wherein G represents a heterocyclic group;

n represents an integer of 1 to 3;

when n is 1, R, X, Y, Z, Q and G each represents a monovalent group;

when n is 2, R, X, Y, Z, Q and G each represents a monovalent or divalent substituent, and at least one member represents a divalent substituent; and when n is 3, R, X, Y, Z, Q and G each represents a monovalent, divalent or trivalent substituent, and at least two members represent a divalent substituent or at least one member represents a trivalent substituent, provided that formula (Y-I) has at least one ionic hydrophilic group and a counter ion of the ionic hydrophilic group contains a lithium ion.

[2] An ink set, including:

at least a yellow ink composition; a magenta ink composition; and a cyan ink composition, wherein the yellow ink composition contains, as a yellow colorant, at least one member selected from the group consisting of a compound represented by the following formula (Y-I) and a salt thereof, each of a yellow colorant, a magenta colorant and a cyan colorant contained in the yellow ink composition, the magenta ink composition and the cyan ink composition, respectively, has at least one ionic hydrophilic group, a counter ion of the ionic hydrophilic group contains a lithium ion, a mol number per ink unit weight of the lithium ion contained in the yellow ink composition is from $2.0\times10^{-5}$ to $1.0\times10^{-3}$ mol/g, a mol number per ink unit weight of the lithium ion contained in the magenta ink composition is from $2.0\times10^{-6}$ to $1.0\times10^{-3}$ mol/g, and a mol number per ink unit weight of the lithium ion contained in the cyan ink composition is from $5.0\times10^{-6}$ to $1.0\times10^{-3}$ mol/g:

Formula (Y-1):

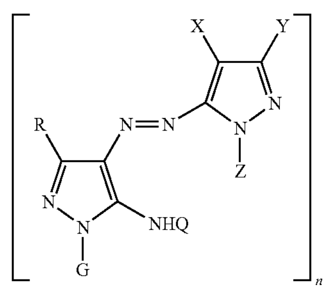

wherein G represents a heterocyclic group;

n represents an integer of 1 to 3;

when n is 1, R, X, Y, Z, Q and G each represents a monovalent group;

when n is 2, R, X, Y, Z, Q and G each represents a monovalent or divalent substituent, and at least one member represents a divalent substituent; and when n is 3, R, X, Y, Z, Q and G each represents a monovalent, divalent or trivalent substituent, and at least two members represent a divalent substituent or at least one member represents a trivalent substituent, provided that formula (Y-I) has at least one ionic hydrophilic group and a counter ion of the ionic hydrophilic group contains a lithium ion.

[3] The ink set as described in [1] or [2], wherein the compound represented by formula (Y-I) or a salt thereof is any one of compounds represented by the following formulae (Y-1), (Y-2), (Y-3), (Y-4) and (Y-5) and salts thereof:

Formula (Y-1):

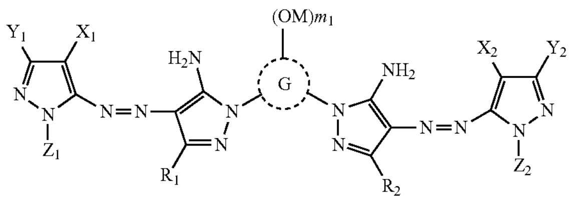

wherein $R_1$, $R_2$, $X_1$, $X_2$, $Y_1$, $Y_2$, $Z_1$ and $Z_2$ each represents a monovalent group, G represents an atomic group necessary to complete a 5- to 8-membered nitrogen-containing heterocycle, M represents a hydrogen or a cation, and $m_1$ represents an integer of 0 to 3, provided that formula (Y-1) has at least one ionic hydrophilic group and a counter ion of the ionic hydrophilic group contains a lithium ion;

Formula (Y-2):

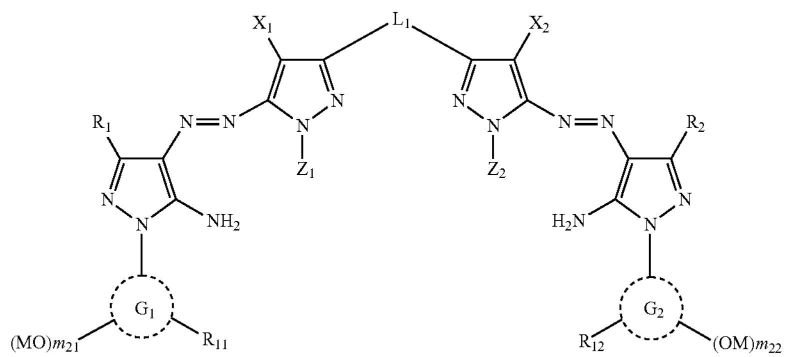

wherein $R_1$, $R_2$, $R_{11}$, $R_{12}$, $X_1$, $X_2$, $Z_1$ and $Z_2$ each represents a monovalent group, $L_1$ represents a divalent linking group, $G_1$ and $G_2$ each independently represents an atomic group necessary to complete a 5- to 8-membered nitrogen-containing heterocycle, M represents a hydrogen or a cation, and $m_{21}$ and $m_{22}$ each independently represents an integer of 0 to 3, provided that formula (Y-2) has at least one ionic hydrophilic group and a counter ion of the ionic hydrophilic group contains a lithium ion;

Formula (Y-3):

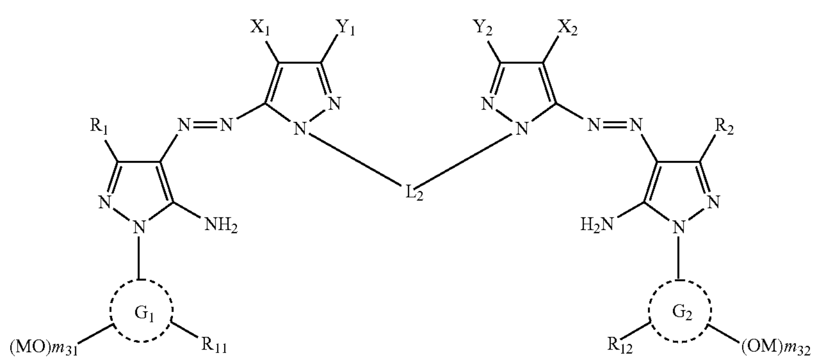

wherein $R_1$, $R_2$, $R_{11}$, $R_{12}$, $X_1$, $X_2$, $Y_1$ and $Y_2$ each represents a monovalent group, $L_2$ represents a divalent linking group, $G_1$ and $G_2$ each independently represents an atomic group necessary to complete a 5- to 8-membered nitrogen-containing heterocycle, M represents a hydrogen or a cation, and $m_{31}$ and $m_{32}$ each independently represents an integer of 0 to 3, provided that formula (Y-3) has at least one ionic hydrophilic group and a counter ion of the ionic hydrophilic group contains a lithium ion;

provided that formula (Y-5) has at least one ionic hydrophilic group and a counter ion of the ionic hydrophilic group contains a lithium ion.

[4] The ink set as described in [3], wherein, in formulae (Y-1), (Y-2), (Y-3), (Y-4) and (Y-5), the nitrogen-containing heterocycle constituted by G, $G_1$ or $G_2$ is an S-triazine ring.

[5] The ink set as described in [3] or [4], wherein the compound represented by formula (Y-1) and a salt thereof are a compound represented by the following formula (Y-6) and a salt thereof:

Formula (Y-4):

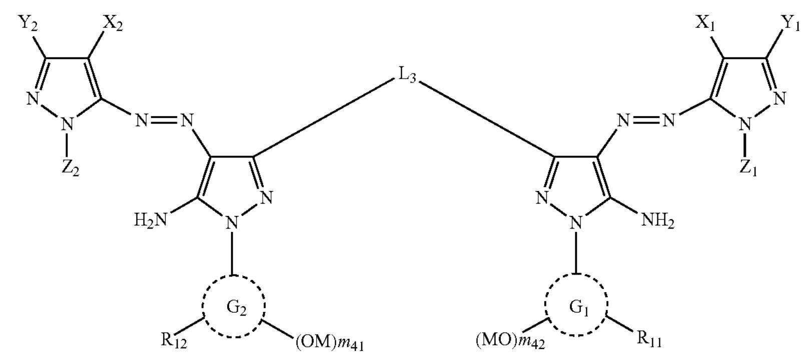

wherein $R_{11}$, $R_{12}$, $X_1$, $X_2$, $Y_1$, $Y_2$, $Z_1$ and $Z_2$ each represents a monovalent group, $L_3$ represents a divalent linking group, $G_1$ and $G_2$ each independently represents an atomic group necessary to complete a 5- to 8-membered nitrogen-containing heterocycle, M represents a hydrogen or a cation, and $m_{41}$ and $m_{42}$ each independently represents an integer of 0 to 3, provided that formula (Y-4) has at least one ionic hydrophilic group and a counter ion of the ionic hydrophilic group contains a lithium ion;

Formula (Y-5):

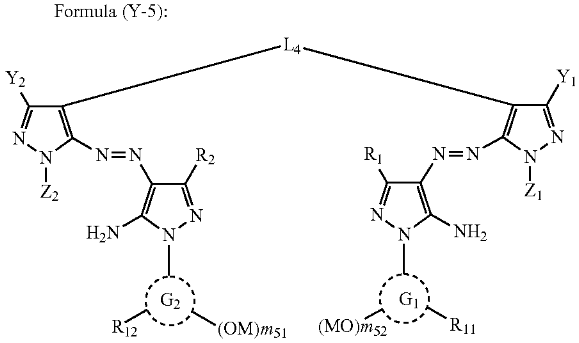

wherein $R_1$, $R_2$, $R_{11}$, $R_{12}$, $Y_1$, $Y_2$, $Z_1$ and $Z_2$ each represents a monovalent group, $L_4$ represents a divalent linking group, $G_1$ and $G_2$ each independently represents an atomic group necessary to complete a 5- to 8-membered nitrogen-containing heterocycle, M represents a hydrogen or a cation, and $m_{51}$ and $m_{52}$ each independently represents an integer of 0 to 3, Formula (Y-6):

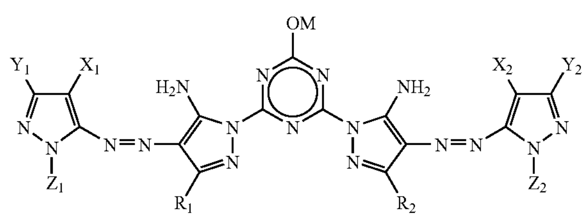

wherein $R_1$, $R_2$, $Y_1$ and $Y_2$ each represents a monovalent group;

$X_1$ and $X_2$ each independently represents an electron-withdrawing group having a Hammett's σp value of 0.20 or more;

$Z_1$ and $Z_2$ each independently represents a hydrogen, a substituted or unsubstituted alkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group; and M represents a hydrogen or a cation, provided that formula (Y-6) has at least one ionic hydrophilic group and a counter ion of the ionic hydrophilic group contains a lithium ion.

[6] The ink set as described in any one of [1] to [5], wherein the yellow ink composition further contains, as a colorant, at least one member selected from the group consisting of a compound represented by the following formula (Y-7) and a salt thereof:

Formula (Y-7):

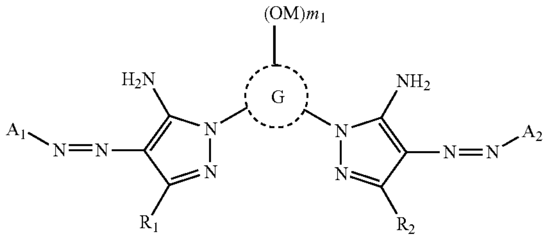

wherein $A_1$ and $A_2$ each represents a substituted or unsubstituted aryl group and/or a substituted or unsubstituted 5- or 6-membered heterocyclic group;

$R_1$ and $R_2$ each represents a monovalent group;

G represents an atomic group necessary to complete a 5- to 8-membered nitrogen-containing heterocycle;

M represents a hydrogen or a cation; and $m_1$ represents an integer of 0 to 3, provided that formula (Y-7) has at least one ionic hydrophilic group and a counter ion of the ionic hydrophilic group contains a lithium ion and that when $A_1$ and $A_2$ each represents a 5-membered heterocyclic group, a pyrazole ring is excluded.

[7] The ink set as described in [6], wherein the compound represented by formula (Y-7) and a salt thereof are a compound represented by the following formula (Y-8) and a salt thereof:

Formula (Y-8):

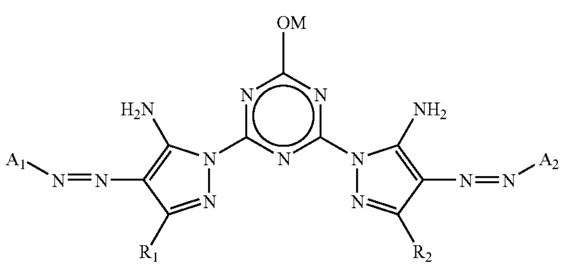

wherein $A_1$, $A_2$, $R_1$, $R_2$ and M have the same meanings as $A_1$, $A_2$, $R_1$, $R_2$ and M in formula (Y-7), provided that formula (Y-8) has at least one ionic hydrophilic group and a counter ion of the ionic hydrophilic group contains a lithium ion and that when $A_1$ and $A_2$ each represents a 5-membered heterocyclic group, a pyrazole ring is excluded.

[8] The ink set as described in [7], wherein the compound represented by formula (Y-8) and a salt thereof are a compound represented by the following formula (Y-9) and a salt thereof:

Formula (Y-9):

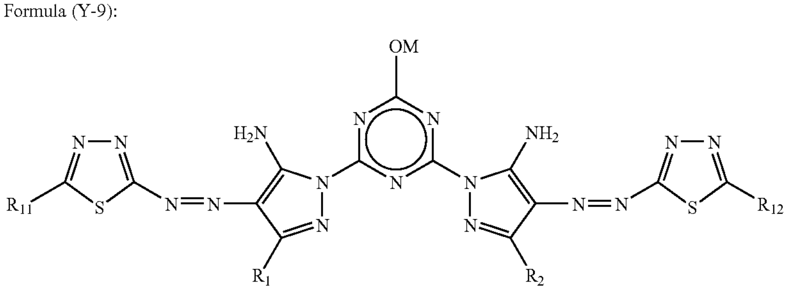

wherein $R_1$, $R_2$, $R_{11}$ and $R_{12}$ each represents a monovalent group; and M represents a hydrogen or a cation, provided that formula (Y-9) has at least one ionic hydrophilic group and a counter ion of the ionic hydrophilic group contains a lithium ion.

[9] The ink set as described in any one of [1] to [8], wherein the yellow ink composition contains, as a colorant, at least one member selected from the group consisting of compounds represented by formula (Y-I) and (Y-1) to (Y-6) and salts thereof; or contains, as a colorant, at least one member selected from the group consisting of compounds represented by formulae (Y-I) and (Y-1) to (Y-6) and salts thereof and at least one member selected from the group consisting of compounds represented by formulae (Y-7) to (Y-9) and salts thereof; and contains the colorants in a total amount of 1 to 8 wt % based on a total weight of the yellow ink composition.

[10] The ink set as described in [9], wherein a ratio between a concentration (wt %) of at least one colorant selected from the group consisting of compounds represented by formulae (Y-I) and (Y-1) to (Y-6) and salts thereof and a concentration (wt %) of at least one colorant selected from the group consisting of compounds represented by formulae (Y-7) to (Y-9) and salts thereof, contained in the yellow ink composition, is from 4:1 to 10:1.

[11] An ink cartridge housing integrally or independently the ink set as described in any one of [1] to [10].

[12] An inkjet recording method, including:

ejecting an ink constituting the ink set as described in any one of [1] to [9], thereby performing recording.

[13] The inkjet recording method as described in [12], wherein an image is formed on an image-receiving material including a support having thereon an ink-receiving layer containing a white inorganic pigment.

[14] A recorded material that is recorded with an ink constituting the ink set as described in any one of [1] to [10].

Advantage of the Invention

According to the ink set of the present invention, a good image where in addition to the colorability, fastness and storability of a single color part of an image on a recorded material obtained by printing, a bronze phenomenon is at the same time improved at a high level also in a mixed color portion, particularly, in a region where a yellow dye and a cyan dye are printed, can be formed.

BEST MODE FOR CARRYING OUT THE INVENTION

The present inventors have made studies to enhance the light fastness, ozone fastness, tinctorial strength (optical density) and bronze phenomenon suppression of an image formed using an ink set that is composed by combining various ink compositions for a plurality of colors.

The ink as used in the present invention means a composition containing a colorant such as dye or pigment and a dispersant (e.g., solvent) therefor and can be suitably used particularly for image formation.

The present invention is described in detail below.

The ink set of the present invention is an ink set including at least a yellow ink composition, a magenta ink composition and a cyan ink composition, wherein the yellow ink composition contains, as the yellow colorant, at least one member selected from the group consisting of a compound represented by a specific structure and a salt thereof, each of the yellow colorant, the magenta colorant and the cyan colorant contained in the yellow ink composition, the magenta ink composition and the cyan ink composition, respectively, has at least one ionic hydrophilic group, the counter ion of the ionic hydrophilic group contains a lithium ion, and the lithium ion concentration is 70 mol % or more based on all cations in each ink composition.

The ink set in another embodiment of the present invention comprises at least a yellow ink composition, a magenta ink composition and a cyan ink composition, wherein the yellow ink composition contains, as the yellow colorant, at least one member selected from the group consisting of a compound represented by the following formula (Y-I) and a salt thereof, each of the yellow colorant, the magenta colorant and the cyan colorant contained in the yellow ink composition, the magenta ink composition and the cyan ink composition, respectively, has at least one ionic hydrophilic group, the counter ion of the ionic hydrophilic group contains a lithium ion, the mol number per ink unit weight of the lithium ion contained in the yellow ink composition is from $2.0\times10^{-5}$ to $1.0\times10^{-3}$ mol/g, the mol number per ink unit weight of the lithium ion contained in the magenta ink composition is from $2.0\times10^{-6}$ to $1.0\times10^{-3}$ mol/g, and the mol number per ink unit weight of the lithium ion contained in the cyan ink composition is from $5.0\times10^{-6}$ to $1.0\times10^{-3}$ mol/g In the ink set of the present invention, the counter cation of the ionic hydrophilic group in the colorant for each color contains a lithium ion.

The counter cations need not be entirely a lithium ion, but the lithium ion concentration in each ink composition must be 70 mol % or more, preferably 80 mol % or more, more preferably 90 mol %, still more preferably 95 mol %, with the upper limit being preferably 100 mol %, based on the entire counter ion in each ink composition.

With such an abundance ratio condition, a hydrogen ion, an alkali metal ion (e.g., sodium ion, potassium ion), an alkaline earth metal ion (e.g., magnesium ion, calcium ion), a quaternary ammonium ion, a quaternary phosphonium ion, a sulfonium ion or the like can be contained as the counter cation.

As for the type and proportion of the counter cation in the colorant, details on analysis methods and elements are described in *Shin Jikken Kagaku Koza* 9, *Bunseki Kagaku* (*Lecture* 9 *of New Experiment Chemistry, Analysis Chemistry*), compiled by Nippon Kagaku Kai, Maruzen (1977), and *Dai* 4 *Han, Jikken Kagaku Koza* 15, *Bunseki* (*4th Edition, Lecture* 15 *of Experiment Chemistry, Analysis*), compiled by Nippon Kagaku Kai, Maruzen (1991). By referring to these publications, the analysis method can be selected and the analysis and quantitative determination can be performed. Above all, the determination can be easily made by the analysis method such as ion chromatography, atomic absorption method or induction coupled plasma emission analysis method (ICP).

The method for obtaining the colorant with the counter cation containing a lithium ion for use in the present invention may be any method. Examples thereof include (1) a method of converting the counter cation into a lithium ion from a different cation by using an ion exchange resin, (2) a method by acid or salt precipitation from a system containing a lithium ion, (3) a method of forming a colorant by using a raw material or synthesis intermediate where the counter cation is a lithium ion, (4) a method of introducing an ionic hydrophilic group through conversion of the functional group of a colorant for each color by using a reactant where the counter cation is lithium ion, and (5) a method of synthesizing a compound where the counter cation of an ionic hydrophilic group in a colorant is silver ion, reacting the compound with a lithium halide solution, and removing the precipitated silver halide, thereby forming a lithium ion as the counter cation.

The ionic hydrophilic group in the colorant for each color may be any group as long as it is an ionic dissociative group. Preferred examples of the ionic hydrophilic group include a sulfo group (which may be a salt thereof), a carboxyl group (which may be a salt thereof), a hydroxyl group (which may be a salt thereof), a phosphono group (which may be a salt thereof), a quaternary ammonium group, an acylsulfamoyl group (which may be a salt thereof), a sulfonylcarbamoyl group (which may be a salt thereof) and a sulfonylsulfamoyl group (which may be a salt thereof).

The ionic hydrophilic group is preferably a sulfo group, a carboxyl group or a hydroxyl group (including salts thereof). In the case where the ionic hydrophilic group is a salt, preferred counter cations include lithium and an alkali metal (e.g., sodium, potassium), ammonium or organic cation (e.g., pyridinium, tetramethylammonium, guanidium) mixed salt mainly composed of lithium. Among these, lithium and an alkali metal mixed salt mainly composed of lithium are preferred, and a lithium salt of sulfo group, a lithium salt of carboxy group, and a lithium salt of hydroxyl group are more preferred.

Furthermore, the present inventors have found that when the above-described dye having a specific structure is used as the colorant in magenta and cyan compositions, each color of yellow (Y), magenta (M) and cyan (C) can be excellent in the light fastness and ozone fastness and an ink set capable of reducing the difference in the rate of deterioration due to light or ozone among respective colors and hardly allowing the observer to perceive the deterioration of entire image even when image deterioration due to ozone proceeds to a certain extent, can be obtained.

At the same time, it has been found that an ink set capable of forming a good image in which suppression of the bronze phenomenon in both a single color portion and a mixed color portion is improved at a high level, can be obtained.

Also, the present inventors have found that in the case of including a black ink composition in the ink set above, when the above-described dye having a specific structure is used as the black dye for use in the black ink composition, thanks to good light fastness/ozone fastness of each ink composition constituting the ink set and no great difference in the light/ozone deterioration rate among respective ink compositions, an ink set hardly allowing the observer to perceive the deterioration of the entire image even when image deterioration due to ozone proceeds to a certain extent, can be obtained.

At the same time, it has been found that an ink set capable of forming a good image in which all of the fastness and suppression of the bronze phenomenon in a single color portion and the suppression of bronze phenomenon in a mixed color portion are improved at a high level, can be obtained.

In addition, the present inventors have found that with respect to the cyan and/or magenta ink compositions, in an ink set containing two kinds of ink compositions differing in the color density (hereinafter, the magenta and cyan ink compositions having a high color density are referred to as a "dark magenta ink composition" and a "dark cyan ink composition", and the magenta and cyan ink compositions having a low color density are referred to as a "light magenta ink composition" and a "light cyan ink composition"), when the above-described dye having a specific structure is used as the colorant in the light magenta composition and/or the light cyan ink composition, an ink set particularly having desired light fastness/ozone fastness can be obtained.

At the same time, it has been found that an ink set capable of forming a good image in which all of the fastness and suppression of the bronze phenomenon in a single color portion and the suppression of bronze phenomenon in a mixed color portion are improved at a high level, can be obtained.

Moreover, the present inventors have found that the ink set of the present invention is preferred as the ink set for use in an inkjet recording method.

The present invention has been accomplished based on these findings.

The ink set according to a first embodiment of the present invention contains a yellow ink composition, a magenta ink composition and a cyan ink composition.

The yellow composition for use in the present invention contains, as the colorant, at least one member selected from the group consisting of dyes of formula (Y-I) and (Y-1) to (Y-6) and depending on the case, further contains, as the colorant of the yellow composition, at least one member selected from the group consisting of dyes represented by formulae (Y-7) to (Y-9).

The ink set according to a second embodiment of the present invention is the ink set of the first embodiment, wherein, if desired, the ink set contains, as the magenta ink composition, at least two kinds of magenta ink compositions differing in the color density, that is, at least a dark magenta ink composition and a light magenta ink composition, and at least one kind of a magenta ink composition contains at least one member out of dyes represented by formulae (M-1) to (M-3) described later. In particular, it is preferred that the light magenta ink composition contains, as the colorant, at least one member out of dyes represented by formulae (M-1) to (M-3) described later.

The ink set according to a third embodiment of the present invention is the ink set of the first or second embodiment, wherein, if desired, the ink set contains, as the cyan ink composition, at least two kinds of cyan ink compositions differing in the color density, that is, at least a dark cyan ink composition and a light cyan ink composition, and at least one kind of a cyan ink composition contains at least one member out of dyes represented by formulae (C-1) to (C-3) and/or formula (C-4). In particular, it is preferred that the light cyan ink composition contains, as the colorant, at least one member out of dyes represented by formulae (C-1) to (C-3) and/or formula (C-4).

The ink set according to a fourth embodiment of the present invention is the ink set of the first, second or third embodiment, which further contains a black ink composition.

The yellow colorant for use in the present invention has a specific structure, each of the yellow colorant, the magenta colorant and the cyan colorant has at least one ionic hydrophilic group, the counter ion of the ionic hydrophilic group contains a lithium ion, and the lithium ion concentration is 70 mol % or more based on all cations in each ink composition. The lithium ion concentration is preferably 80 mol % or more, more preferably 90 mol %, still more preferably 95 mol %, and the upper limit is preferably 100 mol %.

The present inventors have synthesized various colorants and evaluated their performance so as to grasp the relationship between the structure of the colorant and various performances such as color hue, light/ozone gas fastness and bronze phenomenon generation. As a result, it has been found that when a colorant having a specific structure and having at least one ionic hydrophilic group, with the counter cation of the ionic hydrophilic group being a lithium ion, is used, generation of a bronze phenomenon in an image can be remarkably suppressed without impairing performances such as color hue and fastness.

The ink sets of the present invention all are used for a recording method using an ink composition, and examples of the recording method using an ink composition include an inkjet recording method, a recording method with a writing tool such as pen, and other various letter-printing and printing methods. The ink set of the present invention is preferred particularly as an ink set for use in the inkjet recording method.

Respective ink compositions contained in the ink set of the present invention are described. First, the colorant contained in each ink composition is described below for each color ink composition. In the ink set of the present invention, a dye having a specific chemical structure is used as the colorant in each color ink composition, whereby the ink set as a whole can ensure excellent light fastness/ozone fastness.

Use of the dye above is also preferred in that a good image free from a bronze gloss phenomenon in a single color portion and a mixed color portion can be formed.

The colorant for use in the yellow ink composition constituting the ink set of the present invention is described below.

[Azo Dye]

Here, the Hammett's substituent constant σp value used in the present invention is briefly described. The Hammett's rule is an empirical rule advocated by L. P. Hammett in 1935 so as to quantitatively discuss the effect of a substituent on the reaction or equilibrium of a benzene derivative and its propriety is widely admitted at present. The substituent constant determined by the Hammett's rule includes a σp value and a σm value, and these values can be found in a large number of general publications and are described in detail, for example, in J. A. Dean (compiler), *Lange's Handbook of Chemistry,* 12th ed., McGraw-Hill (1979), and *Kagakuno Ryoiki* (Chemistry Region), special number, No. 122, pp. 96-103, Nankodo (1979). In the present invention, each substituent is limited or described by using the Hammett's substituent constant σp, but this does not mean that the substituent is limited only to those having a known value which can be found in the above-described publications. Needless to say, the substituent includes a substituent of which value is not known in publications but when measured based on the Hammett's rule, falls in the specified range. Although the compounds represented by formulae (I) and (Y-1) to (Y-6) of the present invention are not a benzene derivative, the σp value is used as a measure for showing the electron effect of the substituent irrespective of the substitution position. In the present invention, hereinafter, the σp value is used in such a meaning.

The azo dye used as the yellow colorant in the present invention is represented by the following formula (Y-I). The azo dye is preferably an azo dye represented by formulae (Y-1) to (Y-6).

In the case where an image is recorded using a yellow ink composition containing a dye having the following structure, the image of the recorded material is excellent in the light fastness and ozone fastness and the difference in the deterioration rate of yellow due to light/ozone is small, so that even when image deterioration due to light and ozone proceeds to a certain extent, an ink set scarcely allowing the observer to perceive the deterioration of the entire image can be obtained.

Also, an ink set capable of forming a good image in which suppression of the bronze phenomenon is also improved at a high level can be obtained.

Formula (Y-I) is described in detail below.

Formula (Y-I):

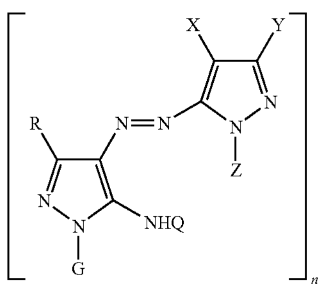

In the formula, G represents a heterocyclic group, and n represents an integer of 1 to 3.

When n is 1, R, X, Y, Z, Q and G each represents a monovalent group, and the azo dye is a monoazo dye shown in the bracket.

When n is 2, R, X, Y, Z, Q and G each represents a monovalent or divalent substituent. However, at least one member represents a divalent substituent, and the azo dye is a bis-type azo dye of the dyestuff shown in the bracket.

When n is 3, R, X, Y, Z, Q and G each represents a monovalent, divalent or trivalent substituent. However, at least two members represent a divalent substituent or at least one member represents a trivalent substituent, and the azo dye is a tris-type azo dye of the dyestuff shown in the bracket.

Formula (Y-I) has at least one ionic hydrophilic group, and the counter ion of the ionic hydrophilic group contains a lithium ion.

Formula (Y-I) is described in more detail below.

In formula (Y-I), as for preferred examples of the substituent of G, the substituent is preferably a 5- to 8-membered heterocyclic group, more preferably a 5- or 6-membered substituted or unsubstituted, aromatic or non-aromatic heterocyclic group, which may be further ring-condensed, and still more preferably a 5- or 6-membered aromatic heterocyclic group having a carbon number of 3 to 30.

Examples of the heterocyclic group represented by G include, without limiting the substitution position, pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and sulfolane.

In the case where the heterocyclic group is a group which may further have a substituent, the group may further have a substituent described below.

The substituent includes a linear or branched alkyl group having a carbon number of 1 to 12, a linear or branched aralkyl group having a carbon number of 7 to 18, a linear or branched alkenyl group having a carbon number of 2 to 12, a linear or branched alkynyl group having a carbon number of 2 to 12, a linear or branched cycloalkyl group having a carbon number of 3 to 12, a linear or branched cycloalkenyl group having a carbon number of 3 to 12 (these groups each is preferably a group having a branched chain, more preferably a group having an asymmetric carbon, because the solubility of dye and the stability of ink are enhanced; e.g., methyl, ethyl, propyl, isopropyl, isobutyl, sec-butyl, tert-butyl, 2-ethylhexyl, 2-methylsulfonylethyl, 3-phenoxypropyl, trifluoromethyl, cyclopentyl), a halogen atom (e.g., chlorine, bromine), an aryl group (e.g., phenyl, 4-tert-butylphenyl, 2,4-di-tert-amylphenyl), a hetero 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methylsulfonylethoxy), an aryloxy group (e.g., phenoxy, 2-methylphenoxy, 4-tert-butylphenoxy, 3-nitrophenoxy, 3-tert-butyloxycarbonylphenoxy, 3-methoxycarbonylphenyloxy, an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), alkylsulfonylamino and arylsulfonylamino groups (e.g., methanesulfonylamino, phenylsulfonylamino, p-toluenesulfonylamino), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methylsulfonyl, octylsulfonyl, phenylsulfonyl, p-toluenesulfonyl), an alkyloxycarbonyl group (e.g., methoxycarbonyl, butyloxycarbonyl), a heterocyclic oxy group (e.g., 1-phenyltetrazol-5-oxy, 2-tatrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

Preferred examples of the substituents represented by Q, R, X, Y and Z in formula (Y-I) are described in detail below.

In the case where Q, R, X, Y and Z each represents a monovalent group, and the monovalent substituent indicates a hydrogen or a monovalent substituent. The monovalent substituent is described in more detail. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (alkylamino group, arylamino group), an acylamino group (amido group), an aminocarbonylamino group (ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group, an imido group and an ionic hydrophilic group. These groups each may further have a substituent.

Among these, preferred are a hydrogen, a halogen atom, an alkyl group, an aryl group, a heterocyclic group, a cyano group, an alkoxy group, an amido group, a ureido group, an alkylsulfonylamino group, an arylsulfonylamino group, an alkylthio group, a sulfamoyl group, an alkylsulfonyl group, an arylsulfonyl group, a carbamoyl group and an alkoxycarbonyl group, more preferred are a hydrogen, a halogen atom, an alkyl group, an aryl group, a cyano group, an alkylsulfonyl group, an arylsulfonyl group, an alkylthio group and a heterocyclic group, and most preferred are a hydrogen, an alkyl group, an aryl group, a cyano group, an alkylsulfonyl group, an alkylthio group and an ionic hydroxyl group.

Q, R, X, Y and Z are described in more detail below.

The halogen atom represented by Q, R, X, Y and Z is a chlorine atom, a bromine atom or an iodine atom, preferably a chlorine atom or a bromine atom, more preferably a chlorine atom.

The alkyl group represented by Q, R, X, Y and Z includes a substituted or unsubstituted alkyl group. The substituted or unsubstituted alkyl group is preferably an alkyl group having a carbon number of 1 to 30. Examples of the substituent are the same as those of the substituent described above when G is a group which may further have a substituent. Above all, a hydroxyl group, an alkoxy group, a cyano group, a halogen atom, a sulfo group (which may be in a salt form) and a carboxyl group (which may be in a salt form) are preferred. Examples of the alkyl group include methyl, ethyl, isopropyl, isobutyl, sec-butyl, tert-butyl, n-octyl, eicosyl, 2-chloroethyl, hydroxyethyl, cyanoethyl and 4-sulfobutyl.

The cycloalkyl group represented by Q, R, X, Y and Z includes a substituted or unsubstituted cycloalkyl group. The substituted or unsubstituted cycloalkyl group is preferably a cycloalkyl group having a carbon number of 5 to 30. Examples of the substituent are the same as those of the substituent described above when G is a group which may further have a substituent. Examples of the cycloalkyl group include cyclohexyl, cyclopentyl and 4-n-dodecylcyclohexyl.

The aralkyl group represented by Q, R, X, Y and Z include a substituted or unsubstituted aralkyl group. The substituted or unsubstituted aralkyl group is preferably an aralkyl group having a carbon number of 7 to 30. Examples of the substituent are the same as those of the substituent described above when G is a group which may further have a substituent. Examples of the aralkyl group include benzyl and 2-phenethyl.

The alkenyl group represented by Q, R, X, Y and Z indicates a linear, branched or cyclic, substituted or unsubstituted alkenyl group. The alkenyl group is preferably a substituted or unsubstituted alkenyl group having a carbon number of 2 to 30, and examples thereof include vinyl, allyl, prenyl, geranyl, oleyl, 2-cyclopenten-1-yl and 2-cyclohexen-1-yl.

The alkynyl group represented by Q, R, X, Y and Z is a substituted or unsubstituted alkynyl group having a carbon number of 2 to 30, and examples thereof include ethynyl and propargyl.

The aryl group represented by Q, R, X, Y and Z is a substituted or unsubstituted aryl group having a carbon number of 6 to 30, and examples thereof include phenyl, p-tolyl, naphthyl, m-chlorophenyl and o-hexadecanoylaminophenyl. Examples of the substituent are the same as those of the substituent described above when G is a group which may further have a substituent.

The heterocyclic group represented by Q, R, X, Y and Z is a monovalent group formed by removing one hydrogen atom from a substituted or unsubstituted, aromatic or non-aromatic 5- or 6-membered heterocyclic compound, which may be further ring-condensed. The heterocyclic group is preferably a 5- or 6-membered aromatic heterocyclic group having a carbon number of 3 to 30 Examples of the substituent are the same as those of the substituent described above when G is a group which may further have a substituent. Examples of the heterocyclic group include, without limiting the substitution position, pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

The alkoxy group represented by Q, R, X, Y and Z includes a substituted or unsubstituted alkoxy group. The substituted or unsubstituted alkoxy group is preferably an alkoxy group having a carbon number of 1 to 30. Examples of the substituent are the same as those of the substituent described above when G is a group which may further have a substituent. Examples of the alkoxy group include methoxy, ethoxy, isopropoxy, n-octyloxy, methoxyethoxy, hydroxyethoxy and 3-carboxypropoxy.

The aryloxy group represented by Q, R, X, Y and Z is preferably a substituted or unsubstituted aryloxy group having a carbon number of 6 to 30. Examples of the substituent are the same as those of the substituent described above when G is a group which may further have a substituent. Examples of the aryloxy group include phenoxy, 2-methylphenoxy, 4-tert-butylphenoxy, 3-nitrophenoxy and 2-tetradecanoylaminophenoxy.

The silyloxy group represented by Q, R, X, Y and Z is preferably a silyloxy group having a carbon number of 3 to 20, and examples thereof include trimethylsilyloxy and tert-butyldimethylsilyloxy.

The heterocyclic oxy group represented by Q, R, X, Y and Z is preferably a substituted or unsubstituted heterocyclic oxy group having a carbon number of 2 to 30. Examples of the substituent are the same as those of the substituent described above when G is a group which may further have a substituent. Examples of the heterocyclic oxy group include 1-phenyltetrazol-5-oxy and 2-tetrahydropyranyloxy.

The acyloxy group represented by Q, R, X, Y and Z is preferably a formyloxy group, a substituted or unsubstituted alkylcarbonyloxy group having a carbon number of 2 to 30, or a substituted or unsubstituted arylcarbonyloxy group having a carbon number of 6 to 30. Examples of the substituent are the same as those of the substituent described above when G is a group which may further have a substituent. Examples of the acyloxy group include formyloxy, acetyloxy, pivaloyloxy, stearoyloxy, benzoyloxy and p-methoxyphenylcarbonyloxy.

The carbamoyloxy group represented by Q, R, X, Y and Z is preferably a substituted or unsubstituted carbamoyloxy group having a carbon number of 1 to 30. Examples of the substituent are the same as those of the substituent described above when G is a group which may further have a substituent. Examples of the carbamoyloxy group include N,N-dimethylcarbamoyloxy, N,N-diethylcarbamoyloxy, morpholinocarbonyloxy, N,N-di-n-octylaminocarbonyloxy and N-n-octylcarbamoyloxy.

The alkoxycarbonyloxy group represented by Q, R, X, Y and Z is preferably a substituted or unsubstituted alkoxycarbonyloxy group having a carbon number of 2 to 30. Examples of the substituent are the same as those of the substituent described above when G is a group which may further have a substituent. Examples of the alkoxycarbonyloxy group include methoxycarbonyloxy, ethoxycarbonyloxy, tert-butoxycarbonyloxy and n-octylcarbonyloxy.

The aryloxycarbonyloxy group represented by Q, R, X, Y and Z is preferably a substituted or unsubstituted aryloxycarbonyloxy group having a carbon number of 7 to 30. Examples of the substituent are the same as those of the substituent described above when G is a group which may further have a substituent. Examples of the aryloxycarbonyloxy group include phenoxycarbonyloxy, p-methoxyphenoxycarbonyloxy and p-n-hexadecyloxyphenoxycarbonyloxy.

The amino group represented by Q, R, X, Y and Z is preferably a substituted or unsubstituted alkylamino group having a carbon number of 1 to 30 or a substituted or unsubstituted arylamino group having a carbon number of 6 to 30. Examples of the substituent are the same as those of the substituent described above when G is a group which may further have a substituent. Examples of the amino group include amino, methylamino, dimethylamino, anilino, N-methyl-anilino, diphenylamino, hydroxyethylamino, carboxyethylamino, sulfoethylamino and 3,5-dicarboxyanilino.

The acylamino group represented by Q, R, X, Y and Z is preferably a formylamino group, a substituted or unsubstituted alkylcarbonylamino group having a carbon number of 1 to 30, or a substituted or unsubstituted arylcarbonylamino group having a carbon number of 6 to 30. Examples of the substituent are the same as those of the substituent described above when G is a group which may further have a substituent. Examples of the acylamino group include formylamino, acetylamino, pivaloylamino, lauroylamino, benzoylamino and 3,4,5-tri-n-octyloxyphenylcarbonylamino.

The aminocarbonylamino group represented by Q, R, X, Y and Z is preferably a substituted or unsubstituted aminocarbonylamino group having a carbon number of 1 to 30. Examples of the substituent are the same as those of the substituent described above when G is a group which may further have a substituent. Examples of the aminocarbonylamino group include carbamoylamino, N,N-dimethylaminocarbonylamino, N,N-diethylaminocarbonylamino and morpholinocarbonylamino.

The alkoxycarbonylamino group represented by Q, R, X, Y and Z is preferably a substituted or unsubstituted alkoxycarbonylamino group having a carbon number of 2 to 30. Examples of the substituent are the same as those of the substituent described above when G is a group which may further have a substituent. Examples of the alkoxycarbonylamino group include methoxycarbonylamino, ethoxycarbonylamino, tert-butoxycarbonylamino, n-octadecyloxycarbonylamino and N-methyl-methoxycarbonylamino.

The aryloxycarbonylamino group represented by Q, R, X, Y and Z is preferably a substituted or unsubstituted aryloxycarbonylamino group having a carbon number of 7 to 30. Examples of the substituent are the same as those of the substituent described above when G is a group which may further have a substituent. Examples of the aryloxycarbonylamino group include phenoxycarbonylamino, p-chlorophenoxycarbonylamino and m-n-octyloxyphenoxycarbonylamino.

The sulfamoylamino group represented by Q, R, X, Y and Z is preferably a substituted or unsubstituted sulfamoylamino group having a carbon number of 0 to 30. Examples of the substituent are the same as those of the substituent described above when G is a group which may further have a substituent. Examples of the sulfamoylamino group include sulfamoylamino, N,N-dimethylaminosulfonylamino and N-n-octylaminosulfonylamino.

The alkyl- or aryl-sulfonylamino group represented by Q, R, X, Y and Z is preferably a substituted or unsubstituted alkylsulfonylamino group having a carbon number of 1 to 30 or a substituted or unsubstituted arylsulfonylamino group having a carbon number of 6 to 30. Examples of the substituent are the same as those of the substituent described above when G is a group which may further have a substituent. Examples of the alkylsulfonylamino group and arylsulfonylamino group include methylsulfonylamino, butylsulfonylamino, phenylsulfonylamino, 2,3,5-trichlorophenylsulfonylamino and p-methylphenylsulfonylamino.

The alkylthio group represented by Q, R, X, Y and Z is preferably a substituted or unsubstituted alkylthio group having a carbon number of 1 to 30. Examples of the substituent are the same as those of the substituent described above when G is a group which may further have a substituent. Examples of the alkylthio group include methylthio, ethylthio and n-hexadecylthio.

The arylthio group represented by Q, R, X, Y and Z is preferably a substituted or unsubstituted arylthio group having a carbon number of 6 to 30. Examples of the substituent are the same as those of the substituent described above when G is a group which may further have a substituent. Examples of the arylthio group include phenylthio, p-chlorophenylthio and m-methoxyphenylthio.

The heterocyclic thio group represented by Q, R, X, Y and Z is preferably a substituted or unsubstituted heterocyclic thio group having a carbon number of 2 to 30. Examples of the substituent are the same as those of the substituent described above when G is a group which may further have a substituent. Examples of the heterocyclic thio group include 2-benzothiazolylthio and 1-phenyltetrazol-5-ylthio.

The sulfamoyl group represented by Q, R, X, Y and Z is preferably a substituted or unsubstituted sulfamoyl group having a carbon number of 0 to 30. Examples of the substituent are the same as those of the substituent described above when G is a group which may further have a substituent. Examples of the sulfamoyl group include N-ethylsulfamoyl, N-(3-dodecyloxypropyl)sulfamoyl, N,N-dimethylsulfamoyl, N-acetylsulfamoyl, N-benzoylsulfamoyl, and N—(N'-phenylcarbamoyl)sulfamoyl.

The alkyl- or aryl-sulfinyl group represented by Q, R, X, Y and Z is preferably a substituted or unsubstituted alkylsulfinyl group having a carbon number of 1 to 30 or a substituted or unsubstituted arylsulfinyl group having a carbon number of 6 to 30. Examples of the substituent are the same as those of the substituent described above when G is a group which may further have a substituent. Examples of the alkyl- or aryl-sulfinyl group include methylsulfinyl, ethylsulfinyl, phenylsulfinyl and p-methylphenylsulfinyl.

The alkyl- or aryl-sulfonyl group represented by Q, R, X, Y and Z is preferably a substituted or unsubstituted alkylsulfonyl group having a carbon number of 1 to 30 or a substituted or unsubstituted arylsulfonyl group having a carbon number of 6 to 30. Examples of the substituent are the same as those of the substituent described above when G is a group which may further have a substituent. Examples of the alkyl- or aryl-sulfonyl group include methylsulfonyl, ethylsulfonyl, phenylsulfonyl and p-toluenesulfonyl.

The acyl group represented by Q, R, X, Y and Z is preferably a formyl group, a substituted or unsubstituted alkylcarbonyl group having a carbon number of 2 to 30, a substituted or unsubstituted arylcarbonyl group having a carbon number of 7 to 30, or a substituted or unsubstituted heterocyclic carbonyl group having a carbon number of 4 to 30, with the carbonyl group being bonded through a carbon atom. Examples of the substituent are the same as those of the substituent described above when G is a group which may further have a substituent. Examples of the acyl group include acetyl, pivaloyl, 2-chloroacetyl, stearoyl, benzoyl, p-n-octyloxyphenylcarbonyl, 2-pyridylcarbonyl and 2-furylcarbonyl.

The aryloxycarbonyl group represented by Q, R, X, Y and Z is preferably a substituted or unsubstituted aryloxycarbonyl group having a carbon number of 7 to 30. Examples of the substituent are the same as those of the substituent described above when G is a group which may further have a substituent. Examples of the aryloxycarbonyl group include phenoxycarbonyl, o-chlorophenoxycarbonyl, m-nitrophenoxycarbonyl and p-tert-butylphenoxycarbonyl.

The alkoxycarbonyl group represented by Q, R, X, Y and Z is preferably a substituted or unsubstituted alkoxycarbonyl group having a carbon number of 2 to 30. Examples of the substituent are the same as those of the substituent described above when G is a group which may further have a substituent. Examples of the alkoxycarbonyl group include methoxycarbonyl, ethoxycarbonyl, tert-butoxycarbonyl and n-octadecyloxycarbonyl.

The carbamoyl group represented by Q, R, X, Y and Z is preferably a substituted or unsubstituted carbamoyl group having a carbon number of 1 to 30. Examples of the substituent are the same as those of the substituent described above when G is a group which may further have a substituent. Examples of the carbamoyl group include carbamoyl, N-methylcarbamoyl, N,N-dimethylcarbamoyl, N,N-di-n-octylcarbamoyl and N-(methylsulfonyl)carbamoyl.

The phosphino group represented by Q, R, X, Y and Z is preferably a substituted or unsubstituted phosphino group having a carbon number of 2 to 30. Examples of the substituent are the same as those of the substituent described above when G is a group which may further have a substituent. Examples of the phosphino group include dimethylphosphino, diphenylphosphino and methylphenoxyphosphino.

The phosphinyl group represented by Q, R, X, Y and Z is preferably a substituted or unsubstituted phosphinyl group having a carbon number of 2 to 30. Examples of the substituent are the same as those of the substituent described above when G is a group which may further have a substituent. Examples of the phosphinyl group include phosphinyl, dioctyloxyphosphinyl and diethoxyphosphinyl.

The phosphinyloxy group represented by Q, R, X, Y and Z is preferably a substituted or unsubstituted phosphinyloxy group having a carbon number of 2 to 30. Examples of the substituent are the same as those of the substituent described above when G is a group which may further have a substituent. Examples of the phosphinyloxy group include diphenoxyphosphinyloxy and dioctyloxyphosphinyloxy.

The phosphinylamino group represented by Q, R, X, Y and Z is preferably a substituted or unsubstituted phosphinylamino group having a carbon number of 2 to 30. Examples of the substituent are the same as those of the substituent described above when G is a group which may further have a substituent. Examples of the phosphinylamino group include dimethoxyphosphinylamino and dimethylaminophosphinylamino.

The silyl group represented by Q, R, X, Y and Z is preferably a substituted or unsubstituted silyl group having a carbon number of 3 to 30. Examples of the substituent are the same as those of the substituent described above when G is a group which may further have a substituent. Examples of the silyl group include trimethylsilyl, tert-butyldimethylsilyl and phenyldimethylsilyl.

Examples of the azo group represented by Q, R, X, Y and Z include phenylazo, 4-methoxyphenylazo, 4-pivaloylaminophenylazo and 2-hydroxy-4-propanoylphenylazo.

Examples of the imido group represented by Q, R, X, Y and Z include N-succinimido and N-phthalimido.

The heterocyclic thio group represented by Q, R, X, Y and Z includes a heterocyclic thio group having a substituent and an unsubstituted heterocyclic thio group. The heterocyclic thio group preferably has a 5- or 6-membered heterocycle. Examples of the heterocyclic thio group include a 2-pyridylthio group. Examples of the substituent are the same as those of the substituent described above when G is a group which may further have a substituent.

The sulfinyl group represented by Q, R, X, Y and Z includes an alkylsulfinyl group and an arylsulfinyl group. Examples of the sulfinyl group include a 3-sulfopropylsulfinyl group and a 3-carboxypropylsulfinyl group.

The phosphoryl group represented by Q, R, X, Y and Z includes a phosphoryl group having a substituent and an unsubstituted phosphoryl group. Examples of the phosphoryl group include a phenoxyphosphoryl group and a phenylphosphoryl group. Examples of the substituent are the same as those of the substituent described above when G is a group which may further have a substituent.

The acyl group represented by Q, R, X, Y and Z includes an acyl group having a substituent and an unsubstituted acyl group. The acyl group is preferably an acyl group having a carbon number of 1 to 12 excluding the substituent. Examples of the acyl group include an acetyl group and a benzoyl group. Examples of the substituent are the same as those of the substituent described above when G is a group which may further have a substituent.

Examples of the ionic hydrophilic group represented by Q, R, X, Y and Z include a sulfo group, a carboxyl group, a phosphono group and a quaternary ammonium group. The ionic hydrophilic group is preferably a carboxyl group or a sulfo group. The carboxyl group and sulfo group each may be in a salt state. As for examples of the counter ion forming the salt, a salt mainly composed of a lithium ion is preferred, but a mixed salt may also be used. Examples of the counter ion used in combination include an ammonium ion, an alkali metal ion (e.g., sodium ion, potassium ion) and an organic cation (e.g., tetramethylguanidium ion).

In the case where Q, R, X, Y and Z each represents a divalent group, the divalent group is preferably an alkylene group (e.g., methylene, ethylene, propylene, butylene, pentylene), an alkenylene group (e.g., ethenylene, propenylene), an alkynylene group (e.g., ethynylene, propynylene), an arylene group (e.g., phenylene, naphthylene), a divalent heterocyclic group (e.g., 6-chloro-1,3,5-triazine-2,4-diyl, pyrimidine-2,4-diyl, pyrimidine-4,6-diyl, quinoxaline-2,3-diyl, pyridazine-3,6-diyl), —O—, —CO—, —NR'— (wherein R' is a hydrogen, an alkyl group or an aryl group), —S—, —$SO_2$—, —SO— or a combination thereof (e.g., —$NHCH_2CH_2NH$—, —NHCONH—).

These alkylene, alkenylene, alkynylene, arylene and divalent heterocyclic groups and the alkyl and aryl group of R may have a substituent.

Examples of the substituent are the same as those of the substituent described above with respect to G.

The alkyl group and aryl group of R' are the same meanings as examples of the substituent described above for G.

The divalent group is more preferably an alkylene group having a carbon number of 10 or less, an alkenylene group having a carbon number of 10 or less, an alkynylene group having a carbon number of 10 or less, an arylene group having a carbon number of 6 to 10, a divalent heterocyclic group, —S—, —SO—, —$SO_2$— or a combination thereof (e.g., —$SCH_2CH_2S$—, —$SCH_2CH_2CH_2S$—). The total carbon number of the divalent linking group is preferably from 0 to 50, more preferably from 0 to 30, and most preferably from 0 to 10.

In the case where Q, R, X, Y and Z represents a trivalent group, the trivalent group is preferably a trivalent hydrocarbon group, a trivalent heterocyclic group, >N— or a combination thereof with a divalent group (e.g., >$NCH_2CH_2NH$—, >NCONH—).

The total carbon number of the trivalent linking group is preferably from 0 to 50, more preferably from 0 to 30, and most preferably from 0 to 10.

In formula (Y-1), n is preferably, for example, 1 or 2, more preferably 2.

In formula (Y-I), the substituent X is, for example, preferably an electron-withdrawing group, more preferably an electron-withdrawing group having a Hammett's substituent constant σp value of 0.20 or more, still more preferably an electron-withdrawing group having a σp value of 0.30 or more, with the upper limit being 1.0 or less.

Specific examples of X which is an electron-withdrawing group having a σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, an alkyl halide group, a halogenated alkoxy group, a halogenated aryloxy group, a halogenated alkylamino group, a halogenated alkylthio group, an aryl group substituted by another electron-withdrawing group having a σp value of 0.20 or more, a heterocyclic group, a halogen atom, an azo group and a selenocyanate group.

Preferred examples of X include an acyl group having a carbon number of 2 to 12, an acyloxy group having a carbon number of 2 to 12, a carbamoyl group having a carbon number of 1 to 12, an alkyloxycarbonyl group having a carbon number of 2 to 12, an aryloxycarbonyl group having a carbon number of 7 to 18, a cyano group, a nitro group, an alkylsulfinyl group having a carbon number of 1 to 12, an arylsulfinyl group having a carbon number of 6 to 18, an alkylsulfonyl group having a carbon number of 1 to 12, an arylsulfonyl group having a carbon number of 6 to 18, a sulfamoyl group having a carbon number of 0 to 12, an alkyl halide group having a carbon number of 1 to 12, a halogenated alkyloxy group having a carbon number of 1 to 12, a halogenated alkylthio group having a carbon number of 1 to 12, a halogenated aryloxy group having a carbon number of 7 to 18, an aryl group having a carbon number of 7 to 18 and being substituted by two or more other electron-withdrawing groups each having a σp value of 0.20 or more, and a 5- to 8-membered heterocyclic group containing a nitrogen atom, an oxygen atom or a sulfur atom and having a carbon number of 1 to 18.

Among these, a cyano group, an alkylsulfonyl group having a carbon number of 1 to 12, an arylsulfonyl group having a carbon number of 6 to 18, and a sulfamoyl group having a carbon number of 0 to 12 are more preferred.

Above all, X is preferably a cyano group, an alkylsulfonyl group having a carbon number of 1 to 12, or a sulfamoyl group having a carbon number of 0 to 12, and most preferably a cyano group or an alkylsulfonyl group having a carbon number of 1 to 12.

In formula (Y-I), the substituent of Z is preferably, for example, a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

Detailed examples of the substituent represented by Z are the same as the corresponding substituent examples described for examples of the heterocyclic group represented by G, and preferred examples thereof are also the same.

Above all, the substituent represented by Z is preferably a substituted aryl group or a substituted heterocyclic group, more preferably a substituted aryl group.

In formula (Y-I), the substituent Q is preferably, for example, a hydrogen, a substituted or unsubstituted alkyl group, a substituted or unsubstituted acyl group, a substituted or unsubstituted alkylsulfonyl group, or a substituted or unsubstituted arylsulfonyl group, more preferably a hydrogen, a substituted or unsubstituted alkyl group, or a substituted or unsubstituted acyl group, still more preferably a hydrogen.

In formula (Y-I), R is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

In formula (Y-I), Y is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group and/or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, and most preferably a hydrogen or a methylthio group.

As for the preferred combination of substituents of the dyestuff represented by formula (Y-I) for use in the present invention, a compound where at least one of various substituents is the above-described preferred group is preferred, a compound where a larger number of various substituents are the above-described preferred group is more preferred, and a compound where all substituents are the above-described preferred group is most preferred.

Particularly preferred combinations as the dyestuff represented by formula (Y-I) for use in the present invention are those including the following (A) to (G).

(A) G is preferably a 5- to 8-membered nitrogen-containing heterocycle, more preferably an S-triazine ring, a pyrimidine ring, a pyridazine ring, a pyrazine ring, a pyridine ring, an imidazole ring, a pyrazole ring or a pyrrole ring, still more preferably an S-triazine ring, a pyrimidine ring, a pyridazine ring or a pyrazine ring, and most preferably an S-triazine ring.

(B) R is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

(C) X is preferably an electron-withdrawing group having a Hammett's substituent constant σp value of 0.20 or more, more preferably 0.30 or more, and the upper limit is 1.0 or less. Above all, the electron-withdrawing group is a cyano group, an alkylsulfonyl group having a carbon number of 1 to 12, an arylsulfonyl group having a carbon number of 6 to 18, or a sulfamoyl group having a carbon number of 0 to 12, preferably a cyano group or an alkylsulfonyl group having a carbon number of 1 to 12, more preferably a cyano group, a methylsulfonyl group or a phenylsulfonyl group, and most preferably a cyano group.

(D) Y is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, yet still more preferably a hydrogen or a methylthio group, and most preferably a hydrogen.

(E) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, more preferably a substituted aryl group or a substituted heterocyclic group, still more preferably a substituted aryl group.

(F) Q is preferably a hydrogen, a substituted or unsubstituted alkyl group, a substituted or unsubstituted acyl group, a substituted or unsubstituted alkylsulfonyl group, or a substituted or unsubstituted arylsulfonyl group, more preferably a hydrogen, a substituted or unsubstituted alkyl group, or a substituted or unsubstituted acyl group, still more preferably a hydrogen.

(G) n represents an integer of 1 to 3 and is preferably 1 or 2, most preferably 2.

The compound represented by formula (Y-I) or a salt thereof is preferably any one of compounds represented by the following formulae (Y-1), (Y-2), (Y-3), (Y-4) and (Y-5) and salts thereof.

Formula (Y-1) is described in detail below.

Formula (Y-1):

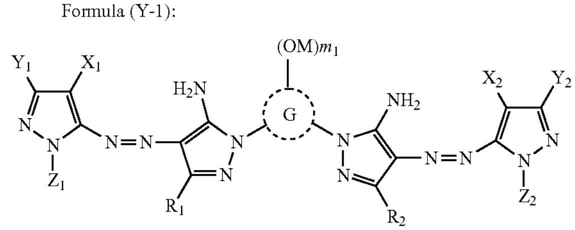

$R_1$, $R_2$, $X_1$, $X_2$, $Y_1$, $Y_2$, $Z_1$ and $Z_2$ each represents a monovalent group.

The monovalent group indicates a hydrogen or a monovalent substituent. Examples of the monovalent substituent are the same as the examples of the monovalent substituents of R, X, Y and Z in formula (I), and preferred examples thereof are also the same. $m_1$ represents an integer of 0 to 3. formula (Y-1) has at least one ionic hydrophilic group, and the counter ion of the ionic hydrophilic group contains a lithium ion $R_1$, $R_2$, $X_1$, $X_2$, $Y_1$, $Y_2$, $Z_1$ and $Z_2$ are described in more detail below.

Examples of the substituents of $R_1$ and $R_2$ are each independently the same as examples of R in formula (Y-I), and preferred examples thereof are also the same.

Examples of the substituents of $X_1$ and $X_2$ are each independently the same as examples of X in formula (Y-I), and preferred examples thereof are also the same.

Examples of the substituents of $Y_1$ and $Y_2$ are each independently the same as examples of Y in formula (Y-I), and preferred examples thereof are also the same.

Examples of the substituents of $Z_1$ and $Z_2$ are each independently the same as examples of Z in formula (Y-I), and preferred examples thereof are also the same.

G and $m_1$ are described in more detail below.

G represents an atomic group necessary to complete a 5- to 8-membered nitrogen-containing heterocycle.

Preferred examples of the 5- to 8-membered nitrogen-containing heterocycle represented by G include an S-triazine ring, a pyrimidine ring, a pyridazine ring, a pyrazine ring, a pyridine ring, an imidazole ring, a pyrazole ring and a pyrrole ring. Among these, an S-triazine ring, a pyrimidine ring, a pyridazine ring and a pyrazine ring are more preferred, and an S-triazine ring is most preferred.

$m_1$ represents an integer of 0 to 3 and when an —OM group is substitutable on the structure that is a preferred example of the 5- to 8-membered nitrogen-containing heterocycle represented by G, $m_1$ is preferably an integer of 0 to 2, more preferably 0 or 1, and most preferably 1.

M is described in more detail below.

M represents a hydrogen or a cation.

The cation represented by M is an Li ion or an alkali metal ion, ammonium or quaternary ammonium cation mixed salt mainly composed of Li, preferably an Li ion or an Na, K, $NH_4$ or $NR_4$ mixed salt mainly composed of Li, wherein $R_4$ is an alkyl group or an aryl group and examples thereof are the same as examples of the alkyl group and aryl group represented by R and Y. Above all, the cation M is preferably, for example, an Li ion or an Na, K or $NH_4$ mixed salt mainly composed of Li, more preferably an Li ion or an Na or K mixed salt mainly composed of Li, and most preferably Li.

As for the preferred combination of substituents of the dyestuff represented by formula (Y-1) for use in the present invention, a compound where at least one of various substituents is the above-described preferred group is preferred, a compound where a larger number of various substituents are the above-described preferred group is more preferred, and a compound where all substituents are the above-described preferred group is most preferred.

Particularly preferred combinations as the dyestuff represented by formula (Y-1) for use in the present invention are those including the following (A) to (G).

(A) $R_1$ and $R_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

(B) $X_1$ and $X_2$, which may be the same or different, each is preferably an electron-withdrawing group having a Hammett's substituent constant σp value of 0.20 or more, more preferably 0.30 or more, and the upper limit is 1.0 or less. Above all, the electron-withdrawing group is a cyano group, an alkylsulfonyl group having a carbon number of 1 to 12, an arylsulfonyl group having a carbon number of 6 to 18, or a sulfamoyl group having a carbon number of 0 to 12, preferably a cyano group or an alkylsulfonyl group having a carbon number of 1 to 12, more preferably a cyano group, a methylsulfonyl group or a phenylsulfonyl group, and most preferably a cyano group.

(C) $Y_1$ and $Y_2$, which may be the same or different, each is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, yet still more preferably a hydrogen or a methylthio group, and most preferably a hydrogen.

(D) $Z_1$ and $Z_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a substituted or unsubstituted aryl group, or a substituted or unsubstituted heterocyclic group, and most preferably a substituted aryl group.

(E) G represents an atomic group necessary to complete a 5- to 8-membered nitrogen-containing heterocycle. Preferred examples of the 5- to 8-membered nitrogen-containing heterocycle include an S-triazine ring, a pyrimidine ring, a pyridazine ring, a pyrazine ring, a pyridine ring, an imidazole ring, a pyrazole ring and a pyrrole ring. Among these, an S-triazine ring, a pyrimidine ring, a pyridazine ring and a pyrazine ring are more preferred, and an S-triazine ring is most preferred.

(F) $m_1$ represents an integer of 0 to 3 and when an —OM group is substitutable on the structure that is a preferred example of the 5- to 8-membered nitrogen-containing heterocycle represented by G, $m_1$ is preferably an integer of 0 to 2, more preferably 0 or 1, and most preferably 1.

(G) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

Formula (Y-2) is described in detail below.

Formula (Y-2):

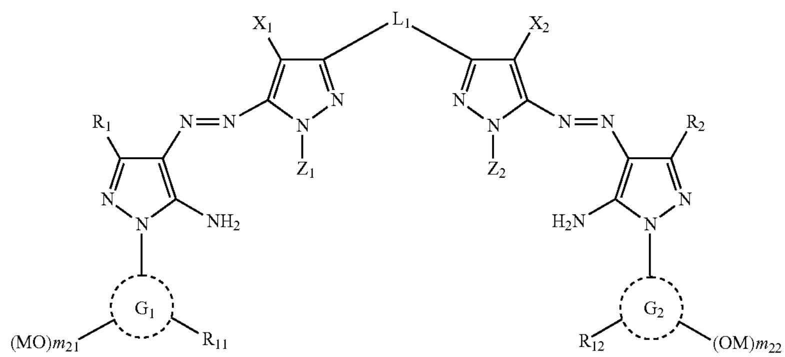

$R_1$, $R_2$, $R_{11}$, $R_{12}$, $X_1$, $X_2$, $Z_1$ and $Z_2$ each represents a monovalent group.

The monovalent group indicates a hydrogen or a monovalent substituent.

$L_1$ represents a divalent linking group.

$G_1$ and $G_2$ each independently represents an atomic group necessary to complete a 5- to 8-membered nitrogen-containing heterocycle.

$m_{21}$ and $m_{22}$ each independently represents an integer of 0 to 3 and when an —OM group is substitutable on the structure that is a preferred example of the 5- to 8-membered nitrogen-containing heterocycle represented by $G_1$ and $G_2$, $m_{21}$ and $m_{22}$ each is preferably an integer of 0 to 2, more preferably 0 or 1, and most preferably 1.

M represents a hydrogen or a cation.

Formula (Y-2) has at least one ionic hydrophilic group, and the counter ion of the ionic hydrophilic group contains a lithium ion.

Formula (Y-2) is described in more detail below.

In formula (Y-2), preferred examples of the substituents of $R_1$ and $R_2$ are the same as examples of the substituents of $R_1$, $R_2$, $Y_1$ and $Y_2$ described for formula (Y-1), and preferred examples thereof are also the same.

In formula (Y-2), preferred examples of the substituents of $X_1$ and $X_2$ are the same as examples of the substituents of $X_1$ and $X_2$ described for formula (Y-1), and preferred examples thereof are also the same.

In formula (Y-2), preferred examples of the substituents of $Z_1$ and $Z_2$ are the same as examples of the substituents of $Z_1$ and $Z_2$ described for formula (Y-1), and preferred examples thereof are also the same.

In formula (Y-2), preferred examples of $G_1$ and $G_2$ are the same as examples of G described for formula (Y-1), and preferred examples thereof are also the same.

In formula (Y-2), preferred examples of M are the same as examples of M described for formula (Y-1), and preferred examples thereof are also the same.

In formula (Y-2), preferred examples of the substituents of $R_{11}$ and $R_{12}$ are the same as examples of the substituents of $R_1$, $R_2$, $Y_1$ and $Y_2$ described for formula (Y-1). Preferred examples thereof include an —OM group (wherein M is a hydrogen or a cation), a substituted or unsubstituted amino group, an alkylamino group having a carbon number of 1 to 12, an arylamino group having a carbon number of 6 to 18, a substituted or unsubstituted alkylthio group having a carbon number of 1 to 12, and a substituted or unsubstituted arylthio group having a carbon number of 6 to 18.

In formula (Y-2), the divalent linking group represented by $L_1$ is preferably an alkylene group (e.g., methylene, ethylene, propylene, butylene, pentylene), an alkenylene group (e.g., ethenylene, propenylene), an alkynylene group (e.g., ethynylene, propynylene), an arylene group (e.g., phenylene, naphthylene), a divalent heterocyclic group (e.g., 6-chloro-1,3,5-triazine-2,4-diyl, pyrimidine-2,4-diyl, pyrimidine-4,6-diyl, quinoxaline-2,3-diyl, pyridazine-3,6-diyl), —O—, —CO—, —NR— (wherein R is a hydrogen, an alkyl group or an aryl group), —S—, —$SO_2$—, —SO— or a combination thereof (e.g., —$NHCH_2CH_2NH$—, —NHCONH—).

The alkylene group, alkenylene group, alkynylene group, arylene group and divalent heterocyclic group and the alkyl group and aryl group of R may have a substituent.

Examples of the substituent are the same as those of the substituents of $R_1$, $R_2$, $Y_1$ and $Y_2$ in formula (Y-1).

The alkyl group and aryl group of R are the same as examples of the substituents of $R_1$, $R_2$, $Y_1$ and $Y_2$ in formula (Y-1).

The divalent linking group is more preferably an alkylene group having a carbon number of 10 or less, an alkenylene group having a carbon number of 10 or less, an alkynylene group having a carbon number of 10 or less, an arylene group having a carbon number of 6 to 10, —S—, —SO—, —$SO_2$—, or a combination thereof (e.g., —$SCH_2CH_2S$—, —$SCH_2CH_2CH_2S$—).

The total carbon number of the divalent linking group is preferably from 0 to 50, more preferably from 0 to 30, and most preferably from 0 to 10.

As for the preferred combination of substituents of the dyestuff represented by formula (Y-2) for use in the present invention, a compound where at least one of various substituents is the above-described preferred group is preferred, a compound where a larger number of various substituents are the above-described preferred group is more preferred, and a compound where all substituents are the above-described preferred group is most preferred.

Particularly preferred combinations as the dyestuff represented by formula (Y-2) for use in the present invention are those including the following (A) to (H).

(A) $R_1$ and $R_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12. more preferably a linear alkyl group or branched alkyl group having a total carbon number of 1 to 8, still more preferably a secondary or tertiary alkyl group, and most preferably a tert-butyl group.

(B) $X_1$ and $X_2$, which may be the same or different, each is preferably an electron-withdrawing group having a Hammett's substituent constant σp value of 0.20 or more, more preferably 0.30 or more, and the upper limit is 1.0 or less. Above all, the electron-withdrawing group is a cyano group, an alkylsulfonyl group having a carbon number of 1 to 12, an arylsulfonyl group having a carbon number of 6 to 18, or a sulfamoyl group having a carbon number of 0 to 12, preferably a cyano group or an alkylsulfonyl group having a carbon number of 1 to 12, more preferably a cyano group, a methylsulfonyl group or a phenylsulfonyl group, and most preferably a cyano group.

(C) $Z_1$ and $Z_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a substituted or unsubstituted aryl group, or a substituted or unsubstituted heterocyclic group, and most preferably a substituted aryl group.

(D) $G_1$ and $G_2$, which may be the same or different, each represents an atomic group necessary to complete a 5- to 8-membered nitrogen-containing heterocycle. Preferred examples of the 5- to 8-membered nitrogen-containing heterocycle include an S-triazine ring, a pyrimidine ring, a pyridazine ring, a pyrazine ring, a pyridine ring, an imidazole ring, a pyrazole ring and a pyrrole ring. Among these, an S-triazine ring, a pyrimidine ring, a pyridazine ring and a pyrazine ring are more preferred, and an S-triazine ring is most preferred.

(E) $m_{21}$ and $m_{22}$ each independently represents an integer of 0 to 3 and when an —OM group is substitutable on the structure that is a preferred example of the 5- to 8-membered nitrogen-containing heterocycle represented by $G_1$ and $G_2$, $m_{21}$ and $m_{22}$ each is preferably an integer of 0 to 2, more preferably 0 or 1, and most preferably 1.

(F) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(G) $R_{11}$ and $R_{12}$, which may be the same or different, each is preferably an —OM group (wherein M is a hydrogen or a cation), a substituted or unsubstituted amino group (for example, an alkylamino group having a carbon number of 1 to 12, or an arylamino group having a carbon number of 6 to 18), a substituted or unsubstituted alkylthio group having a carbon number of 1 to 12, or a substituted or unsubstituted arylthio group having a carbon number of 6 to 18, more preferably an unsubstituted amino group, an alkylamino group having a carbon number of 1 to 12, an arylamino group having a carbon number of 6 to 18, a substituted or unsubstituted alkylthio group having a carbon number of 1 to 12, or a substituted or unsubstituted arylthio group having a carbon number of 6 to 18, still more preferably an unsubstituted amino group, a dialkylamino group having a carbon number of 1 to 12, an arylamino group having a carbon number of 6 to 18, or a substituted or unsubstituted alkylthio group having a carbon number of 1 to 12.

(H) $L_1$ is preferably an alkylene group having a carbon number of 10 or less, an alkenylene group having a carbon number of 10 or less, an alkynylene group having a carbon number of 10 or less, an arylene group having a carbon number of 6 to 10, —S—, —SO—, —$SO_2$—, or a combination thereof (e.g., —$SCH_2CH_2S$—, —$SCH_2CH_2CH_2S$—), more preferably an alkylene group having a carbon number of 10 or less, an arylene group having a carbon number of 6 to 10, —S—, —SO—, —$SO_2$—, or a combination thereof (e.g., —$SCH_2CH_2S$—, —$SCH_2CH_2CH_2S$—), still more preferably an alkylene group having a carbon number of 10 or less, —$SCH_2CH_2S$— or —$SCH_2CH_2CH_2S$—.

Formula (Y-3) is described in detail below.

Formula (Y-3):

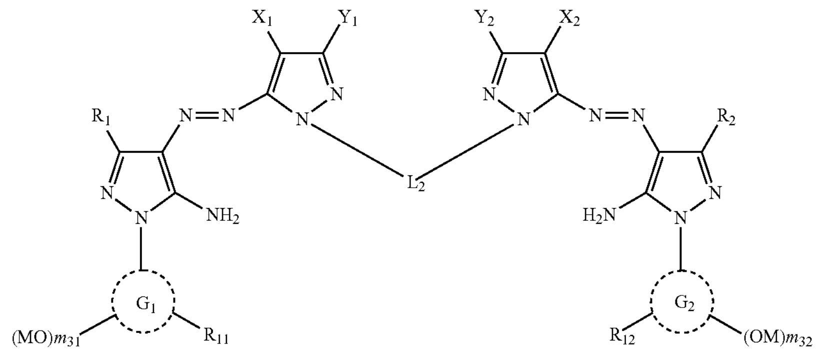

$R_1$, $R_2$, $R_{11}$, $R_{12}$, $X_1$, $X_2$, $Y_1$ and $Y_2$ each represents a monovalent group.

The monovalent group indicates a hydrogen or a monovalent substituent.

$L_2$ represents a divalent linking group.

$G_1$ and $G_2$ each independently represents an atomic group necessary to complete a 5- to 8-membered nitrogen-containing heterocycle.

$m_{31}$ and $m_{32}$ each independently represents an integer of 0 to 3.

M represents a hydrogen or a cation.

Formula (Y-3) has at least one ionic hydrophilic group, and the counter ion of the ionic hydrophilic group contains a lithium ion.

Formula (Y-3) is described in more detail below.

In formula (Y-3), preferred examples of the substituents of $R_1$, $R_2$, $Y_1$ and $Y_2$ are the same as examples of the substituents of $R_1$, $R_2$, $Y_1$ and $Y_2$ described for formula (Y-1), and preferred examples thereof are also the same.

In formula (Y-3), preferred examples of the substituents of $X_1$ and $X_2$ are the same as examples of the substituents of $X_1$ and $X_2$ described for formula (Y-1), and preferred examples thereof are also the same.

In formula (Y-3), preferred examples of $G_1$ and $G_2$ are the same as examples of G described for formula (Y-1), and preferred examples thereof are also the same.

In formula (Y-3), preferred examples of $m_{31}$ and $m_{32}$ are the same as examples of $m_{21}$ and $m_{22}$ described for formula (Y-2), and preferred examples thereof are also the same.

In formula (Y-3), preferred examples of M are the same as examples of M described for formula (Y-1), and preferred examples thereof are also the same.

In formula (Y-3), preferred examples of the substituents of $R_{11}$ and $R_{12}$ are the same as examples of the substituents of $R_{11}$ and $R_{12}$ described for formula (Y-2), and preferred examples thereof are also the same.

In formula (Y-3), examples of the divalent linking group represented by $L_2$ are the same as those of $L_1$ described for formula (Y-2), and preferred examples thereof are also the same.

As for the preferred combination of substituents of the dyestuff represented by formula (Y-3) for use in the present invention, a compound where at least one of various substituents is the above-described preferred group is preferred, a compound where a larger number of various substituents are the above-described preferred group is more preferred, and a compound where all substituents are the above-described preferred group is most preferred.

Particularly preferred combinations as the dyestuff represented by formula (Y-3) for use in the present invention are those including the following (A) to (H).

(A) $R_1$ and $R_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

(B) $X_1$ and $X_2$, which may be the same or different, each is preferably an electron-withdrawing group having a Hammett's substituent constant $\sigma p$ value of 0.20 or more, more preferably 0.30 or more, and the upper limit is 1.0 or less. Above all, the electron-withdrawing group is a cyano group, an alkylsulfonyl group having a carbon number of 1 to 12, an arylsulfonyl group having a carbon number of 6 to 18, or a sulfamoyl group having a carbon number of 0 to 12, preferably a cyano group or an alkylsulfonyl group having a carbon number of 1 to 12, more preferably a cyano group, a methylsulfonyl group or a phenylsulfonyl group, and most preferably a cyano group.

(C) $Y_1$ and $Y_2$, which may be the same or different, each is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, yet still more preferably a hydrogen or a methylthio group, and most preferably a hydrogen.

(D) $G_1$ and $G_2$, which may be the same or different, each represents an atomic group necessary to complete a 5- to 8-membered nitrogen-containing heterocycle. Preferred examples of the 5- to 8-membered nitrogen-containing heterocycle include an S-triazine ring, a pyrimidine ring, a pyridazine ring, a pyrazine ring, a pyridine ring, an imidazole ring, a pyrazole ring and a pyrrole ring. Among these, an S-triazine ring, a pyrimidine ring, a pyridazine ring and a pyrazine ring are more preferred, and an S-triazine ring is most preferred.

(E) $m_{31}$ and $m_{32}$ each independently represents an integer of 0 to 3 and when an —OM group is substitutable on the structure that is a preferred example of the 5- to 8-membered nitrogen-containing heterocycle represented by $G_1$ and $G_2$, $m_{3i}$ and $m_{32}$ each is preferably an integer of 0 to 2, more preferably 0 or 1, and most preferably 1.

(F) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(G) $R_{11}$ and $R_{12}$, which may be the same or different, each is preferably an —OM group (wherein M is a hydrogen or a cation), a substituted or unsubstituted amino group (for example, an alkylamino group having a carbon number of 1 to 12, or an arylamino group having a carbon number of 6 to 18), a substituted or unsubstituted alkylthio group having a carbon number of 1 to 12, or a substituted or unsubstituted arylthio group having a carbon number of 6 to 18, more preferably an unsubstituted amino group, an alkylamino group having a carbon number of 1 to 12, an arylamino group having a carbon number of 6 to 18, a substituted or unsubstituted alkylthio group having a carbon number of 1 to 12, or a substituted or unsubstituted arylthio group having a carbon number of 6 to 18, still more preferably an unsubstituted amino group, a dialkylamino group having a carbon number of 1 to 12, an arylamino group having a carbon number of 6 to 18, or a substituted or unsubstituted alkylthio group having a carbon number of 1 to 12.

(H) $L_2$ is preferably an alkylene group having a carbon number of 10 or less, an alkenylene group having a carbon number of 10 or less, an alkynylene group having a carbon number of 10 or less, an arylene group having a carbon number of 6 to 10, —S—, —SO—, —$SO_2$—, or a combination thereof (e.g., —$SCH_2CH_2S$—, —$SCH_2CH_2CH_2S$—), more preferably an alkylene group having a carbon number of 10 or less, an arylene group having a carbon number of 6 to 10, —S—, —SO—, —$SO_2$—, or a combination thereof (e.g., —$SCH_2CH_2S$—, —$SCH_2CH_2CH_2S$—), still more preferably an alkylene group having a carbon number of 10 or less, —$SCH_2CH_2S$— or —$SCH_2CH_2CH_2S$—.

Formula (Y-4) is described in detail below.

$R_{11}$, $R_{12}$, $X_1$, $X_2$, $Y_1$, $Y_2$, $Z_1$ and $Z_2$ each represents a monovalent group.

The monovalent group indicates a hydrogen or a monovalent substituent.

$L_3$ represents a divalent linking group.

$G_1$ and $G_2$ each independently represents an atomic group necessary to complete a 5- to 8-membered nitrogen-containing heterocycle.

$m_{41}$ and $m_{42}$ each independently represents an integer of 0 to 3.

M represents a hydrogen or a cation.

Formula (Y-4) has at least one ionic hydrophilic group, and the counter ion of the ionic hydrophilic group contains a lithium ion.

Formula (Y-4) is described in more detail below.

In formula (Y-4), preferred examples of the substituents of $Y_1$ and $Y_2$ are the same as examples of the substituents of $R_1$, $R_2$, $Y_1$ and $Y_2$ described for formula (Y-1), and preferred examples thereof are also the same.

In formula (Y-4), preferred examples of the substituents of $X_1$ and $X_2$ are the same as examples of the substituents of $X_1$ and $X_2$ described for formula (Y-1), and preferred examples thereof are also the same.

In formula (Y-4), preferred examples of $G_1$ and $G_2$ are the same as examples of G described for formula (Y-1), and preferred examples thereof are also the same.

In formula (Y-4), preferred examples of $m_{41}$ and $m_{42}$ are the same as examples of $m_{21}$ and $m_{22}$ described for formula (Y-2), and preferred examples thereof are also the same.

In formula (Y-4), preferred examples of M are the same as examples of M described for formula (Y-1), and preferred examples thereof are also the same.

In formula (Y-4), preferred examples of the substituents of $R_{11}$ and $R_{12}$ are the same as examples of the substituents of $R_{11}$ and $R_{12}$ described for formula (Y-2), and preferred examples thereof are also the same.

In formula (Y-4), examples of the divalent linking group represented by $L_3$ are the same as examples of $L_1$ described for formula (Y-2), and preferred examples thereof are also the same.

As for the preferred combination of substituents of the dyestuff represented by formula (Y-4) for use in the present invention, a compound where at least one of various substituents is the above-described preferred group is preferred, a compound where a larger number of various substituents are the above-described preferred group is more preferred, and a compound where all substituents are the above-described preferred group is most preferred.

Particularly preferred combinations as the dyestuff represented by formula (Y-4) for use in the present invention are those including the following (A) to (H).

Formula (Y-4):

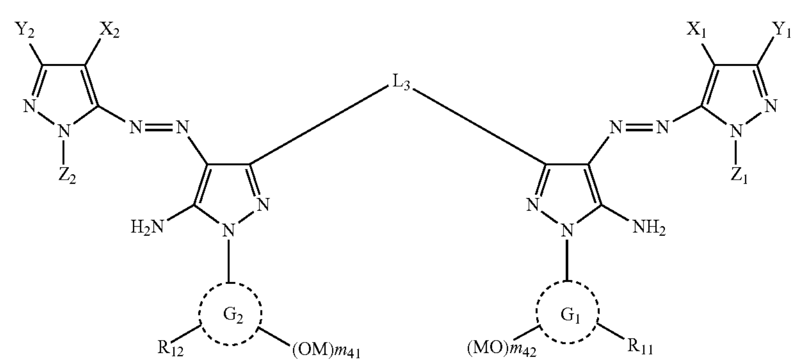

(A) $Y_1$ and $Y_2$, which may be the same or different, each is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, yet still more preferably a hydrogen or a methylthio group, and most preferably a hydrogen.

(B) $X_1$ and $X_2$, which may be the same or different, each is preferably an electron-withdrawing group having a Hammett's substituent constant σp value of 0.20 or more, more preferably 0.30 or more, and the upper limit is 1.0 or less. Above all, the electron-withdrawing group is a cyano group, an alkylsulfonyl group having a carbon number of 1 to 12, an arylsulfonyl group having a carbon number of 6 to 18, or a sulfamoyl group having a carbon number of 0 to 12, preferably a cyano group or an alkylsulfonyl group having a carbon number of 1 to 12, more preferably a cyano group, a methylsulfonyl group or a phenylsulfonyl group, and most preferably a cyano group.

(C) $Z_1$ and $Z_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a substituted or unsubstituted aryl group, or a substituted or unsubstituted heterocyclic group, and most preferably a substituted aryl group.

(D) $G_1$ and $G_2$, which may be the same or different, each represents an atomic group necessary to complete a 5- to 8-membered nitrogen-containing heterocycle. Preferred examples of the 5- to 8-membered nitrogen-containing heterocycle include an S-triazine ring, a pyrimidine ring, a pyridazine ring, a pyrazine ring, a pyridine ring, an imidazole ring, a pyrazole ring and a pyrrole ring. Among these, an S-triazine ring, a pyrimidine ring, a pyridazine ring and a pyrazine ring are more preferred, and an S-triazine ring is most preferred.

(E) $m_{41}$ and $m_{42}$ each independently represents an integer of 0 to 3 and when an —OM group is substitutable on the structure that is a preferred example of the 5- to 8-membered nitrogen-containing heterocycle represented by $G_1$ and $G_2$, $m_{41}$ and $m_{42}$ each is preferably an integer of 0 to 2, more preferably 0 or 1, and most preferably 1.

(F) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(G) $R_{11}$ and $R_{12}$, which may be the same or different, each is preferably an —OM group (wherein M is a hydrogen or a cation), a substituted or unsubstituted amino group (for example, an alkylamino group having a carbon number of 1 to 12, or an arylamino group having a carbon number of 6 to 18), a substituted or unsubstituted alkylthio group having a carbon number of 1 to 12, or a substituted or unsubstituted arylthio group having a carbon number of 6 to 18, more preferably an unsubstituted amino group, an alkylamino group having a carbon number of 1 to 12, an arylamino group having a carbon number of 6 to 18, a substituted or unsubstituted alkylthio group having a carbon number of 1 to 12, or a substituted or unsubstituted arylthio group having a carbon number of 6 to 18, still more preferably an unsubstituted amino group, a dialkylamino group having a carbon number of 1 to 12, an arylamino group having a carbon number of 6 to 18, or a substituted or unsubstituted alkylthio group having a carbon number of 1 to 12.

(H) $L_3$ is preferably an alkylene group having a carbon number of 10 or less, an alkenylene group having a carbon number of 10 or less, an alkynylene group having a carbon number of 10 or less, an arylene group having a carbon number of 6 to 10, —S—, —SO—, —$SO_2$—, or a combination thereof (e.g., —$SCH_2CH_2S$—, —$SCH_2CH_2CH_2S$—), more preferably an alkylene group having a carbon number of 10 or less, an arylene group having a carbon number of 6 to 10, —S—, —SO—, —$SO_2$—, or a combination thereof (e.g., —$SCH_2CH_2S$—, —$SCH_2CH_2CH_2S$—), still more preferably an alkylene group having a carbon number of 10 or less, —$SCH_2CH_2S$— or —$SCH_2CH_2CH_2S$—.

Formula (Y-5) is described in detail below.

Formula (Y-5):

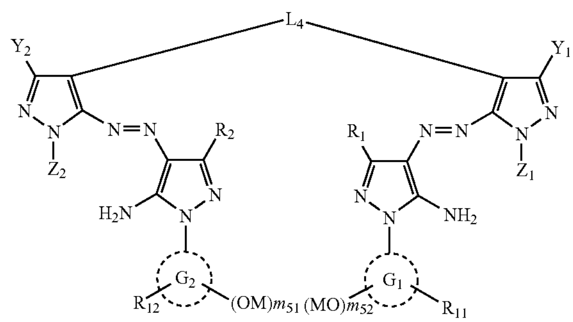

$R_1$, $R_2$, $R_{11}$, $R_{12}$, $Y_1$, $Y_2$, $Z_1$ and $Z_2$ each represents a monovalent group.

The monovalent group indicates a hydrogen or a monovalent substituent.

$L_4$ represents a divalent linking group.

$G_1$ and $G_2$ each independently represents an atomic group necessary to complete a 5- to 8-membered nitrogen-containing heterocycle.

$m_{51}$ and $m_{52}$ each independently represents an integer of 0 to 3.

M represents a hydrogen or a cation.

Formula (Y-5) has at least one ionic hydrophilic group, and the counter ion of the ionic hydrophilic group contains a lithium ion.

Formula (Y-5) is described in more detail below.

In formula (Y-5), preferred examples of the substituents of $R_1$, $R_2$, $Y_1$ and $Y_2$ are the same as examples of the substituents of $R_1$, $R_2$, $Y_1$ and $Y_2$ described for formula (Y-1), and preferred examples thereof are also the same.

In formula (Y-5), preferred examples of the substituents of $Z_1$ and $Z_2$ are the same as examples of the substituents of $Z_1$ and $Z_2$ described for formula (Y-1), and preferred examples thereof are also the same.

In formula (Y-5), preferred examples of $G_1$ and $G_2$ are the same as examples of G described for formula (Y-1), and preferred examples thereof are also the same.

In formula (Y-5), preferred examples of $m_{51}$ and $m_{52}$ are the same as examples of $m_{21}$ and $m_{22}$ described for formula (Y-2), and preferred examples thereof are also the same.

In formula (Y-5), preferred examples of M are the same as examples of M described for formula (Y-1), and preferred examples thereof are also the same.

In formula (Y-5), preferred examples of the substituents of $R_{11}$ and $R_{12}$ are the same as examples of the substituents of $R_{11}$ and $R_{12}$ described for formula (Y-2), and preferred examples thereof are also the same.

In formula (Y-5), examples of the divalent linking group represented by $L_4$ are the same as examples of $L_1$ described for formula (Y-2), and preferred examples thereof are also the same.

As for the preferred combination of substituents of the dyestuff represented by formula (Y-5) for use in the present invention, a compound where at least one of various substituents is the above-described preferred group is preferred, a compound where a larger number of various substituents are the above-described preferred group is more preferred, and a compound where all substituents are the above-described preferred group is most preferred.

Particularly preferred combinations as the dyestuff represented by formula (Y-5) for use in the present invention are those including the following (A) to (H).

(A) $R_1$ and $R_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

(B) $Y_1$ and $Y_2$, which may be the same or different, each is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, yet still more preferably a hydrogen or a methylthio group, and most preferably a hydrogen.

(C) $Z_1$ and $Z_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a substituted or unsubstituted aryl group, or a substituted or unsubstituted heterocyclic group, and most preferably a substituted aryl group.

(D) $G_1$ and $G_2$, which may be the same or different, each represents an atomic group necessary to complete a 5- to 8-membered nitrogen-containing heterocycle. Preferred examples of the 5- to 8-membered nitrogen-containing heterocycle include an S-triazine ring, a pyrimidine ring, a pyridazine ring, a pyrazine ring, a pyridine ring, an imidazole ring, a pyrazole ring and a pyrrole ring. Among these, an S-triazine ring, a pyrimidine ring, a pyridazine ring and a pyrazine ring are more preferred, and an S-triazine ring is most preferred.

(E) $m_{51}$ and $m_{51}$ each independently represents an integer of 0 to 3 and when an —OM group is substitutable on the structure that is a preferred example of the 5- to 8-membered nitrogen-containing heterocycle represented by $G_1$ and $G_2$, $m_{51}$ and $m_{52}$ each is preferably an integer of 0 to 2, more preferably 0 or 1, and most preferably 1.

(F) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(G) $R_{11}$ and $R_{12}$, which may be the same or different, each is preferably an —OM group (wherein M is a hydrogen or a cation), a substituted or unsubstituted amino group (for example, an alkylamino group having a carbon number of 1 to 12, or an arylamino group having a carbon number of 6 to 18), a substituted or unsubstituted alkylthio group having a carbon number of 1 to 12, or a substituted or unsubstituted arylthio group having a carbon number of 6 to 18, more preferably an unsubstituted amino group, an alkylamino group having a carbon number of 1 to 12, an arylamino group having a carbon number of 6 to 18, a substituted or unsubstituted alkylthio group having a carbon number of 1 to 12, or a substituted or unsubstituted arylthio group having a carbon number of 6 to 18, still more preferably an unsubstituted amino group, a dialkylamino group having a carbon number of 1 to 12, an arylamino group having a carbon number of 6 to 18, or a substituted or unsubstituted alkylthio group having a carbon number of 1 to 12.

(H) $L_4$ is a divalent linking group and preferably an electron-withdrawing group having a Hammett's substituent constant σp value of 0.20 or more, more preferably an 0.30 or more, and the upper limit is 1.0 or less. Above all, the electron-withdrawing group is preferably an alkylsulfonyl group having a carbon number of 1 to 12 {—$SO_2$—$(CH_2)$n-$O_2$S—, wherein n is an integer of 1 to 10} or an arylsulfonyl group having a carbon number of 6 to 18 {—$SO_2$—Ar—$O_2$S—, wherein Ar is a substituted or unsubstituted aryl group), and most preferably an alkylsulfonyl group having a carbon number of 1 to 12 {—$SO_2$—$(CH_2)$n-$O_2$S—, wherein n is an integer of 1 to 5}.

Out of azo dyes represented by formula (Y-1), a dyestuff represented by formula (Y-6) is preferred.

Formula (Y-6):

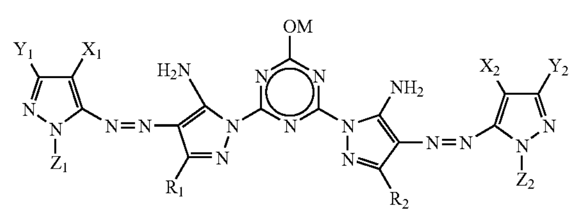

Formula (Y-6) is described in detail below.

$R_1$, $R_2$, $Y_1$ and $Y_2$ each represents a monovalent group, $X_1$ and $X_2$ each independently represents an electron-withdrawing group having a Hammett's substituent constant σp value of 0.20 or more, $Z_1$ and $Z_2$ each independently represents a hydrogen, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and M represents a hydrogen or cation. Formula (Y-6) has at least one ionic hydrophilic group, and the counter ion of the ionic hydrophilic group contains a lithium ion.

$R_1$, $R_2$, $X_1$, $X_2$, $Y_1$, $Y_2$, $Z_1$, $Z_2$ and M are described in detail below.

Examples of the substituents of $R_1$, $R_2$, $Y_1$ and $Y_2$ are the same as examples of the substituents of $R_1$, $R_2$, $Y_1$ and $Y_2$ described for formula (Y-1), and preferred examples thereof are also the same.

Examples of the substituents of $X_1$ and $X_2$ are the same as examples of the substituents of $X_1$ and $X_2$ described for formula (Y-1), and preferred examples thereof are also the same.

Examples of the substituents of $Z_1$ and $Z_2$ are the same as examples of the substituents of $Z_1$ and $Z_2$ described for formula (Y-1), and preferred examples thereof are also the same.

Examples of M are the same as examples of M described for formula (Y-1), and preferred examples thereof are also the same.

As for the preferred combination of substituents of the dyestuff represented by formula (Y-6) for use in the present invention, a compound where at least one of various substituents is the above-described preferred group is preferred, a compound where a larger number of various substituents are the above-described preferred group is more preferred, and a compound where all substituents are the above-described preferred group is most preferred.

Particularly preferred combinations as the dyestuff represented by formula (Y-6) for use in the present invention are those including the following (A) to (E).

(A) $R_1$ and $R_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

(B) $X_1$ and $X_2$, which may be the same or different, each is preferably an electron-withdrawing group having a Hammett's substituent constant σp value of 0.20 or more, more preferably 0.30 or more, and the upper limit is 1.0 or less. Above all, the electron-withdrawing group is a cyano group, an alkylsulfonyl group having a carbon number of 1 to 12, an arylsulfonyl group having a carbon number of 6 to 18, or a sulfamoyl group having a carbon number of 0 to 12, preferably a cyano group or an alkylsulfonyl group having a carbon number of 1 to 12, more preferably a cyano group, a methylsulfonyl group or a phenylsulfonyl group, and most preferably a cyano group.

(C) $Y_1$ and $Y_2$, which may be the same or different, each is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, yet still more preferably a hydrogen or a methylthio group, and most preferably a hydrogen.

(D) $Z_1$ and $Z_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a substituted or unsubstituted aryl group, or a substituted or unsubstituted heterocyclic group, and most preferably a substituted aryl group.

(E) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

In the present invention, the compounds represented by formulae (Y-I), (Y-1), (Y-2), (Y-3), (Y-4), (Y-5) and (Y-6) have at least one ionic hydrophilic group, and the counter ion of the ionic hydrophilic group contains a lithium ion. Each compound preferably has 2 or more ionic hydrophilic groups, more preferably from 2 to 10 ionic hydrophilic groups, still more preferably from 3 to 6 ionic hydrophilic groups, in the molecule.

The ionic hydrophilic group may be any group as long as it is an ionic dissociative group. Preferred examples of the ionic hydrophilic group include a sulfo group (which may be a salt thereof), a carboxyl group (which may be a salt thereof), a hydroxyl group (which may be a salt thereof), a phosphono group (which may be a salt thereof), a quaternary ammonium group, an acylsulfamoyl group (which may be a salt thereof), a sulfonylcarbamoyl group (which may be a salt thereof) and a sulfonylsulfamoyl group (which may be a salt thereof).

The ionic hydrophilic group is preferably a sulfo group, a carboxyl group or a hydroxyl group (including salts thereof). In the case where the ionic hydrophilic group is a salt, preferred counter cations include lithium and an alkali metal (e.g., lithium, sodium, potassium), ammonium or organic cation (e.g., pyridinium, tetramethylammonium, guanidium) mixed salt mainly composed of lithium. Among these, lithium and an alkali metal mixed salt mainly composed of lithium are preferred, and a lithium salt of sulfo group, a lithium salt of carboxy group, and a lithium salt of hydroxyl group are more preferred.

As for the preferred combination of substituents of the dyestuff represented by formula (Y-6) for use in the present invention, a compound where at least one of various substituents is the above-described preferred group is preferred, a compound where a larger number of various substituents are the above-described preferred group is more preferred, and a compound where all substituents are the above-described preferred group is most preferred.

In the present invention, among the compounds represented by formula (Y-6), a compound represented by the following formula (Y-6-I) is preferred.

Formula (Y-6-1):

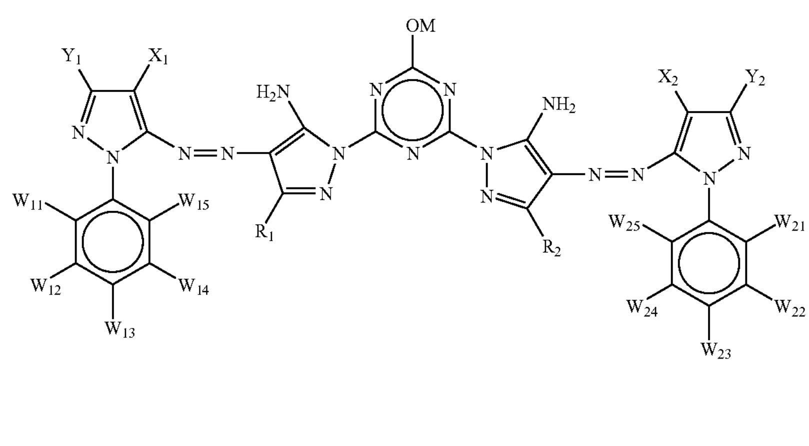

In formula (Y-6-I), $R_1$, $R_2$, $Y_1$, $Y_2$, $W_{11}$, $W_{12}$, $W_{13}$, $W_{14}$, $W_{15}$, $W_{21}$, $W_{22}$, $W_{23}$, $W_{24}$ and $W_{25}$ each represents a monovalent group, $X_1$ and $X_2$ each independently represents an electron-withdrawing group having a Hammett's substituent constant σp value of 0.20 or more, and M represents a hydrogen or cation, provided that at least one of $W_{11}$, $W_{12}$, $W_{13}$, $W_{14}$, $W_{15}$, $W_{21}$, $W_{22}$, $W_{23}$, $W_{24}$ and $W_{25}$ is an ionic hydrophilic group or a group having an ionic hydrophilic group as the substituent and the counter ion of the ionic hydrophilic group contains a lithium ion.

Formula (Y-6-I) for use in the present invention is described in detail below.

In the present invention, $W_{11}$, $W_{12}$, $W_{13}$, $W_{14}$, $W_{15}$, $W_{21}$, $W_{22}$, $W_{23}$, $W_{24}$ and $W_{25}$ in formula (Y-6-I) are the same as examples of the monovalent group described for $Y_1$, $Y_2$, $Z_1$ and $Z_2$ in formula (Y-6).

$W_{11}$, $W_{12}$, $W_{13}$, $W_{14}$, $W_{15}$, $W_{21}$, $W_{22}$, $W_{23}$, $W_{24}$ and $W_{25}$ each is preferably a hydrogen, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including a salt thereof), a carboxyl group (including a salt thereof), a hydroxyl group (which may be a salt thereof), a phosphono group (which may be a salt thereof) or a quaternary ammonium, more preferably a hydrogen, a halogen atom, an alkyl group, a sulfo group (including a salt thereof), a carboxyl group (including a salt thereof), or a hydroxyl group (which may be a salt thereof) (including salts thereof), still more preferably a hydrogen, a sulfo group (including a salt thereof) or a carboxyl group (including a salt thereof). In particular, it is preferred that at least one of $W_{11}$, $W_{12}$, $W_{13}$, $W_{14}$ and $W_{15}$ is a sulfo group (including a salt thereof) or a carboxyl group (including a salt thereof) and at least one of $W_{21}$, $W_{22}$, $W_{23}$, $W_{24}$ and $W_{25}$ is a sulfo group (including a salt thereof) or a carboxyl group (including a salt thereof).

In the present invention, $X_1$ and $X_2$ in formula (Y-6-I) have the same meanings as $X_1$ and $X_2$ in formula (Y-6), and preferred examples thereof are also the same.

In the present invention, $Y_1$ and $Y_2$ in formula (Y-6-I) have the same meanings as $Y_1$ and $Y_2$ in formula (Y-6), and preferred examples thereof are also the same.

In the present invention, $R_1$ and $R_2$ in formula (Y-6-I) have the same meanings as $R_1$ and $R_2$ in formula (Y-6), and preferred examples thereof are also the same.

In the present invention, M in formula (Y-6-I) has the same meaning as M in formula (Y-6), and preferred examples thereof are also the same.

Particularly preferred combinations as the compound represented by formula (Y-6-I) for use in the present invention are those including the following (A) to (F).

(A) $R_1$ and $R_2$, which may be the same or different, each is preferably a linear or branched alkyl group having a total carbon number of C1 to C8, more preferably a secondary alkyl group or a tertiary alkyl group, and most preferably a tert-butyl group.

(B) $X_1$ and $X_2$, which may be the same or different, each is preferably an electron-withdrawing group having a Hammett's substituent constant σp value of 0.20 or more, more preferably 0.30 or more, and the upper limit is 1.0 or less. Above all, the electron-withdrawing group is a cyano group, an alkylsulfonyl group having a carbon number of 1 to 12, an arylsulfonyl group having a carbon number of 6 to 18, or a sulfamoyl group having a carbon number of 0 to 12, preferably a cyano group or an alkylsulfonyl group having a carbon number of 1 to 12, more preferably a cyano group, a methylsulfonyl group or a phenylsulfonyl group, and most preferably a cyano group.

(C) $Y_1$ and $Y_2$, which may be the same or different, each is preferably a hydrogen, a substituted or unsubstituted alkyl group having a total carbon number of 1 to 12, a substituted or unsubstituted aryl group having a total carbon number of 6 to 18, a substituted or unsubstituted heterocyclic group having a total carbon number of 4 to 12, or a substituted or unsubstituted alkylthio group having a total carbon number of 1 to 12, more preferably a hydrogen, a linear alkyl group or branched alkyl group having a total carbon number of 1 to 8, or a substituted or unsubstituted alkylthio group having a total carbon number of 1 to 8, still more preferably a hydrogen, an alkyl group having a total carbon number of 1 to 8, or an alkylthio group having a total carbon number of 1 to 8, yet still more preferably a hydrogen or a methylthio group, and most preferably a hydrogen.

(D) $W_{11}$, $W_{12}$, $W_{13}$, $W_{14}$, $W_{15}$, $W_{21}$, $W_{22}$, $W_{23}$, $W_{24}$ and $W_{25}$ each is preferably a hydrogen, a halogen atom, an alkyl group, a sulfo group (including a salt thereof), a carboxyl group (including a salt thereof) or a hydroxyl group (which may be a salt thereof) (including salts thereof), more preferably a hydrogen, a sulfo group (including a salt thereof) or a carboxyl group (including a salt thereof). In particular, it is preferred that at least one of $W_{11}$, $W_{12}$, $W_{13}$, $W_{14}$ and $W_{15}$ is a sulfo group (including a salt thereof) or a carboxyl group (including a salt thereof) and at least one of $W_{21}$, $W_{22}$, $W_{23}$, $W_{24}$ and $W_{25}$ is a sulfo group (including a salt thereof) or a carboxyl group (including a salt thereof).

(E) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(F) In the present invention, the compound represented by formulae (Y-6-I) preferably has 2 or more ionic hydrophilic groups, more preferably from 2 to 16 ionic hydrophilic groups, still more preferably from 3 to 5 ionic hydrophilic groups, in the molecule.

The ionic hydrophilic group may be any group as long as it is an ionic dissociative group. Preferred examples of the ionic hydrophilic group include a sulfo group (which may be a salt thereof), a carboxyl group (which may be a salt thereof), a hydroxyl group (which may be a salt thereof), a phosphono group (which may be a salt thereof), a quaternary ammonium group, an acylsulfamoyl group (which may be a salt thereof), a sulfonylcarbamoyl group (which may be a salt thereof) and a sulfonylsulfamoyl group (which may be a salt thereof).

The ionic hydrophilic group is preferably a sulfo group, a carboxyl group or a hydroxyl group (including salts thereof). In the case where the ionic hydrophilic group is a salt, preferred counter cations include lithium and an alkali metal (e.g., lithium, sodium, potassium), ammonium or organic cation (e.g., pyridinium, tetramethylammonium, guanidium) mixed salt mainly composed of lithium. Among these, lithium and an alkali metal mixed salt mainly composed of lithium are preferred, and a lithium salt of sulfo group, a lithium salt of carboxy group, and a lithium salt of hydroxyl group are more preferred.

As for the preferred combination of substituents of the dyestuff represented by formula (Y-6-I) for use in the present invention, a compound where at least one of various substituents is the above-described preferred group is preferred, a compound where a larger number of various substituents are the above-described preferred group is more preferred, and a compound where all substituents are the above-described preferred group is most preferred.

In the ink set of the present invention, the yellow ink composition preferably further contains, as the colorant, at least one member selected from the group consisting of a compound represented by the following formula (Y-7) and a salt thereof.

Formula (Y-7):

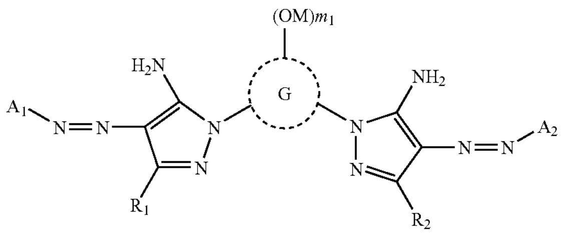

In formula (Y-7), $A_1$ and $A_2$ each represents a substituted or unsubstituted aryl group and/or a substituted or unsubstituted 5- or 6-membered heterocyclic group, $R_1$ and $R_2$ each represents a monovalent group, G represents an atomic group necessary to complete a 5- to 8-membered nitrogen-containing heterocycle, M represents a hydrogen or a cation, and $m_1$ represents an integer of 0 to 3, provided that formula (Y-7) has at least one ionic hydrophilic group and the counter ion of the ionic hydrophilic group contains a lithium ion. When $A_1$ and $A_2$ each represents a 5-membered heterocyclic group, a pyrazole ring is excluded.

In the present invention, preferred $A_1$ and $A_2$ in formula (Y-7) are described in detail.

The aryl group represented by $A_1$ and $A_2$ includes a substituted or unsubstituted aryl group. The substituted or unsubstituted aryl group is preferably an aryl group having a carbon number of 6 to 30.

Examples of the substituent of the aryl group include a halogen atom, an alkyl group, a cycloalkyl group, an aralkyl group, an alkenyl group, an alkynyl group, an aryl group, a heterocyclic group, a cyano group, a hydroxy group, a nitro group, a carboxyl group (which may be in a salt form), an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group (which may be in a salt form), an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphono group, a phosphinyl group, a phosphinyloxy group, a phosphinylamino group and a silyl group.

The aryl group represented by $A_1$ and $A_2$ is more preferably a substituted phenyl group (the substituent is preferably a carboxyl group or a sulfo group).

The heterocycle of the heterocyclic group represented by $A_1$ and $A_2$ is preferably a 5- or 6-membered ring, which may be further ring-condensed.

The heterocycle may be an aromatic heterocycle or a non-aromatic heterocycle. Examples thereof include pyridine, pyrazine, pyridazine, pyrimidine, quinoline, isoquinoline, quinazoline, cinnoline, phthalazine, quinoxaline, pyrrole, indole, furan, benzofuran, thiophene, benzothiophene, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

Above all, an aromatic heterocyclic group is preferred, and preferred examples thereof include, as illustrated in the same manner as above, pyridine, pyrazine, pyridazine, pyrimidine, imidazole, benzimidazole, triazole, benzoxazole, thiazole, benzothiazole, isothiazole, benzisothiazole and thiadiazole. Of these, imidazole, benzoxazole and thiadiazole are more preferred, thiadiazole (preferably 1,3,4-thiadiazole and 1,2,4-thiadiazole) is still more preferred, and 1,3,4-thiadiazole is most preferred.

These may have a substituent, and examples of the substituent are the same as those of the substituent of the above-described aryl group.

In the present invention, preferred G in formula (Y-7) is described in detail.

In formula (Y-7), as for preferred examples of the substituent of G, the substituent is preferably a 5- to 8-membered heterocyclic group, more preferably a 5- or 6-membered substituted or unsubstituted, aromatic or non-aromatic heterocyclic group, which may be further ring-condensed, and still more preferably a 5- or 6-membered aromatic heterocyclic group having a carbon number of 3 to 30.

Examples of the heterocyclic group represented by G include, without limiting the substitution position, pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and sulfolane.

Furthermore, G is preferably a 5- to 8-membered nitrogen-containing heterocycle, more preferably an S-triazine ring, a pyrimidine ring, a pyridazine ring, a pyrazine ring, a pyridine ring, an imidazole ring, a pyrazole ring or a pyrrole ring, still more preferably an S-triazine ring, a pyrimidine ring, a pyridazine ring or a pyrazine ring, and most preferably an S-triazine ring.

In the case where the heterocyclic group is a group which may further have a substituent, the group may further have a substituent described below.

The substituent includes a linear or branched alkyl group having a carbon number of 1 to 12, a linear or branched aralkyl group having a carbon number of 7 to 18, a linear or branched alkenyl group having a carbon number of 2 to 12, a linear or branched alkynyl group having a carbon number of 2 to 12, a linear or branched cycloalkyl group having a carbon number of 3 to 12, a linear or branched cycloalkenyl group having a carbon number of 3 to 12 (these groups each is preferably a group having a branched chain, more preferably a group having an asymmetric carbon, because the solubility of dye and the stability of ink are enhanced; e.g., methyl, ethyl, propyl, isopropyl, isobutyl, sec-butyl, tert-butyl, 2-ethylhexyl, 2-methylsulfonylethyl, 3-phenoxypropyl, trifluoromethyl, cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methylsulfonylethoxy), an aryloxy group (e.g., phenoxy, 2-methylphenoxy, 4-tert-butylphenoxy, 3-nitrophenoxy, 3-tert-butyloxycarbonylphenoxy, 3-methoxycarbonylphenyloxy, an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), alkylsulfonylamino and arylsulfonylamino groups (e.g., methylsulfonylamino, phenylsulfonylamino, p-toluenesulfonylamino), a carbamoyl group (e.g., N-ethylcarbamoyl, N,N-dibutylcarbamoyl), a sulfamoyl group (e.g., N-ethyl-sulfamoyl, N,N-dipropylsulfamoyl, N-phenylsulfamoyl), a sulfonyl group (e.g., methylsulfonyl, octylsulfonyl, phenylsulfonyl, p-toluenesulfonyl), an alkyloxycarbonyl group (e.g., methoxycarbonyl, butyloxycarbonyl), a heterocyclic oxy group (e.g., 1-phenyltetrazol-5-oxy, 2-tatrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the present invention, preferred $R_1$ and $R_2$ in formula (Y-7) are described in detail.

$R_1$ and $R_2$ each represents a monovalent group, and the monovalent substituent indicates a hydrogen or a monovalent substituent. The monovalent substituent is described in more detail. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (alkylamino group, arylamino group), an acylamino group (amido group), an aminocarbonylamino group (ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group and an imido group. These groups each may further have a substituent.

Among these, preferred are a hydrogen, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group and an alkoxycarbonyl group, more preferred are a hydrogen, a halogen atom, an alkyl group, an aryl group, a cyano group, an alkylsulfonyl group, an arylsulfonyl group and a heterocyclic group, and most preferred are a hydrogen, an alkyl group, an aryl group, a cyano group and an alkylsulfonyl group.

$R_1$ and $R_2$ each is independently preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

In the invention, in formula (Y-7), preferred M is described in detail.

M represents a hydrogen or a cation.

The cation represented by M is an Li ion or an alkali metal ion, ammonium or quaternary ammonium cation mixed salt mainly composed of Li, preferably an Li ion or an Na, K, $NH_4$ or $NR_4$ mixed salt mainly composed of Li, wherein R is an alkyl group or an aryl group and examples thereof are the same as examples of the alkyl group and aryl group represented by R and Y above. Above all, the cation M is preferably, for example, an Li ion or an Na, K or $NH_4$ mixed salt mainly composed of Li, more preferably an Li ion or an Na or K mixed salt mainly composed of Li, and most preferably Li.

In the present invention, preferred $m_1$ in formula (Y-7) is described in detail.

$m_1$ represents an integer of 0 to 3 and when an —OM group is substitutable on the structure that is a preferred example of the 5- to 8-membered nitrogen-containing heterocycle represented by G, $m_1$ is preferably an integer of 0 to 2, more preferably 0 or 1, and most preferably 1.

Particularly preferred combinations as the compound represented by formula (Y-7) for use in the present invention are those including the following (A) to (F).

(A) In formula (Y-7), $A_1$ and $A_2$ each is preferably a 5- or 6-membered ring, which may be further ring-condensed, more preferably a 5- or 6-membered nitrogen-containing heterocycle such as pyridine, pyrazine, pyridazine, pyrimidine, imidazole, benzimidazole, triazole, benzoxazole, thiazole, benzothiazole, isothiazole, benzisothiazole and thiadiazole, still more preferably imidazole, benzoxazole or thiadiazole, yet still more preferably thiazole (preferably 1,3,4-thiadiazole or 1,2,4-thiadiazole), and most preferably 1,3,4-thiadiazole.

(B) In formula (Y-7), as for preferred examples of the substituent of G, the substituent is preferably a 5- to 8-membered heterocyclic group, more preferably a 5- or 6-membered substituted or unsubstituted, aromatic or non-aromatic heterocyclic group, which may be further ring-condensed, and still more preferably a 5- or 6-membered aromatic heterocyclic group having a carbon number of 3 to 30. Examples of the heterocyclic group include, without limiting the substitution position, pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and sulfolane. Furthermore, G is preferably a 5- to 8-membered nitrogen-containing heterocycle, more preferably an S-triazine ring, a pyrimidine ring, a pyridazine ring, a pyrazine ring, a pyridine ring, an imidazole ring, a pyrazole ring or a pyrrole ring, still more preferably an S-triazine ring, a pyrimidine ring, a pyridazine ring or a pyrazine ring, and most preferably an S-triazine ring.

(C) In formula (Y-7), $R_1$ and $R_2$ each represents a monovalent group, and the monovalent group indicates a hydrogen or a monovalent group. The monovalent group is preferably a hydrogen, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group or an alkoxycarbonyl group, more preferably a hydrogen, a halogen atom, an alkyl group, an aryl group, a cyano group, an alkylsulfonyl group, an arylsulfonyl group or a heterocyclic group, and most preferably a hydrogen, an alkyl group, an aryl group, a cyano group or an alkylsulfonyl group. $R_1$ and $R_2$ each is independently preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

(D) In formula (Y-7), M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(E) In formula (Y-7), $m_1$ represents an integer of 0 to 3 and when an —OM group is substitutable on the structure that is a preferred example of the 5- to 8-membered nitrogen-containing heterocycle represented by G, $m_1$ is preferably an integer of 0 to 2, more preferably 0 or 1, and most preferably 1.

(F) In the present invention, the compound represented by formulae (Y-7) preferably has 2 or more ionic hydrophilic groups, more preferably from 2 to 16 ionic hydrophilic groups, still more preferably from 3 to 5 ionic hydrophilic groups, in the molecule. The ionic hydrophilic group in formula (Y-7) has the same meaning as the ionic hydrophilic group of formula (Y-6-1).

As for the preferred combination of substituents of the dyestuff represented by formula (Y-7) for use in the present invention, a compound where at least one of various substituents is the above-described preferred group is preferred, a compound where a larger number of various substituents are the above-described preferred group is more preferred, and a compound where all substituents are the above-described preferred group is most preferred.

In the present invention, among the compounds represented by formula (Y-7), a compound represented by the following formula (Y-8) is preferred.

Formula (Y-8):

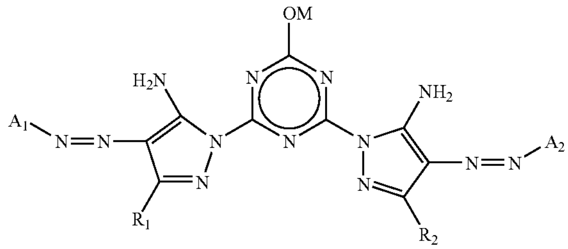

In formula (Y-8), $A_1$, $A_2$, $R_1$, $R_2$ and M have the same meanings as $A_1$, $A_2$, $R_1$, $R_2$ and M in formula (Y-7), provided that formula (Y-8) has at least one ionic hydrophilic group, and the counter ion of the ionic hydrophilic group contains a lithium ion.

In the present invention, formula (Y-8) is described in detail.

In the present invention, $A_1$ and $A_2$ in formula (Y-8) have the same meanings as $A_1$ and $A_2$ in formula (Y-7), and preferred examples thereof are also the same.

In the present invention, $R_1$ and $R_2$ in formula (Y-8) have the same meanings as $R_1$ and $R_2$ in formula (Y-7), and preferred examples thereof are also the same.

In the present invention, M in formula (Y-8) has the same meanings as M in formula (Y-7), and preferred examples thereof are also the same.

Particularly preferred combinations as the compound represented by formula (Y-8) for use in the present invention are those including the following (A) to (E).

(A) In formula (Y-8), $A_1$ and $A_2$ each is preferably a 5- or 6-membered nitrogen-containing heterocycle such as pyridine, pyrazine, pyridazine, pyrimidine, imidazole, benzimidazole, triazole, benzoxazole, thiazole, benzothiazole, isothiazole, benzisothiazole and thiadiazole, more preferably imidazole, benzoxazole or thiadiazole, still more preferably thiazole (preferably 1,3,4-thiadiazole or 1,2,4-thiadiazole), and most preferably 1,3,4-thiadiazole.

(B) In formula (Y-8), G is preferably a 5- to 8-membered nitrogen-containing heterocycle, more preferably an S-triazine ring, a pyrimidine ring, a pyridazine ring, a pyrazine ring, a pyridine ring, an imidazole ring, a pyrazole ring or a pyrrole ring, still more preferably an S-triazine ring, a pyrimidine ring, a pyridazine ring or a pyrazine ring, and most preferably an S-triazine ring.

(C) In formula (Y-8), $R_1$ and $R_2$ each is independently preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear alkyl group or branched alkyl group having a total carbon number of 1 to 8, still more preferably a secondary or tertiary alkyl group, and most preferably a tert-butyl group.

(D) In formula (Y-8), M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(E) In the present invention, the compound represented by formulae (Y-8) preferably has 2 or more ionic hydrophilic groups, more preferably from 2 to 16 ionic hydrophilic groups, still more preferably from 3 to 5 ionic hydrophilic groups, in the molecule. The ionic hydrophilic group in formula (Y-8) has the same meaning as the ionic hydrophilic group of formula (Y-6-1).

As for the preferred combination of substituents of the dyestuff represented by formula (Y-8) for use in the present invention, a compound where at least one of various substituents is the above-described preferred group is preferred, a compound where a larger number of various substituents are the above-described preferred group is more preferred, and a compound where all substituents are the above-described preferred group is most preferred.

In the present invention, among the compounds represented by formula (Y-8), a compound represented by the following formula (Y-9) is preferred.

Formula (Y-9):

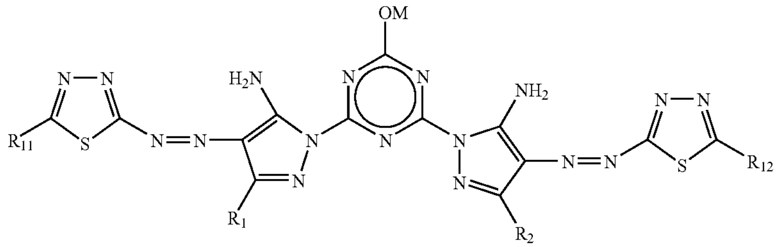

(In formula (Y-9), $R_1$, $R_2$, $R_{11}$ and $R_{12}$ each represents a monovalent group, and M represents a hydrogen or a cation, provided that formula (Y-9) has at least one ionic hydrophilic group and the counter ion of the ionic hydrophilic group contains a lithium ion.)

In the present invention, $R_{11}$ and $R_{12}$ in formula (Y-9) each is independently preferably an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (alkylamino group, arylamino group), an acylamino group (amido group), an aminocarbonylamino group (ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkyloxycarbonyl group, a carbamoyl group, a phosphino group, a phosphinyl group, a phosphinyloxy group, a phosphinylamino group, a silyl group, an azo group or an imido group. These groups each may further have a substituent.

$R_{11}$ and $R_{12}$ each is independently more preferably a substituted alkyl group, a substituted aryl group, a substituted heterocyclic group, a substituted alkylthio group, a substituted arylthio group or a substituted heterocyclic thio group, still more preferably a substituted aryl group or a substituted arylthio group, yet still more preferably a substituted aryl group.

In the present invention, $R_1$ and $R_2$ in formula (Y-9) have the same meanings as $R_1$ and $R_2$ in formula (Y-8), and preferred examples thereof are also the same.

In the present invention, M in formula (Y-9) has the same meaning as M in formula (Y-8), and preferred examples thereof are also the same.

Particularly preferred combinations as the compound represented by formula (Y-9) for use in the present invention are those including the following (A) to (D).

(A) $R_1$ and $R_2$, which may be the same or different, each is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12. more preferably a linear alkyl group or branched alkyl group having a total carbon number of 1 to 8, still more preferably a secondary or tertiary alkyl group, and most preferably a tert-butyl group.

(B) $R_{11}$ and $R_{12}$, which may be the same or different, each is preferably a substituted alkyl group, a substituted aryl group, a substituted heterocyclic group, a substituted alkylthio group, a substituted arylthio group or a substituted heterocyclic thio group, more preferably a substituted aryl group or a substituted arylthio group, still more preferably a substituted aryl group.

(C) M is preferably an Li ion or a hydrogen or cation mixed salt mainly composed of Li, more preferably an Li ion or a hydrogen, alkali metal ion, ammonium or quaternary ammonium cation mixed salt mainly composed of Li, still more preferably an Li ion or an Na, K or $NH_4$ mixed salt mainly composed of Li, and most preferably Li.

(D) In the present invention, the compound represented by formulae (Y-9) preferably has 2 or more ionic hydrophilic groups, more preferably from 2 to 16 ionic hydrophilic groups, still more preferably from 3 to 5 ionic hydrophilic groups, in the molecule. The ionic hydrophilic group in formula (Y-9) has the same meaning as the ionic hydrophilic group of formula (Y-6-1).

In view of color reproduction, the water-soluble dyestuffs represented by formulae (Y-I), (Y-1), (Y-2), (Y-3), (Y-4), (Y-5), (Y-6), (Y-6-I), (Y-7), (Y-8) and (Y-9) preferably have a maximum absorption wavelength (λmax) of 380 to 490 nm, more preferably a λmax of 400 to 480 nm, still more preferably a λmax of 420 to 460 nm, in $H_2O$.

The colorant for use in the yellow ink composition contained in the ink set of the present invention preferably contains at least one member selected from the group consisting of compounds represented by formula (Y-6-I) (dyes of formula (Y-6-I)). Furthermore, depending on the case, the composition preferably further contains at least one member selected from the group consisting of compounds represented by formulae (Y-7) to (Y-9) (dyes of formulae (Y-7) to (Y-9)). Above all, it is most preferred to contain at least one member selected from the group consisting of compounds represented by formula (Y-6-I) (dyes of (Y-6-I)).

When at least one member selected from the group consisting of dyes of formula (Y-6-I) is used as the colorant of the yellow ink composition, the light fastness and ozone fastness can be balanced with other color ink compositions and in turn, the ink set as a whole can exhibit good light fastness and good ozone fastness.

Particularly, use of the dye above is preferred also in that a good image free from occurrence of a bronze gloss phenomenon in a single color portion and a mixed color portion can be formed.

In addition, in the present invention, at least one dye selected from the group consisting of dyes of formula (Y-9) can be used in combination with other yellow-based dyes so as to adjust the color tone of the yellow ink composition.

Examples of the yellow-based dye that is used in combination include, but are not limited to, C.I. Direct Yellow 8, 9, 11, 12, 27, 28, 29, 33, 35, 39, 41, 44, 50, 53, 59, 68, 86, 87, 93, 95, 96, 98, 100, 106, 108, 109, 110, 130, 132, 142, 144, 161 and 163; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Reactive Yellow 2, 3, 13, 14, 15, 17, 18, 23, 24, 25, 26, 27, 29, 35, 37, 41 and 42; C.I. Basic Yellow 1, 2, 4, 11, 13, 14, 15, 19, 21, 23, 24, 25, 28, 29, 32, 36, 39 and 40; and dyes represented by the following formulae (Y-10) and (Y-11).

Formula (Y-10):

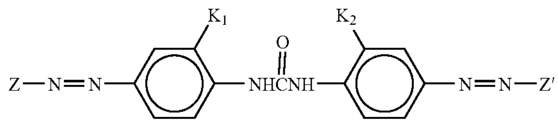

Formula (Y-11):

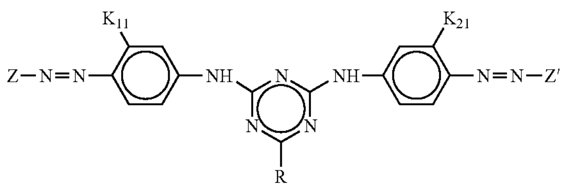

(In formulae (Y-10) and (Y-11), $K_1$, $K_2$, $K_{11}$ and $K_{21}$ each independently represents $CH_3$ or $OCH_3$, R represents a hydroxyl group (or a lithium salt thereof), an —$NH_2$ group, an —$NHC_2H_4OH$ group or an —$N(C_2H_4OH)_2$ group, and Z and Z', which may be the same or different, each independently has any of the following structures.)

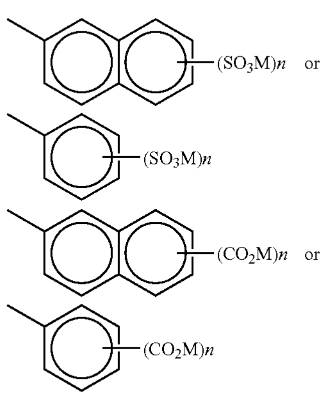

(wherein M represents Li or an H, Na, K, ammonium or organic amine mixed salt mainly composed of Li, and n is an integer of 1 or 2).

In the present invention, the concentration of the colorant contained in the yellow ink composition can be arbitrarily determined according to the color value of the compound (dye) used as the colorant, but it is preferred that the yellow ink composition contains, as the colorant, at least one member selected from the group consisting of compounds represented by formulae (Y-I) and (Y-1) to (Y-6) and salts thereof or contains, as the colorant, at least one member selected from the group consisting of compounds represented by formulae (Y-I) and (Y-1) to (Y-6) and salts thereof and at least one member selected from the group consisting of compounds represented by formula (Y-7) to (Y-9); and at the same time, the colorant is contained in a total amount of 1 to 8 wt %, more preferably from 2.0 to 7.0 wt %, still more preferably from 2.5 to 6.5 wt %, yet still more preferably from 3.0 to 6.0 wt %, based on the total weight of the yellow ink composition.

When the concentration as a total amount of the colorant contained in the yellow ink composition is 1.0 wt % or more, good colorability can be obtained, and when the concentration as a total amount of the colorant is 8.0 wt % or less, properties required of the ink composition used for an inkjet recording method, such as ejectability from a nozzle, can be kept good and clogging of an ink nozzle can be prevented.

On the other hand, in the present invention, the ink set is preferably an ink set including at least a yellow ink composition, a magenta ink composition and a cyan ink composition, wherein the yellow ink composition contains, as the yellow colorant, at least one member selected from the group consisting of a compound represented by the following formula (Y-I) and a salt thereof, each of the yellow colorant, the magenta colorant and the cyan colorant contained in the yellow ink composition, the magenta ink composition and the cyan ink composition, respectively, has at least one ionic hydrophilic group, the counter ion of the ionic hydrophilic group contains a lithium ion, the mol number per ink unit weight of the lithium ion contained in the yellow ink composition is from $2.0\times10^{-5}$ to $1.0\times10^{-3}$ mol/g, the mol number per ink unit weight of the lithium ion contained in the magenta ink composition is from $2.0\times10^{-6}$ to $1.0\times10^{-3}$ mol/g, and the mol number per ink unit weight of the lithium ion contained in the cyan ink composition is from $5.0\times10^{-6}$ to 1.0×10−3 mol/g.

The mol number per ink unit weight of the lithium ion contained in the yellow ink composition can be arbitrarily determined according to the molecular weight of the compound (dye) used as the colorant, the number of ionic hydrophilic groups and the solid content concentration adopted, but the lithium ion is preferably contained in an amount of $2.0\times10^{-5}$ to $1.0\times10^{-3}$ mol/g, more preferably from $3.0\times10^{-5}$ to $8.0\times10^{-4}$ mol/g, still more preferably from $1.0\times10^{-4}$ to $5.0\times10^{-4}$ mol/g, and most preferably from $1.5\times10^{-4}$ to $4.0\times10^{-4}$ mol/g.

The ratio between the concentration (wt %) of at least one colorant selected from the group consisting of compounds represented by formulae (Y-I) and (Y-1) to (Y-6) and salts thereof and the concentration (wt %) of at least one colorant selected from the group consisting of compounds represented by formulae (Y-7) to (Y-9) and salts thereof, contained in the yellow ink composition, is from 4:1 to 10:1.

The dyes of formulae (Y-I), (Y-1) to (Y-6-I) and (Y-7) to (Y-9) are very excellent in the light fastness and ozone fastness. An ink set by the combination with conventionally used other color inks poor in the light fastness and ozone fastness suffers from a phenomenon that after a light/ozone exposure test, the color balance of the image is lost due to difference in the degree of color fading among respective colors and deterioration of the image quality is readily observed.

In the present invention, the ink set is constituted by the combination with the cyan ink and magenta ink of the present invention and, if desired, further with a black ink. Therefore, (1) the light fastness/ozone fastness of each color can be remarkably enhanced, so that the image can keep good image quality for a long time without losing the color balance of the image even after a light/ozone exposure test; and (2) a good image free from occurrence of a bronze gloss phenomenon in a single color portion and a mixed color portion can be formed.

Furthermore, in the yellow ink, the dye of formulae (Y-I), (Y-1) to (Y-6) and (Y-6-I) and, depending on the case, the dye of formulae (Y-7) to (Y-9) and/or the above-described yellow-based dye usable in the present invention (for example, C.I. Direct Yellow 132) are used in combination within the range above, whereby the color balance can be more successfully adjusted and the image quality of a printed matter can be kept good for a longer period of time.
Specific examples of the dyes of formulae (Y-I), (Y-1) to (Y-6-I) and (Y-7) to (Y-9) are set forth below, but the present invention is not limited thereto.
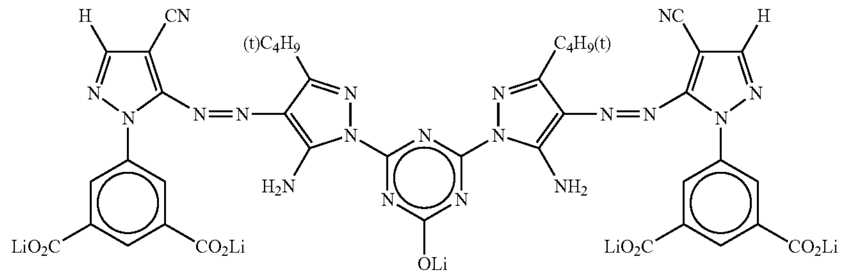
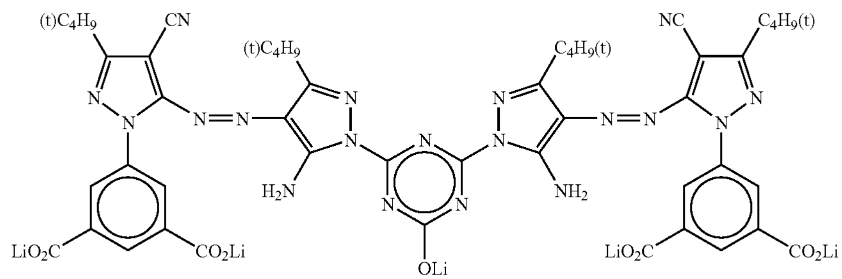
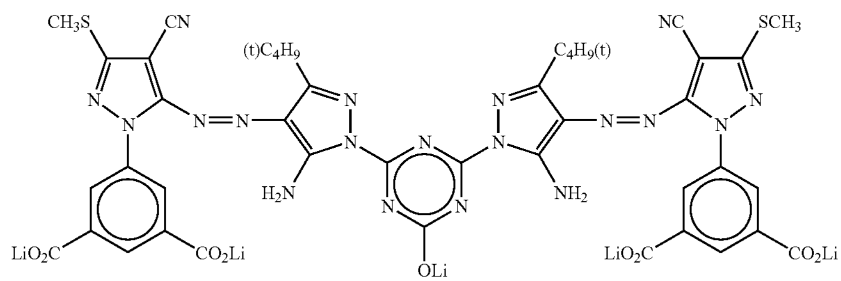
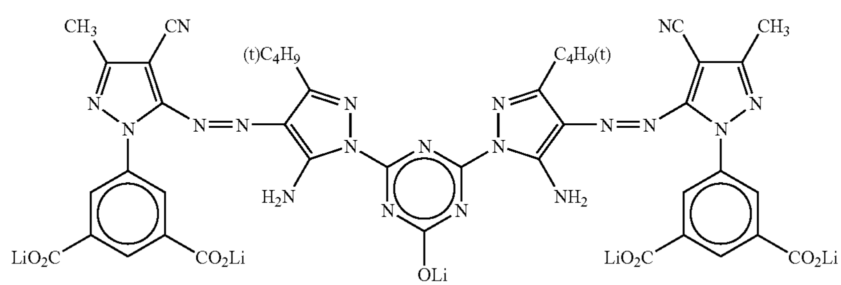
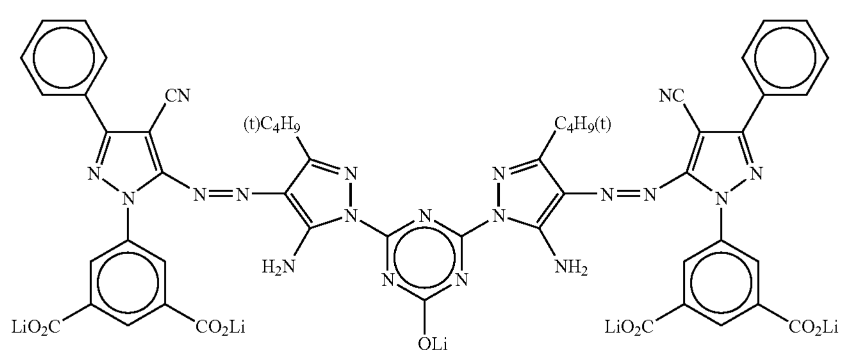

-continued
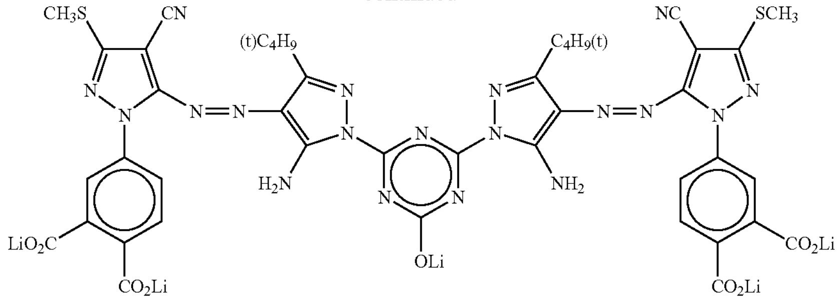
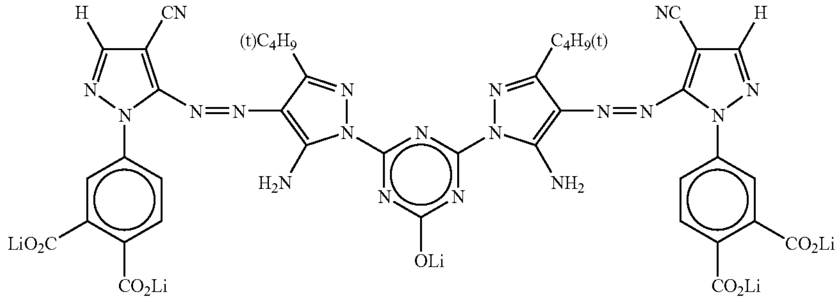
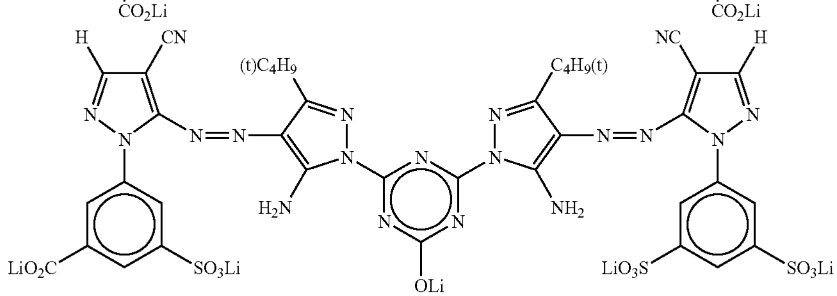
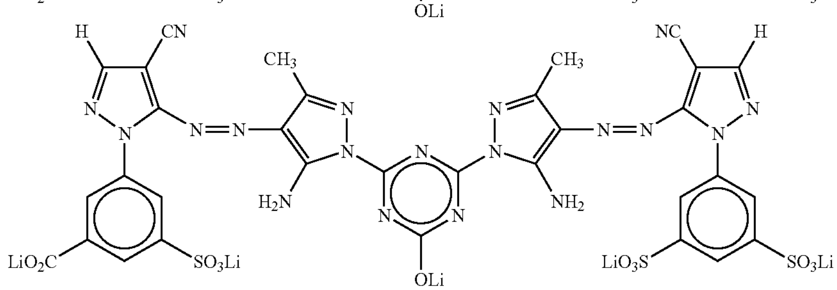
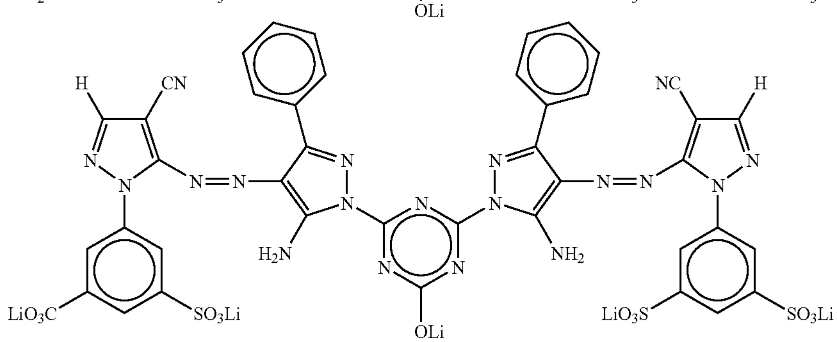
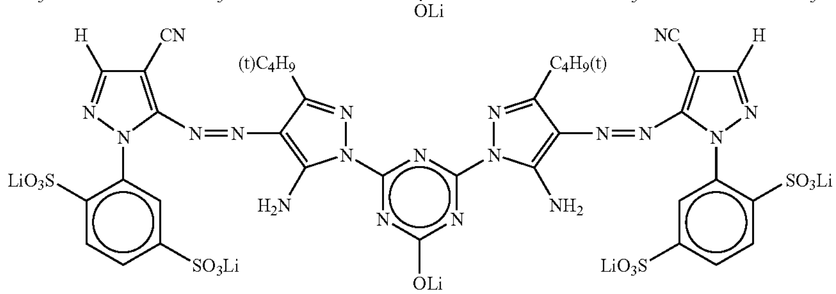

-continued
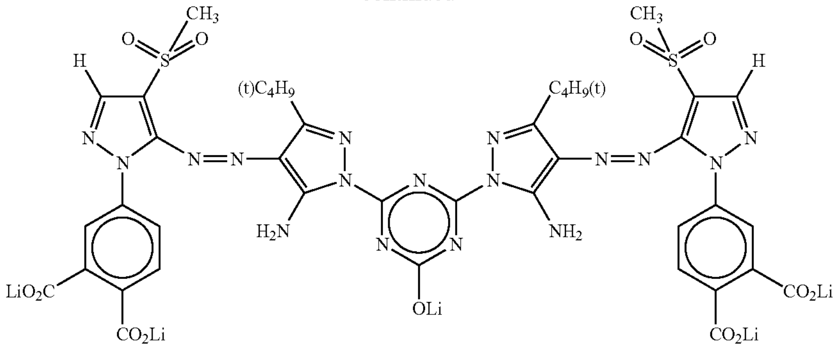
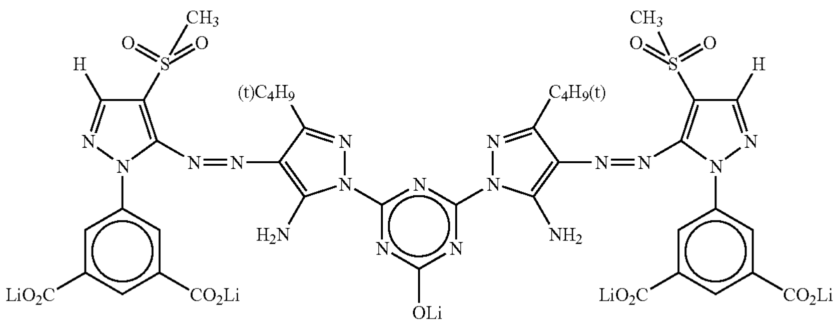
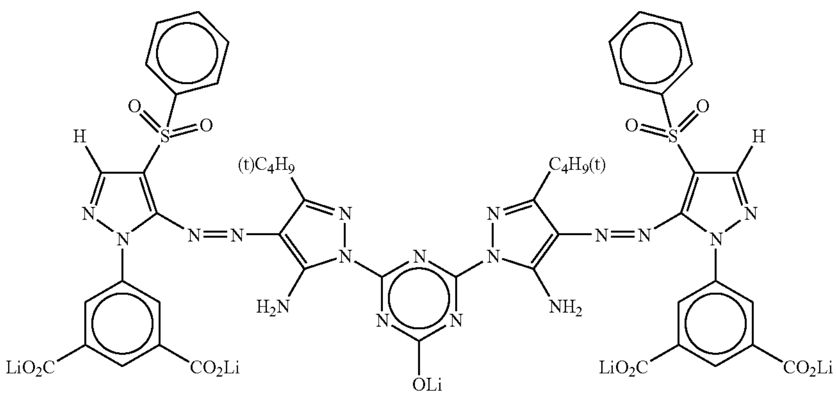
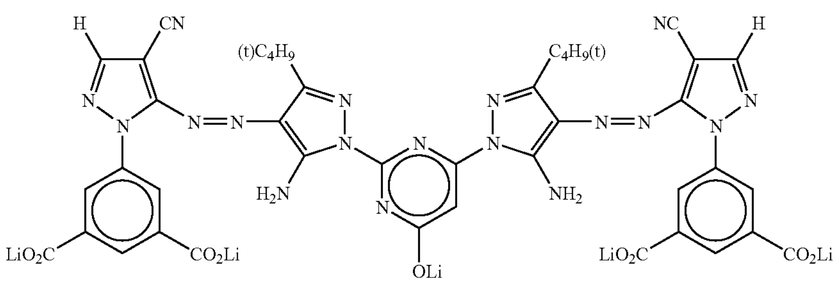
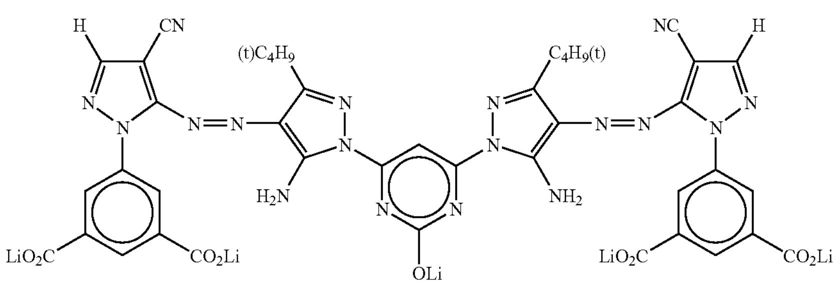

-continued
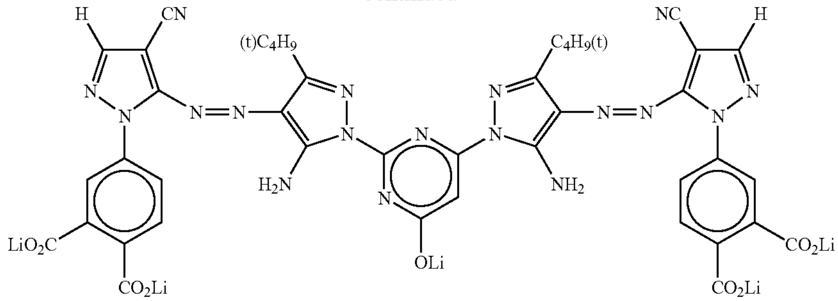
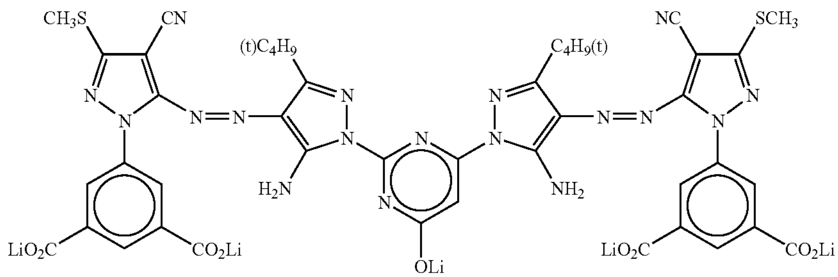
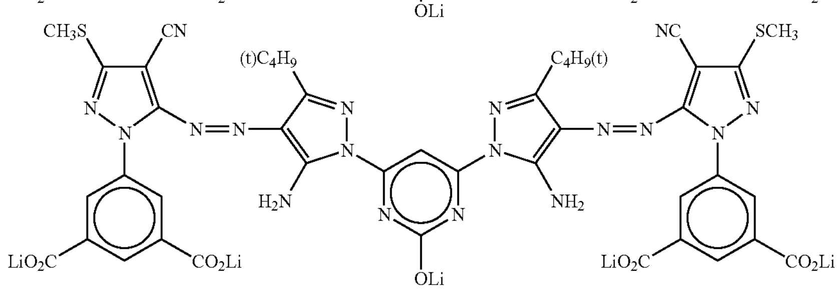
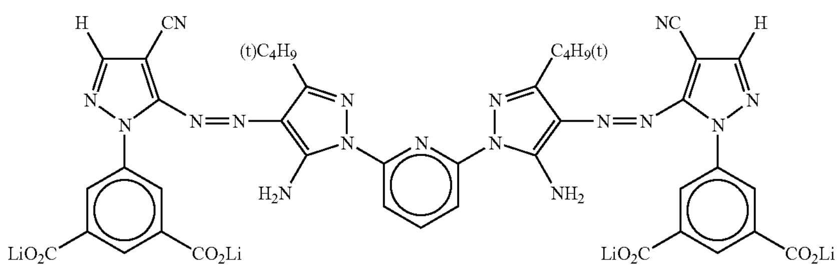
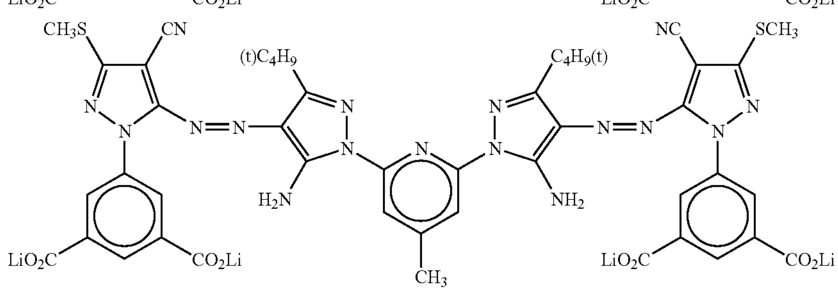
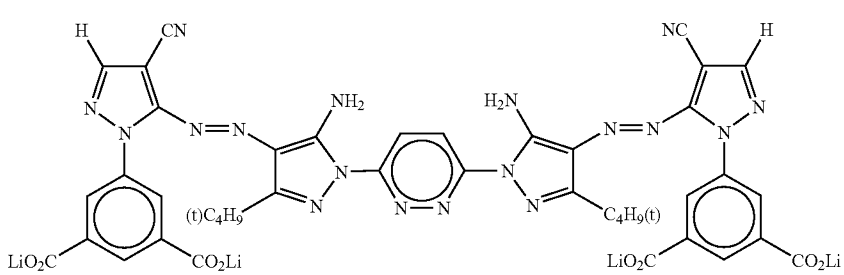

-continued
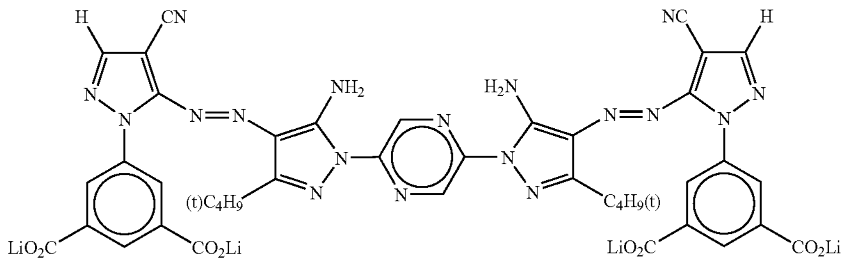
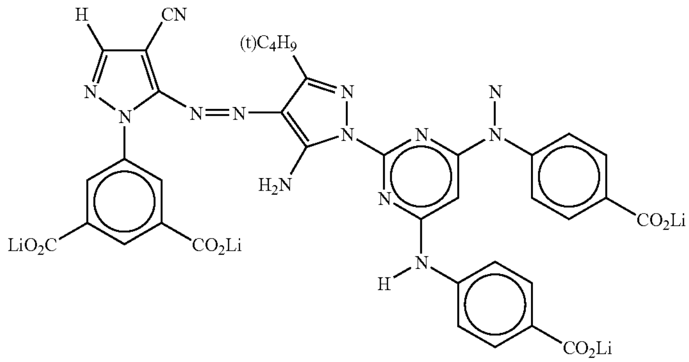
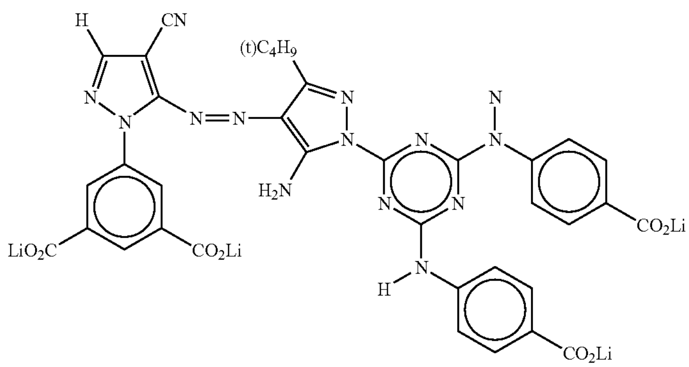
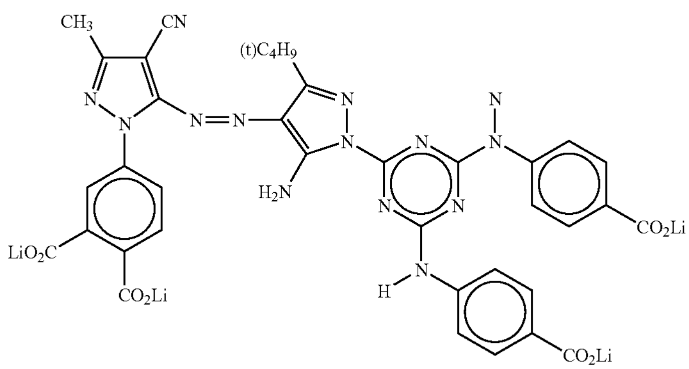
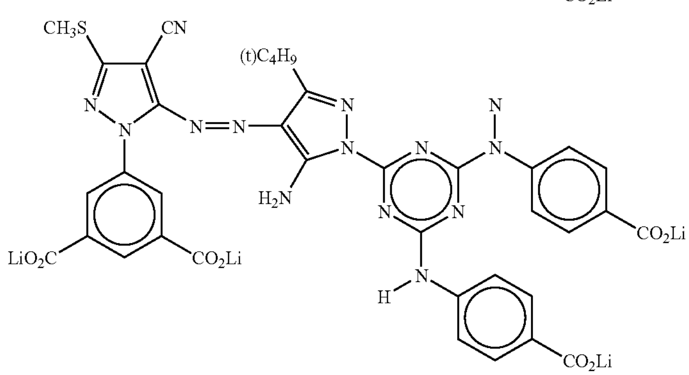

-continued
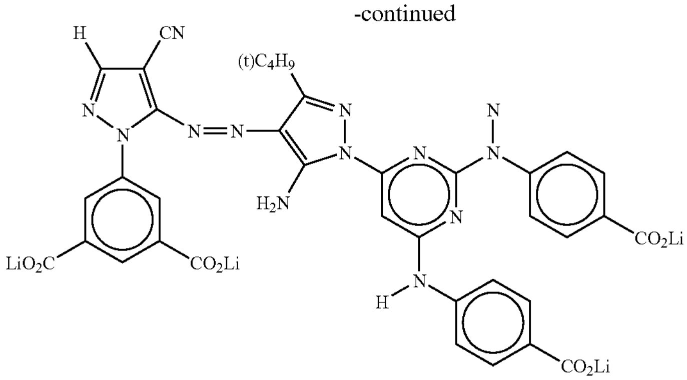
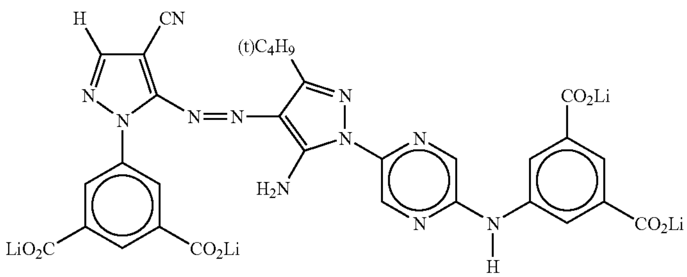
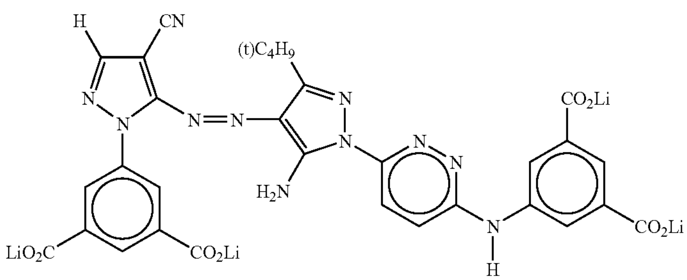
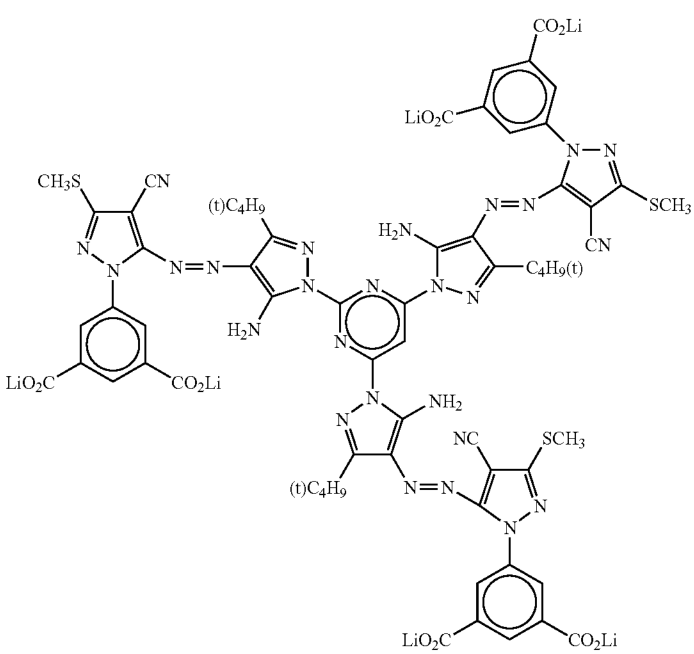

-continued
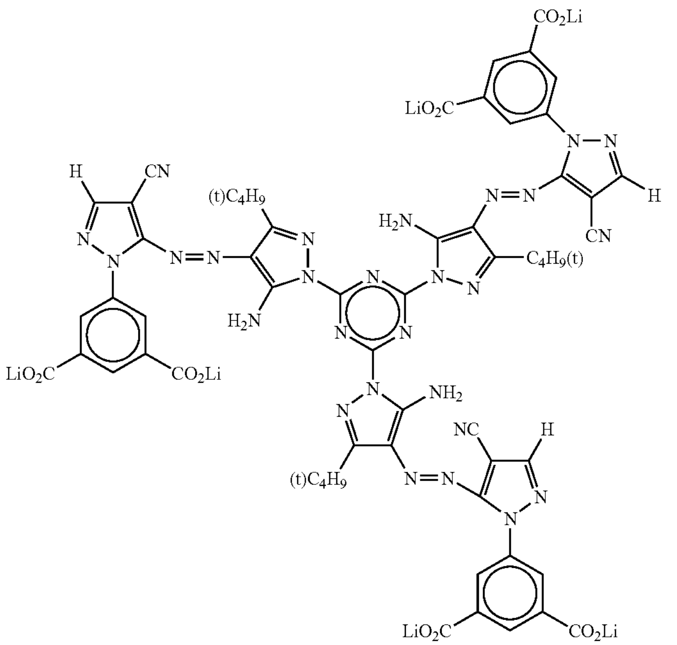
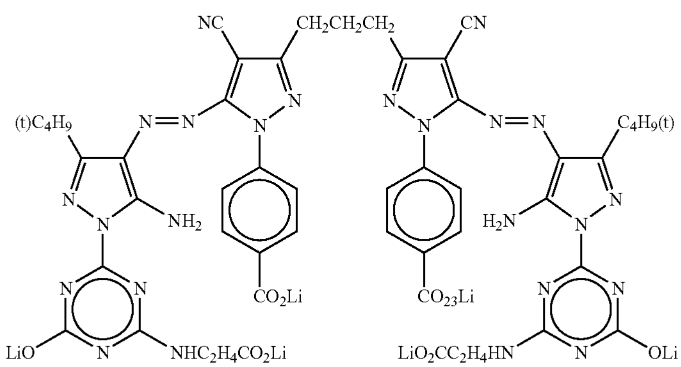
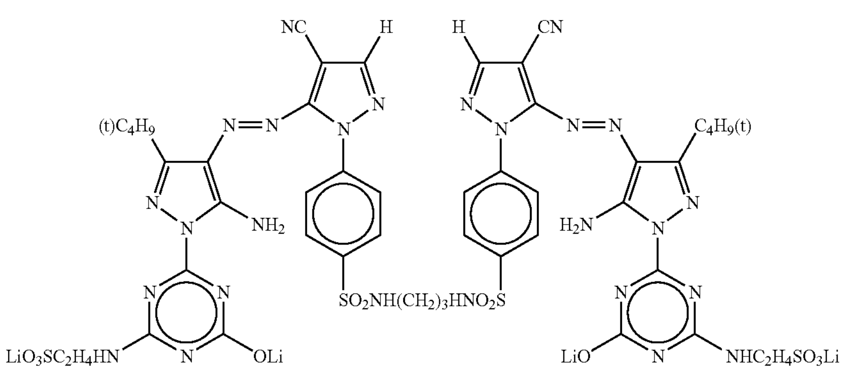

-continued

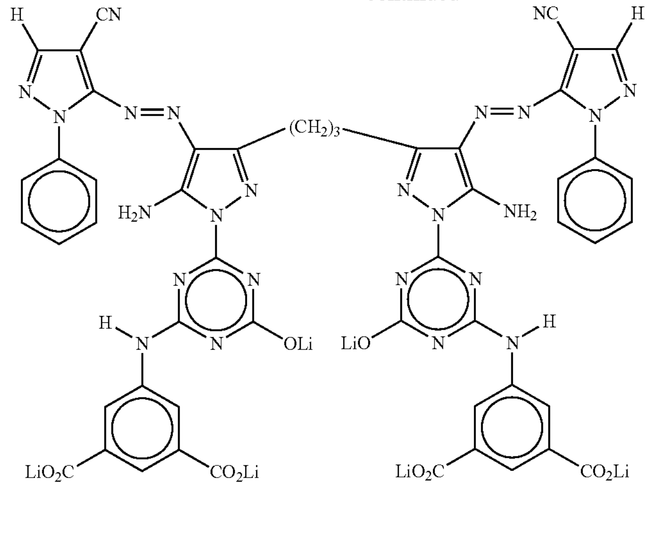

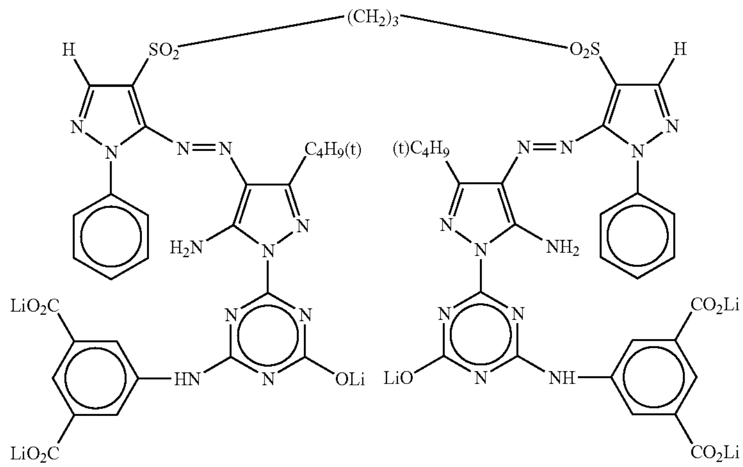

The compounds represented by formulae (Y-I), (Y-1) to (Y-6-I) and (Y-7) to (Y-9) for use in the present invention can be synthesized using the method described, for example, in JP-A-2007-63520.

The colorant used in the magenta ink composition constituting the ink set of the present invention is described below.

In the ink set of the present invention, the colorant used for the magenta ink composition is not limited to the colorant having a specific structure but must satisfy the requirement that the colorant contains at least one ionic hydrophilic group, the counter ion of the ionic hydrophilic group contains a lithium ion, and the lithium ion concentration is 70 mol % or more based on all cations in the magenta ink composition. The lithium ion concentration is preferably 80 mol % or more, more preferably 90 mol %, still more preferably 95 mol %, and the upper limit is preferably 100 mol %.

Also, the difference between the light fastness/ozone fastness of other color ink compositions and the light fastness/ozone fastness of the magenta ink composition is preferably small.

In the present invention, the magenta-based dye used as the colorant in the magenta composition is preferably a compound selected from the group consisting of a compound represented by the following formula (M-1) and a salt thereof.

Formula (M-1):

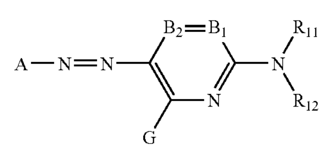

In formula (M-1), A represents a 5-membered heterocyclic group. $B_1$ and $B_2$ each represents —$CR_{13}$= or —$CR_{14}$=, or either one represents a nitrogen atom and the other represents —$CR_{13}$= or —$CR_{14}$=. $R_{11}$ and $R_{12}$ each independently represents a hydrogen, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group. Each group may further have a substituent. G, $R_{13}$ and $R_{14}$ each independently represents a hydrogen, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl, aryl or heterocyclic group, an acylamino group, a ureido group, a sulfamoylamino group, an alkoxycarbonylamino group, an aryloxycarbonylamino group, an alkyl- or aryl-sulfonylamino group, a nitro group, an alkyl- or aryl-thio group, an alkyl- or aryl-sulfonyl group, an alkyl- or aryl-sulfinyl group, a sulfamoyl group, a heterocyclic thio group, or an ionic hydrophilic group. Each group may be further substituted. Also, $R_{13}$ and $R_{11}$, or $R_{11}$ and $R_{12}$ may combine to form a 5- or 6-membered ring. Here, formula (M-1) contains at least one ionic hydrophilic group, and the counter ion of the ionic hydrophilic group contains a lithium ion.

In the present invention, as preferred A in formula (M-1), examples of the heteroatom of the 5-membered heterocycle include N, O and S. A nitrogen-containing 5-membered heterocycle is preferred, and the heterocycle may be condensed with an aliphatic ring, an aromatic ring or another heterocycle. Preferred examples of the heterocycle of A include a pyrazole ring, an imidazole ring, a triazole ring, a thiazole ring, an isothiazole ring, a thiadiazole ring, a benzothiazole ring, a benzoxazole ring and a benzisothiazole ring. Each heterocyclic group may further have a substituent. Above all, heterocycles represented by the following formulae (a) to (i) are preferred.

(a)

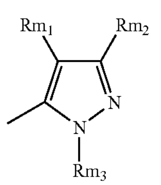

(b)

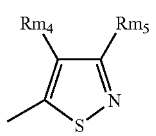

(c)

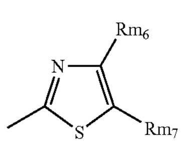

(d)

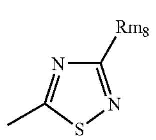

(e)

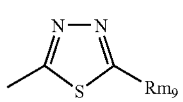

(f)

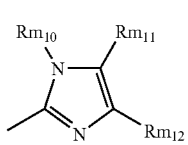

-continued (g)

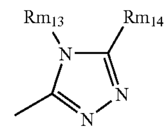

(h)

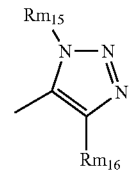

(i)

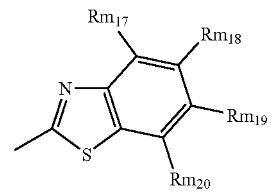

In formulae (a) to (i), $Rm_1$ to $Rm_{20}$ have the same meanings as $R_{13}$ and $R_{14}$ in formula (M-1).

In formula (M-1), $B_1$ and $B_2$ each represents —$CR_{13}$═ or —$CR_{14}$═, or either one represents a nitrogen atom and the other represents —$CR_{13}$═ or —$CR_{14}$═, but the case where $B_1$ and $B_2$ represent —$CR_{13}$═ or —$CR_{14}$═ is preferred in that more excellent performance can be exerted.

In formula (M-1), $R_{11}$ and $R_{12}$ each independently represents preferably a hydrogen, a substituted or unsubstituted cycloalkyl group, a substituted or unsubstituted aryl group, a substituted or unsubstituted heterocyclic group, a substituted or unsubstituted acyl group, a substituted or unsubstituted alkylsulfonyl group, or a substituted or unsubstituted arylsulfonyl group, more preferably a hydrogen, a substituted aryl group, or a substituted heterocyclic group, still more preferably a substituted aryl group, or a substituted heterocyclic group, provided that $R_{11}$ and $R_{12}$ are not a hydrogen at the same time.

In formula (M-1), G is preferably a hydrogen, a halogen atom, an alkyl group, an alkenyl group, an alkynyl group, an aralkyl group, an aryl group, a hydroxy group, an alkoxy group, an aryloxy group, an acyloxy group, a heterocyclic oxy group, an amino group substituted by an alkyl, aryl or heterocyclic group, an acylamino group, a ureido group, a sulfamoylamino group, an alkoxycarbonylamino group, an aryloxycarbonylamino group, an alkyl- or aryl-sulfonylamino group, an alkyl- or aryl-thio group, a heterocyclic thio group or an ionic hydrophilic group. Each group may be further substituted.

G is more preferably a hydrogen, a halogen atom, an alkyl group, a hydroxy group, an alkoxy group, an aryloxy group, an acyloxy group, an amino group substituted by an alkyl, aryl or heterocyclic group, or an acylamino group.

G is still more preferably a hydrogen, an amino group substituted by an aryl or heterocyclic group, or an acylamino group, and most preferably an amino group substituted by an aryl group having a substituent.

In formula (M-1), $R_{13}$ and $R_{14}$ each is independently preferably a hydrogen, an alkyl group, a cyano group, a carboxyl group, a carbamoyl group or an alkoxycarbonyl group. Each group may be further substituted.

More specifically, a hydrogen, an alkyl group, a cyano group or a carboxyl group is preferred; more preferably, $R_{13}$ is a hydrogen and $R_{14}$ is an alkyl group; and it is most preferred that $R_{13}$ is a hydrogen and $R_{14}$ is a methyl group.

As for the preferred combination of substituents of the compound represented by formula (M-1), a compound where at least one of various substituents is the above-described preferred group is preferred, a compound where a larger number of various substituents are the above-described preferred group is more preferred, and a compound where all substituents are the above-described preferred group is most preferred.

In the present invention, among the compounds represented by formula (M-1), a compound represented by the following formula (M-2) is preferred.

Formula (M-2):

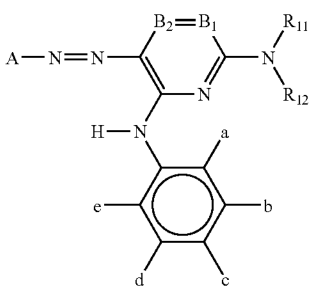

In formula (M-2), A, $B_1$, $B_2$, $R_{11}$ and $R_{12}$ have the same meanings as A, $B_1$, $B_2$, $R_{11}$ and $R_{12}$ in formula (M-1).

a and e each independently represents an alkyl group, an alkoxy group or a halogen atom. When both a and e are an alkyl group, the total number of carbons constituting the alkyl group is 3 or more, and they may be further substituted.

b, c and d each independently has the same meaning as $R_1$ and $R_2$, and a and b, or e and d may be condensed to each other, provided that formula (M-2) has at least one ionic hydrophilic group and the counter ion of the ionic hydrophilic group contains a lithium ion.

In the present invention, A in formula (M-2) has the same meaning as A in formula (M-1), and preferred examples thereof are also the same.

In the present invention, $B_1$ and $B_2$ in formula (M-2) have the same meanings as $B_1$ and $B_2$ in formula (M-1), and preferred examples thereof are also the same.

In the present invention, $R_{11}$ and $R_{12}$ in formula (M-2) have the same meanings as $R_{11}$ and $R_{12}$ in formula (M-1), and preferred examples thereof are also the same.

In the present invention, a and e in formula (M-2) each independently represents an alkyl group, an alkoxy group or a halogen atom. When both a and e are an alkyl group, the total number of carbons constituting the alkyl group is 3 or more, and they may be further substituted.

a and e each is independently preferably a methyl group, an ethyl group or an isopropyl group, more preferably an ethyl group or an isopropyl group, and it is most preferred that both a and b are an ethyl group or an isopropyl group.

b, c and d each independently has the same meaning as $R_{13}$ and $R_{14}$ in formula (M-1), and a and b, or e and d may be condensed to each other, provided that formula (M-2) has at least one ionic hydrophilic group.

c is preferably a hydrogen or an alkyl group, more preferably a hydrogen or a methyl group.

b and d each is preferably a hydrogen or an ionic hydrophilic group, more preferably represents a hydrogen, a sulfo group or a carboxyl group, and it is most preferred that the combination of b and d is a combination of a hydrogen and a sulfo group.

As for the preferred combination of substituents of the compound represented by formula (M-2), a compound where at least one of various substituents is the above-described preferred group is preferred, a compound where a larger number of various substituents are the above-described preferred group is more preferred, and a compound where all substituents are the above-described preferred group is most preferred.

In the present invention, among the compounds represented by formula (M-2), a compound represented by the following formula (M-3) is preferred.

Formula (M-3):

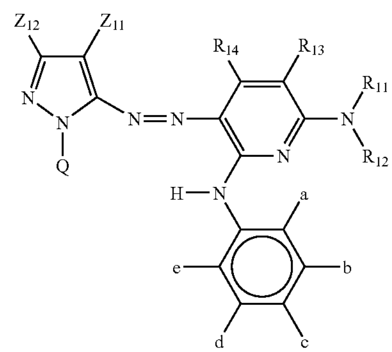

In formula (M-3), $Z_{11}$ represents an electron-withdrawing group having a Hammett's substituent constant σp value of 0.20 or more, $Z_{12}$ represents a hydrogen, an alkyl group, an alkenyl group, an alkynyl group, an aralkyl group, an aromatic group, a heterocyclic group or an acyl group, $R_{11}$, $R_{12}$, $R_{13}$, $R_{14}$, a, b, c, d and e each has the same meaning as in formula (M-2), Q represents a hydrogen, an alkyl group, an alkenyl group, an alkynyl group, an aralkyl group, an aromatic group or a heterocyclic group, and each of the groups represented by $Z_{11}$, $Z_{12}$ and Q may further have a substituent, provided that formula (M-3) has at least one ionic hydrophilic group and the counter ion of the ionic hydrophilic group contains a lithium ion.

In the present invention, A in formula (M-3) has the same meaning as A in formula (M-1), and preferred examples thereof are also the same.

In the present invention, $R_{13}$ and $R_{14}$ in formula (M-3) have the same meanings as $R_{13}$ and $R_{14}$ in formula (M-1), and preferred examples thereof are also the same.

In the present invention, $R_{11}$ and $R_{12}$ in formula (M-3) have the same meanings as $R_{11}$ and $R_{12}$ in formula (M-1), and preferred examples thereof are also the same.

In the present invention, a, b, c, d and e in formula (M-3) have the same meanings as a, b, c, d and e in formula (M-2), and preferred examples thereof are also the same.

In the present invention, the electron-withdrawing group of $Z_{11}$ in formula (M-3) is an electron-withdrawing group having a Hammett's substituent constant σp value of 0.20 or more, preferably 0.30 or more. The upper limit of the σp value is preferably 1.0 or less.

Specific examples of the electron-withdrawing group having a σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, an alkyl halide group, a halogenated alkoxy group, a halogenated aryloxy group, a halogenated alkylamino group, a halogenated alkylthio group, a heterocyclic group, a halogen atom, an azo group, a selenocyanate group and an aryl group substituted by other electron-withdrawing groups having a σp value of 0.20 or more.

$Z_{11}$ is preferably a cyano group, an alkylsulfonyl group, an arylsulfonyl group, a nitro group or a halogen atom, more preferably a cyano group, an alkylsulfonyl group or an arylsulfonyl group, and most preferably a cyano group.

$Z_{12}$ is preferably a hydrogen, an alkyl group, a cycloalkyl group, an aralkyl group, an aryl group, a heterocyclic group or an acyl group, more preferably an alkyl group. Each substituent may be further substituted.

More specifically, the alkyl group as $Z_{12}$ includes an alkyl group having a substituent and an unsubstituted alkyl group. The alkyl group is preferably an alkyl group having a carbon number of 1 to 12, more preferably 1 to 6, excluding carbon atoms of the substituent.

Examples of the substituent include a hydroxyl group, an alkoxy group, a cyano group, a halogen atom and an ionic hydrophilic group.

Examples of the alkyl group include methyl, ethyl, butyl, isopropyl, tert-butyl, hydroxyethyl, methoxyethyl, cyanoethyl, trifluoromethyl, 3-sulfopropyl and 4-sulfobutyl. Of these, methyl, ethyl, isopropyl and tert-butyl are preferred, isopropyl and tert-butyl are more preferred, and tert-butyl is most preferred.

The cycloalkyl group as $Z_{12}$ includes a cycloalkyl group having a substituent and an unsubstituted cycloalkyl group. The cycloalkyl group is preferably a cycloalkyl group having a carbon number of 5 to 12 excluding carbon atoms of the substituent. Examples of the substituent include an ionic hydrophilic group. Examples of the cycloalkyl group include a cyclohexyl group.

The aralkyl group as $Z_{12}$ includes an aralkyl group having a substituent and an unsubstituted aralkyl group. The aralkyl group is preferably an aralkyl group having a carbon number of 7 to 12 excluding carbon atoms of the substituent. Examples of the substituent include an ionic hydrophilic group. Examples of the aralkyl group include a benzyl group and a 2-phenethyl group.

The aryl group as $Z_{12}$ includes an aryl group having a substituent and an unsubstituted aryl group. The aryl group is preferably an aryl group having a carbon number of 6 to 12 excluding carbon atoms of the substituent. Examples of the substituent include an alkyl group, an alkoxy group, a halogen atom, an alkylamino group, an amido group, a carbamoyl group, a sulfamoyl group, a sulfonamido group, a hydroxyl group, an ester group and an ionic hydrophilic group. Examples of the aryl group include phenyl, p-tolyl, p-methoxyphenyl, o-chlorophenyl and m-(3-sulfopropylamino)phenyl.

The heterocyclic group as $Z_{12}$ includes a heterocyclic group having a substituent and an unsubstituted heterocyclic group. The heterocyclic group is preferably a 5- or 6-membered heterocyclic group. Examples of the substituent include an amido group, a carbamoyl group, a sulfamoyl group, a sulfonamido group, a hydroxyl group, an ester group and an ionic hydrophilic group. Examples of the heterocyclic group include 2-pyridyl group, 2-thienyl group, 2-thiazolyl group, 2-benzothiazolyl group and 2-furyl group.

The acyl group as $Z_{12}$ includes an acyl group having a substituent and an unsubstituted acyl group. The acyl group is preferably an acyl group having a carbon number of 1 to 12 excluding carbon atoms of the substituent. Examples of the substituent include an ionic hydrophilic group. Examples of the acyl group include an acetyl group and a benzoyl group.

In the present invention, Q in formula (M-3) represents a hydrogen, an alkyl group, an alkenyl group, an alkynyl group, an aralkyl group, an aromatic group or a heterocyclic group. These substituents may be further substituted. Details of these substituents are the same as those of $R_{13}$ and $R_{14}$.

Q is preferably an aryl group or heterocyclic group substituted by an electron-withdrawing group. The electron-withdrawing group as the substituent of Q is an electron-withdrawing group having a Hammett's substituent constant σp value of 0.20 or more, preferably 0.30 or more. The upper limit of the σp value is preferably 1.0 or less.

Specific examples of the electron-withdrawing group having a σp value of 0.20 or more are the same as those of $Z_{11}$ in formula (M-3).

More specifically, Q is preferably a heterocyclic group substituted by an electron-withdrawing group, more preferably a sulfo group, a substituted or unsubstituted carbamoyl group, or a benzoxazole or benzothiazole ring substituted by a substituted or unsubstituted sulfamoyl group, and most preferably a sulfo group or a benzothiazole ring substituted by a substituted sulfamoyl group.

As for the preferred combination of substituents of the compound represented by formula (M-3), a compound where at least one of various substituents is the above-described preferred group is preferred, a compound where a larger number of various substituents are the above-described preferred group is more preferred, and a compound where all substituents are the above-described preferred group is most preferred.

Particularly preferred combinations of the compound represented by formula (M-1) for use in the present invention are those including the following (A) to (D).

(A) Preferred examples of the heterocycle of A include a pyrazole ring, an imidazole ring, a triazole ring, a thiazole ring, an isothiazole ring, a thiadiazole ring, a benzothiazole ring, a benzoxazole ring and a benzisothiazole ring. A pyrazole ring, an imidazole ring, a triazole ring, a thiazole ring, an isothiazole ring and a thiadiazole ring are more preferred, a pyrazole ring, a triazole ring, a thiazole ring, an isothiazole ring and a thiadiazole ring are still more preferred, and a pyrazole ring is most preferred.

(B) $B_1$ and $B_2$ each represents $—CR_{13}=$ or $—CR_{14}=$, or either one represents a nitrogen atom and the other represents $—CR_{13}=$ or $—CR_{14}=$. Preferably, $B_1$ and $B_2$ each is $—CR_{13}=$ or $—CR_{14}=$; more preferably, $R_{13}$ is a hydrogen ($B_1$ is an unsubstituted carbon atom) and $R_{14}$ is a hydrogen or an alkyl group ($B_2$ is an unsubstituted carbon atom or a carbon atom substituted by an alkyl group); and most preferably, $R_{13}$ is a hydrogen ($B_1$ is an unsubstituted carbon atom) and $R_{14}$ is a methyl group ($B_2$ is a carbon atom substituted by a methyl group).

(C) $R_{11}$ and $R_{12}$ each is independently preferably a hydrogen, a substituted or unsubstituted cycloalkyl group, a substituted or unsubstituted aryl group, a substituted or unsubstituted heterocyclic group, a substituted or unsubstituted acyl group, a substituted or unsubstituted alkylsulfonyl group, or a substituted or unsubstituted arylsulfonyl group, more preferably a hydrogen, a substituted aryl group or a substituted heterocyclic group, still more preferably a substituted aryl group or a substituted heterocyclic group, and most preferably an aryl group substituted by a sulfo group or a heterocyclic group substituted by a sulfo group.

(D) G is preferably a hydrogen, a halogen atom, an alkyl group, an alkenyl group, an alkynyl group, an aralkyl group, an aryl group, a hydroxy group, an alkoxy group, an aryloxy group, an acyloxy group, a heterocyclic oxy group, an amino group substituted by an alkyl, aryl or heterocyclic group, an acylamino group, a ureido group, a sulfamoylamino group, an alkoxycarbonylamino group, an aryloxycarbonylamino group, an alkyl- or aryl-sulfonylamino group, an alkyl- or aryl-thio group, a heterocyclic thio group or an ionic hydrophilic group, more preferably a hydrogen, a halogen atom, an alkyl group, a hydroxy group, an alkoxy group, an aryloxy group, an acyloxy group, an amino group substituted by an alkyl, aryl or heterocyclic group, or an acylamino group, still more preferably a hydrogen, an amino group substituted by an aryl or heterocyclic group, or an acylamino group, and most preferably an amino group substituted by an aryl group having a substituent.

Above all, formula (M-1) is preferably formula (M-2).

Particularly preferred combinations of the compound represented by formula (M-2) for use in the present invention are those including the following (A) to (D).

(A) Examples of the heterocycle of A are the same as those of A in formula (M-1), and preferred examples thereof are also the same.

(B) $B_1$ and $B_2$ have the same meanings as $B_1$ and $B_2$ in formula (M-1), and preferred examples thereof are also the same.

(C) $R_{11}$ and $R_{12}$ have the same meanings as $R_{11}$ and $R_{12}$ in formula (M-1), and preferred examples thereof are also the same.

(D) a and e each is preferably an alkyl group or a halogen atom, and when both a and e are an alkyl group, it is preferred that the alkyl group is an unsubstituted alkyl group, the sum of carbon numbers of a and e is 3 or more (preferably 5 or less), and a, b, c and d each is a hydrogen, a halogen atom, an alkyl group or an ionic hydrophilic group (preferably a hydrogen, an alkyl group having a carbon number of 1 to 4, or an ionic hydrophilic group). a and e each is independently more preferably a methyl group, an ethyl group or an isopropyl group, still more preferably an ethyl group or an isopropyl group, and it is most preferred that both a and b are an ethyl group or an isopropyl group. Furthermore, c is preferably a hydrogen or an alkyl group, more preferably a hydrogen or a methyl group. b and d each is preferably a hydrogen or an ionic hydrophilic group, more preferably a hydrogen, a sulfo group or a carboxy group, and it is most preferred that the combination of b and d is a combination of a hydrogen and a sulfo group.

Formula (M-2) is preferably formula (M-3).

Particularly preferred combinations of the compound represented by formula (M-3) for use in the present invention are those including the following (A) to (F).

(A) $Z_{11}$ is an electron-withdrawing group having a Hammett's substituent constant σp value of 0.20 or more, preferably 0.30 or more. The upper limit of the σp value is preferably 1.0 or less. $Z_{11}$ is more preferably a cyano group, an alkylsulfonyl group, an arylsulfonyl group, a nitro group or a halogen atom, still more preferably a cyano group, an alkylsulfonyl group or an arylsulfonyl group, and most preferably a cyano group.

(B) $Z_{12}$ is preferably a hydrogen, an alkyl group, a cycloalkyl group, an aralkyl group, an aryl group, a heterocyclic group or an acyl group, more preferably an alkyl group. Each substituent may be further substituted. More specifically, the alkyl group as $Z_{12}$ includes an alkyl group having a substituent and an unsubstituted alkyl group. The alkyl group is preferably an alkyl group having a carbon number of 1 to 12, more preferably from 1 to 6, excluding carbon atoms of the substituent. Examples of the substituent include a hydroxyl group, an alkoxy group, a cyano group, a halogen atom and an ionic hydrophilic group. Of these, methyl, ethyl, butyl, isopropyl, tert-butyl, hydroxyethyl, methoxyethyl, cyanoethyl, trifluoromethyl, 3-sulfopropyl and 4-sulfobutyl are preferred, isopropyl and tert-butyl are more preferred, and tert-butyl is most preferred.

(C) Q represents a hydrogen, an alkyl group, an alkenyl group, an alkynyl group, an aralkyl group, an aromatic group or a heterocyclic group. Each of these substituents may be further substituted. Furthermore, Q is preferably an aryl group or heterocyclic group substituted by an electron-withdrawing group. The electron-withdrawing group as the substituent of Q is an electron-withdrawing group having a Hammett's substituent constant σp value of 0.20 or more, preferably 0.30 or more. The upper limit of the σp value is preferably 1.0 or less. More specifically, Q is preferably a heterocyclic group substituted by an electron-withdrawing group, more preferably a sulfo group, a substituted or unsubstituted carbamoyl group, or a benzoxazole or benzothiazole ring substituted by a substituted or unsubstituted sulfamoyl group, and most preferably a sulfo group or a benzothiazole ring substituted by a substituted sulfamoyl group.

(D) a, b, c, d and e have the same meanings as a, b, c, d and e in formula (M-2), and preferred examples thereof are also the same.

(E) $R_{13}$ and $R_{14}$ have the same meanings as $R_{13}$ and $R_{14}$ in formula (M-2), and preferred examples thereof are also the same.

(F) $R_{11}$ and $R_{12}$ have the same meanings as $R_{11}$ and $R_{12}$ in formula (M-2), and preferred examples thereof are also the same.

Each of the compounds (azo dyes) represented by formulae (M-1), (M-2) and (M-3) has at least one (preferably from 3 to 6) ionic hydrophilic group in the molecule. Examples of the ionic hydrophilic group include a sulfo group, a carboxyl group, a phosphono group and a quaternary ammonium group. The ionic hydrophilic group is preferably a carboxyl group, a phosphono group or a sulfo group, more preferably a carboxyl group or a sulfo group. In particular, it is most preferred that at least one ionic hydrophilic group is a sulfo group. The carboxyl group, phosphono group and sulfo group may be in a salt state. Examples of the counter ion forming the salt include a lithium ion and an ammonium ion, alkali metal ion (e.g., sodium ion, potassium ion) or organic cation (e.g., tetramethylammonium ion, tetramethylguanidium ion, tetramethylphosphonium ion) mixed salt mainly composed of a lithium ion. Among the counter ions, a lithium ion and an alkali metal mixed salt mainly composed of a lithium ion are preferred, a lithium ion and a potassium or sodium ion mixed salt mainly composed of a lithium ion are more preferred, and a lithium ion is most preferred. From the standpoint of enhancing the solubility and suppressing the bronzing in ink-jet printing, a combination where the ionic hydrophilic group is a sulfo group and its counter ion is a lithium ion, is most preferred.

The azo dye preferably has from 3 to 6 ionic hydrophilic groups, more preferably from 3 to 6 sulfo groups, still more preferably from 3 to 5 sulfo groups, in the molecule.

The magenta ink composition for use in the present invention contains at least one of the compounds represented by formulae (M-1), (M-2) and (M-3) and salts thereof, as the colorant.

In the ink set of the present invention, a dark magenta ink composition and a light magenta ink composition can be contained as the magenta ink composition. In the case of containing both a dark magenta ink composition and a light magenta ink composition, at least one of these two compositions preferably contains the dye of formula (M-1), (M-2) or (M-3) as the colorant, and it is more preferred that the light magenta ink composition contains the dye of formula (M-1), (M-2) or (M-3) as the colorant. The light fastness and ozone fastness of the light magenta ink composition are enhanced, whereby the light fastness and ozone fastness of the image on the entire recorded material can be enhanced. Most preferably, both the dark magenta ink composition and the light magenta ink composition contain the dye of formula (M-1), (M-2) or (M-3) as the colorant.

In the ink set of the present invention, the concentration of the dye in the magenta ink composition can be arbitrarily determined based on the color value of the dye of formula (M-1), (M-2) or (M-3) used. In the case of containing only one magenta ink composition in the ink set, in general, the colorant selected from the dyes of formulae (M-1), (M-2) and (M-3) is preferably contained in a total amount of 2.0 to 12.0 wt %, more preferably from 2.5 to 10.0 wt %, still more preferably from 3.0 to 7.0 wt %, yet still more preferably from 3.0 to 5.0 wt %, based on the total weight of the magenta ink composition.

When the dye concentration is 2.0 wt % or more, sufficient colorability as an ink can be ensured, and when the dye concentration is 12 wt % or less, this makes it easy for an ink composition used in an inkjet recording method to, for example, ensure ejectability from a nozzle or prevent clogging of a nozzle.

In the case of containing a dark magenta ink composition and a light magenta ink composition in the ink set, the dye concentration in the light magenta ink composition can be arbitrarily determined based on the color value of the dye of formula (M-1), (M-2) or (M-3) used as the colorant, but in general, the colorant selected from the dyes of formulae (M-1), (M-2) and (M-3) is preferably contained in a total amount of 0.5 to 5.0 wt %, more preferably from 0.5 to 3.0 wt %, still more preferably from 1.0 to 3.0 wt %, based on the total weight of the light magenta ink composition.

When the dye concentration is 0.5 wt % or more, colorability required as a light magenta ink composition can be ensured, and when the dye concentration is 5.0 wt % or less, the granular texture on an image of a recorded material recorded using the light magenta ink composition can be reduced or prevented.

In the case of containing a dark magenta ink composition and a light magenta ink composition in the ink set, the ratio between the content (wt %) of the colorant contained in the light magenta ink composition and the content (wt %) of the colorant contained in the dark magenta ink composition is preferably from 1:2 to 1:8, more preferably from 1:2 to 1:5, still more preferably from 1:2 to 1:3.

By constituting the contents of colorants in such a ratio, the granular texture of an image recorded using these ink compositions can be reduced. Also, when an ink composition is prepared to satisfy this ratio of colorants and at the same time, have a colorant concentration falling in the range above, good color balance can be realized between the dark magenta ink composition and the light magenta ink composition and moreover, the inkjet nozzle can be prevented from clogging.

In the ink set of the present invention, the content of the colorant selected from the group consisting of compounds represented by formulae (M-1), (M-2) and (M-3) and salts thereof, in the magenta ink composition, the dark magenta ink composition or the light magenta ink composition, is determined according to the kind of each substituent in formulae (M-1), (M-2) and (M-3), the kind of solvent component, and the like, but the total amount of all colorants contained in the ink composition, including at least one dye selected from the compounds of formulae (M-1), (M-2) and (M-3) and salts thereof and contained in the ink composition, is preferably from 0.1 to 10.0 wt %, more preferably from 0.5 to 8.0 wt %, most preferably from 0.5 to 5.0 wt %, based on the total weight of the ink composition.

When the amount of the colorant in the ink composition is 0.1 wt % or more, colorability or image density on a recording medium can be ensured, and when it is 10 wt % or less, adjusting the viscosity of the ink composition is facilitated and ejection reliability or properties such as clogging resistance can be easily ensured.

In the present invention, the mol number per ink unit weight of the lithium ion contained in the magenta ink composition can be arbitrarily determined according to the molecular weight of the compound (dye) used as the colorant, the number of ionic hydrophilic groups and the solid content concentration adopted, but the lithium ion is preferably contained in an amount of $2.0\times10^{-6}$ to $1.0\times10^{-3}$ mol/g, more preferably from $3.0\times10^{-6}$ to $8.0\times10^{-4}$ mol/g, still more preferably from $2.0\times10^{-5}$ to $6.0\times10^{-4}$ mol/g, and most preferably from $3.0\times10^{-5}$ to $6.0\times10^{-4}$ mol/g.

In addition, examples of the magenta-based dye that is used in combination with the dye selected from the group consisting of the compounds represented by formulae (M-1), (M-2) and (M-3) and salts thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247, C.I. Direct Violet 7, 9, 47, 48, 51, 66, 90, 93, 94, 95, 98, 100 and 101, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397, C.I. Acid Violet 5, 34, 43, 47, 48, 90, 103 and 126, C.I. Reactive Red 3, 13, 17, 19, 21, 22, 23, 24, 29, 35, 37, 40, 41, 43, 45, 49 and 55, C.I. Reactive Violet 1, 3, 4, 5, 6, 7, 8, 9, 16, 17, 22, 23, 24, 26, 27, 33 and 34, C.I. Basic Red 12, 13, 14, 15, 18, 22, 23, 24, 25, 27, 29, 35, 36, 38, 39, 45 and 46, and C.I. Basic Violet 1, 2, 3, 7, 10, 15, 16, 20, 21, 25, 27, 28, 35, 37, 39, 40 and 48. Other examples include a heteryl- or aryl-azo dye (compound represented by formula (M-11)) having, for example, phenols, naphthols, anilines, heterocycles (e.g., pyrazine) or open-chain-type active methylene compounds as the coupling component (hereinafter referred to as a "coupler component"); an azomethine dye having, for example, open-chain-type active methylene compounds as the coupler component; and an anthrapyridone dye (formula (M-12)) (for example, Compound No. 20 in Table 1 of US 2004/0239739A1, and Compound (13) in International Publication No. 04/104108, pamphlet).

The compound represented by formula (M-11) is a compound represented by the following formula (M-11):

Formula (M-11):

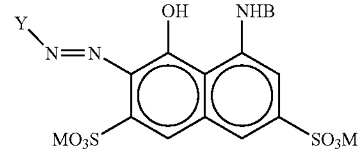

[In formula (M-11), Y represents a phenyl group or naphthyl group substituted by a $C_1$-$C_4$ alkyl group, an alkoxy group, OH, $SO_3H$ or COOM; B represents H or the following formula:

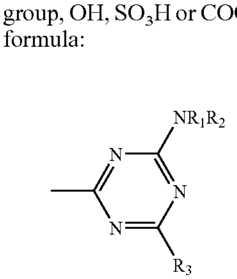

(wherein $R_1$ represents H or a $C_1$-$C_4$ alkyl group substituted by OH or COOH, and $R_2$ represents a $C_1$-$C_4$ alkyl group substituted by OH, $OCH_3$, $OC_2H_5$, $SO_3M$ or COOM), and M represents H, Li, Na, K, ammonium or organic amines].

The compound represented by formula (M-12) is a compound represented by the following formula (M-12):

Formula (M-12):

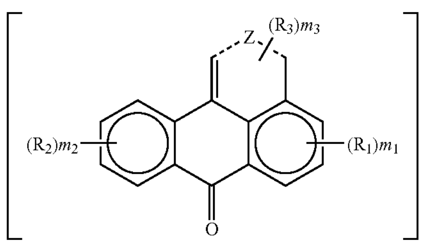

[In formula (M-12), Z represents a nonmetallic atom group necessary to complete a nitrogen-containing 5- or 6-membered heterocycle; $R_1$, $R_2$ and $R_3$ each independently represents a substituent, and these substituents may further have a substituent; $m_1$ represents an integer of 0 to 3, $m_2$ represents an integer of 0 to 4, and $m_3$ represents an integer of 0 to 2, provided that $m_1$, $m_2$ and $m_3$ are not 0 at the same time; when $m_1$ is 2 or more, the plurality of $R_1$'s may be the same or different; when $m_2$ is 2 or more, the plurality of $R_2$'s may be the same or different; when $m_3$ is 2 or more, the plurality of $R_3$'s may be the same or different; n represents an integer of 1 to 4; and when n is 2 or more, the dye mother nucleus may form a dimer, a trimer or a tetramer through $R_1$, $R_2$ or $R_3$.]

The compounds represented by formulae (M-1) to (M-12) for use in the present invention can be synthesized using the method described, for example, in JP-A-2007-63520.

The colorant used in the cyan ink composition constituting the ink set of the present invention is described below.

In the ink set of the present invention, the colorant used for the cyan ink composition is not limited to the colorant having a specific structure but must satisfy the requirement that the colorant contains at least one ionic hydrophilic group, the counter ion of the ionic hydrophilic group contains a lithium ion, and the lithium ion concentration is 70 mol % or more based on all cations in the cyan ink composition. The lithium ion concentration is preferably 80 mol % or more, more preferably 90 mol %, still more preferably 95 mol %, and the upper limit is preferably 100 mol %.

Also, the difference between the light fastness/ozone fastness of other color ink compositions and the light fastness/ozone fastness of the magenta ink composition is preferably small. The difference between the light fastness/ozone fastness of other color ink compositions and the light fastness/ozone fastness of the cyan ink composition is preferably small.

In the present invention, the cyan-based dye used as the colorant in the cyan composition is a compound selected from the group consisting of a phthalocyanine compound represented by the following formula (C-1) and a salt thereof.

Formula (C-1):

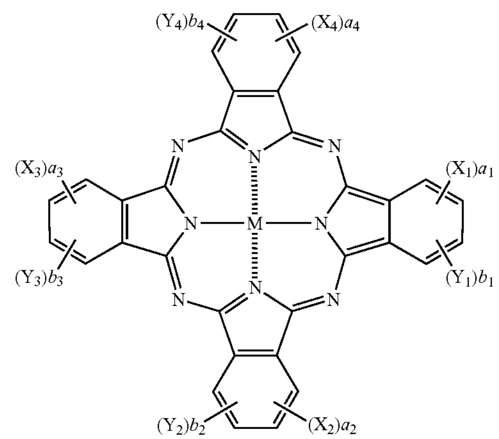

In formula (C-1), $X_1$, $X_2$, $X_3$ and $X_4$ each independently represents any of —SO—Z, —$SO_2$—Z, —$SO_2NV_1V_2$, —$CO_2NV_1V_2$, —$CO_2Z$, —CO—Z and a sulfo group. Here, each Z independently represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and $V_1$ and $V_2$, which may be the same or different, each represent a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

$Y_1$, $Y_2$, $Y_3$ and $Y_4$ each independently represents a hydrogen, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group. Each group may further have a substituent.

The {$a_1$ to $a_4$} and {$b_1$ to $b_4$} represent the number of substituents {$X_1$ to $X_4$} and the number of substituents {$Y_1$ to $Y_4$}, respectively. $a_1$ to $a_4$ each independently represents an integer of 0 to 4, provided that all of $a_1$ to $a_4$ are not 0 at the same time, and $b_1$ to $b_4$ each independently represents an integer of 0 to 4.

M represents a hydrogen, a metal atom or an oxide, hydroxide or halide thereof, provided that at least one of $X_1$, $X_2$, $X_3$, $X_4$, $Y_1$, $Y_2$, $Y_3$ and $Y_4$ is an ionic hydrophilic group or a group having an ionic hydrophilic group as the substituent and the counter ion of the ionic hydrophilic group is a lithium salt.

In the present invention, in formula (C-1), it is preferred that $a_1$, $a_2$, $a_3$ and $a_4$ each is 0 or 1, two or more of $a_1$, $a_2$, $a_3$ and $a_4$ are 1, and $b_1$, $b_2$, $b_3$ and $b_4$ are integers giving a sum total of 4 with $a_1$, $a_2$, $a_3$ and $a_4$, respectively.

As described above, in formula (C-1), $X_1$, $X_2$, $X_3$ and $X_4$ each independently represents any of —SO—Z, —$SO_2$—Z, —$SO_2NV_1V_2$, —$CO_2NV_1V_2$, —$CO_2Z$, —CO—Z, and a sulfo group.

Z, which may be the same or different, represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group and is preferably a substituted or unsubstituted alkyl group, a substituted or unsubstituted aryl group, or a substituted or unsubstituted heterocyclic group, more preferably a substituted alkyl group, a substituted aryl group or a substituted heterocyclic group, and most preferably a substituted alkyl group.

$V_1$ and $V_2$, which may be the same or different, each represents a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group and is preferably a hydrogen, a substituted or unsubstituted alkyl group, a substituted or unsubstituted aryl group, or a substituted or unsubstituted heterocyclic group, and most preferably a hydrogen, a substituted alkyl group, a substituted aryl group or a substituted heterocyclic group.

Z, $V_1$ and $V_2$ may further have a substituent. Examples of the substituent that Z, $V_1$ and $V_2$ may independently have include a halogen atom (e.g., chlorine, bromine); a linear or branched alkyl group having a carbon number of 1 to 12, an aralkyl group having a carbon number of 7 to 18, an alkenyl group having a carbon number of 2 to 12, a linear or branched alkynyl group having a carbon number of 2 to 12, a cycloalkyl group having a carbon number of 3 to 12, which may have a side chain, a cycloalkenyl group having a carbon number of 3 to 12, which may have a side chain (as for these groups, e.g., methyl, ethyl, propyl, isopropyl, tert-butyl, 2-methanesulfonylethyl, 3-phenoxypropyl, trifluoromethyl, cyclopentyl); an aryl group (e.g., phenyl, 4-tert-butylphenyl, 2,4-di-tert-amylphenyl); a heterocyclic group (e.g., imidazolyl, pyrazolyl, triazolyl, 2-furyl, 2-thienyl, 2-pyrimidinyl, 2-benzothiazolyl); an alkyloxy group (e.g., methoxy, ethoxy, 2-methoxyethoxy, 2-methanesulfonylethoxy); an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl); an acylamino group (e.g., acetamido, benzamido, 4-(3-tert-butyl-4-hydroxyphenoxy)butanamido); an alkylamino group (e.g., methylamino, butylamino, diethylamino, methylbutylamino); an anilino group (e.g., phenylamino, 2-chloroanilino); a ureido group (e.g., phenylureido, methylureido, N,N-dibutylureido); a sulfamoylamino group (e.g., N,N-dipropylsulfamoylamino); an alkylthio group (e.g., methylthio, octylthio, 2-phenoxyethylthio); an arylthio group (e.g., phenylthio, 2-butoxy-5-tert-octylphenylthio, 2-carboxyphenylthio); an alkyloxycarbonylamino group (e.g., methoxycarbonylamino); a sulfonamido group (e.g., methanesulfonamido, benzenesulfonamido, p-toluenesulfonamido, octadecane); a carbamoyl group (e.g., N-ethylcarbamoyl, N,N-dibutylcarbamoyl); a sulfamoyl group (e.g., N-ethylsulfamoyl, N,N-dipropylsulfamoyl, N,N-diethylsulfamoyl); a sulfonyl group (e.g., methanesulfonyl, octanesulfonyl, benzenesulfonyl, toluenesulfonyl); an alkyloxycarbonyl group (e.g., methoxycarbonyl, butyloxycarbonyl); a heterocyclic oxy group (e.g., 1-phenyltetrazol-5-oxy, 2-tetrahydropyranyloxy); an azo group (e.g., phenylazo, 4-methoxyphenylazo, 4-pivaloylaminophenylazo, 2-hydroxy-4-propanoylphenylazo); an acyloxy group (e.g., acetoxy); a carbamoyloxy group (e.g., N-methylcarbamoyloxy, N-phenylcarbamoyloxy); a silyloxy group (e.g., trimethylsilyloxy, dibutylmethylsilyloxy); an aryloxycarbonylamino group (e.g., phenoxycarbonylamino); an imido group (e.g., N-succinimido, N-phthalimido); a heterocyclic thio group (e.g., 2-benzothiazolylthio, 2,4-di-phenoxy-1,3,5-triazole-6-thio, 2-pyridylthio); a sulfinyl group (e.g., 3-phenoxypropylsulfinyl); a phosphonyl group (e.g., phenoxyphosphonyl, octyloxyphosphonyl, phenylphosphonyl); an aryloxycarbonyl group (e.g., phenoxycarbonyl); an acyl group (e.g., acetyl, 3-phenylpropanoyl, benzoyl); an ionic hydrophilic group (e.g., carboxyl, sulfo, quaternary ammonium salt); a cyano group; a hydroxy group; a nitro group; and an amino group.

The substituted or unsubstituted alkyl group represented by Z, $V_1$ and $V_2$ is preferably an alkyl group having a carbon number of 1 to 30 and for the reason of enhancing the solubility of dye and the stability of ink, the alkyl group is more preferably a branched alkyl group, still more preferably an alkyl group having an asymmetric carbon (use in a racemic form). Examples of the substituent include substituents that formula (I) may have. Of these, a hydroxyl group, an ether group, an ester group, a cyano group, an amino group, an amido group and a sulfonamido group are preferred, because the associating property of dye is increased and the fastness is enhanced. In addition, the substituent may be a halogen atom or an ionic hydrophilic group.

The substituted or unsubstituted cycloalkyl group represented by Z, $V_1$ and $V_2$ is preferably a cycloalkyl group having a carbon number of 5 to 30 and for the reason of enhancing the solubility of dye and the stability of ink, more preferably a cycloalkyl group having an asymmetric carbon (use in a racemic form). Examples of the substituent include substituents that formula (C-1) may have. Of these, a hydroxyl group, an ether group, an ester group, a cyano group, an amino group, an amido group and a sulfonamido group are preferred, because the associating property of dye is increased and the fastness is enhanced. In addition, the substituent may be a halogen atom or an ionic hydrophilic group.

The substituted or unsubstituted alkenyl group represented by Z, $V_1$ and $V_2$ is preferably an alkenyl group having a carbon number of 2 to 30 and for the reason of enhancing the solubility of dye and the stability of ink, more preferably a branched alkenyl group, still more preferably an alkenyl group having an asymmetric carbon (use in a racemic form). Examples of the substituent include substituents that formula (I) may have. Of these, a hydroxyl group, an ether group, an ester group, a cyano group, an amino group, an amido group and a sulfonamido group are preferred, because the associating property of dye is increased and the fastness is enhanced. In addition, the substituent may be a halogen atom or an ionic hydrophilic group.

The substituted or unsubstituted alkynyl group represented by Z, $V_1$ and $V_2$ is preferably an alkynyl group having a carbon number of 2 to 30 and for the reason of enhancing the solubility of dye and the stability of ink, more preferably a branched alkynyl group, still more preferably an alkynyl group having an asymmetric carbon (use in a racemic form). Examples of the substituent include substituents that formula (C-1) may have. Of these, a hydroxyl group, an ether group, an ester group, a cyano group, an amino group, an amido group and a sulfonamido group are preferred, because the associating property of dye is increased and the fastness is enhanced. In addition, the substituent may be a halogen atom or an ionic hydrophilic group.

The substituted or unsubstituted aralkyl group represented by Z, $V_1$ and $V_2$ is preferably an aralkyl group having a carbon number of 7 to 30 and for the reason of enhancing the solubility of dye and the stability of ink, more preferably a branched aralkyl group, still more preferably an aralkyl group having an asymmetric carbon (use in a racemic form). Examples of the substituent include substituents that formula (C-1) may have. Of these, a hydroxyl group, an ether group, an ester group, a cyano group, an amino group, an amido group and a sulfonamido group are preferred, because the associating property of dye is increased and the fastness is enhanced. In addition, the substituent may be a halogen atom or an ionic hydrophilic group.

The substituted or unsubstituted aryl group represented by Z, $V_1$ and $V_2$ is preferably an aryl group having a carbon number of 6 to 30. Examples of the substituent include substituents that formula (I) may have. Of these, an electron-withdrawing group is preferred, because the oxidation potential of dye is made noble and the fastness is enhanced.

The heterocyclic group represented by Z, $V_1$ and $V_2$ is preferably a 5- or 6-membered ring, which may be further ring-condensed, and the heterocyclic group may be an aromatic heterocycle or a non-aromatic heterocycle. Examples of the heterocyclic group represented by Z, $V_1$ and $V_2$ are described below by omitting the substitution position. The substitution position is not limited and, for example, pyridine can be substituted at the 2-, 3- or 4-position. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. Above all, an aromatic heterocyclic group is preferred, and preferred examples thereof include, as illustrated in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These may have a substituent, and examples of the substituent include substituents that formula (I) may have. Preferred substituents are the same as substituents of the aryl group, and more preferred substituents are the same as more preferred substituents of the aryl group.

The phthalocyanine dye for use in the present invention has at least one ionic hydrophilic group. Examples of the ionic hydrophilic group include a sulfo group, a carboxyl group, a phosphono group and a quaternary ammonium group. The ionic hydrophilic group is preferably a carboxyl group, a phosphono group or a sulfo group, more preferably a carboxyl group or a sulfo group. The carboxyl group, phosphono group and sulfo group may be in a salt state. Examples of the counter ion forming the salt include a lithium ion and an ammonium ion, alkali metal ion (e.g., lithium ion, sodium ion, potassium ion) or organic cation (e.g., tetramethylammonium ion, tetramethylguanidium ion, tetramethylphosphonium) mixed salt mainly composed of a lithium ion. Among the counter ions, a lithium ion and an alkali metal mixed salt mainly composed of a lithium ion are preferred, and a lithium salt is more preferred, because the solubility of dye is increased and the stability of ink is enhanced. The ionic hydrophilic group is most preferably a lithium salt of sulfo group.

As for the number of ionic hydrophilic groups, the phthalocyanine dye for use in the present invention preferably has at least two or more ionic hydroxyl group, more preferably at least two or more sulfo groups and/or carboxyl groups, in one molecule.

M is preferably a hydrogen, and examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Examples of the oxide include VO and GeO. Examples of the hydroxide include $Si(OH)_2$, $Cr(OH)_2$ and $Sn(OH)_2$. Furthermore, examples of the halide include AlCl, $SiCl_2$, VCl, $VCl_2$, VOCl, FeCl, GaCl and ZrCl.

Above all, Cu, Ni, Zn, Al and the like are preferred, and Cu is most preferred.

Pc (a phthalocyanine ring) may form a dimer (e.g., Pc-M-L-M-Pc) or a trimer via L (a divalent linking group), and M's here may be the same or different.

The divalent linking group represented by L is preferably an oxy group (—O—), a thio group (—S—), a carbonyl group (—CO—), a sulfonyl group (—$SO_2$—), an imino group (—NH—), a methylene group (—$CH_2$—), or a group formed by combining these.

As regards the chemical structure of the phthalocyanine dye for use in the present invention, at least one electron-withdrawing group such as sulfinyl group (—SO—Z), sulfonyl group (—$SO_2$—Z), sulfamoyl group (—$SO_2NV_1V_2$), carbamoyl group (—$CONV_1V_2$), alkoxycarbonyl group, aryloxycarbonyl group, heterocyclic oxycarbonyl group (—$CO_2$Z), acyl group (—CO—Z) and a sulfo group is preferably introduced into each benzene ring of the phthalocyanine for use in the present invention such that the total of σp values of substituents of the entire phthalocyanine skeleton becomes 1.2 or more. Above all, a sulfinyl group (—SO—Z), a sulfonyl group (—$SO_2$—Z) and a sulfamoyl group (—$SO_2NV_1V_2$) are preferred, a sulfonyl group (—$SO_2$—Z) and a sulfamoyl group (—$SO_2NV_1V_2$) are more preferred, and a sulfonyl group (—$SO_2$—Z) is most preferred.

The Hammett's substituent constant σp value is briefly described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value, and these values can be found in a large number of general publications, but these are described in detail, for example, in J. A. Dean (compiler), *Lange's Handbook of Chemistry,* 12th ed., McGraw-Hill (1979), and *Kagakuno Ryoiki* (*Chemistry Region*), special number, No. 122, pp. 96-103, Nankodo (1979).

As for the preferred combination of substituents in the compound represented by formula (C-1), a compound where at least one of various substituents is the above-described preferred group is preferred, a compound where a larger number of various substituents are the above-described preferred groups is more preferred, and a compound where all substituents are the above-described preferred groups is most preferred.

In the present invention, the cyan-based dye used as the colorant in the cyan ink composition, represented by formula (C-1), is preferably a compound selected from the group consisting of a compound represented by the following formula (C-2) and a salt thereof.

Formula (C-2):

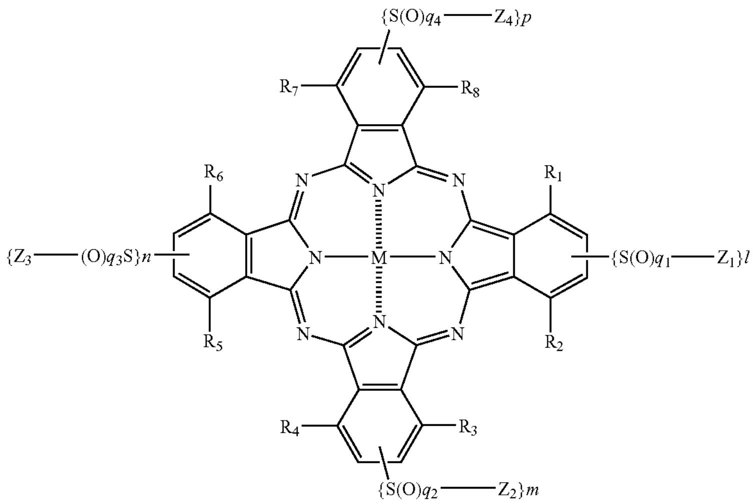

In formula (C-2), $R_1$, $R_2$, $R_3$, $R_4$, $R_5$, $R_6$, $R_7$ and $R_8$ each independently represents a hydrogen, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfinyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, and these groups may further have a substituent.

$Z_1$, $Z_2$, $Z_3$ and $Z_4$ each independently represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that at least one of $Z_1$, $Z_2$, $Z_3$ and $Z_4$ has an ionic hydrophilic group and the counter ion of the ionic hydrophilic group contains a lithium ion.

l, m, n, p, $q_1$, $q_2$, $q_3$ and $q_4$ each independently represents an integer of 1 or 2.

M has the same meaning as in formula (C-1).

In the present invention, l, m, n and p in formula (C-2) each independently represents an integer of 1 or 2. Preferably, two or more of l, m, n and p are 1, and most preferably, l=m=n=p=1.

In formula (C-2), $q_1$, $q_2$, $q_3$ and $q_4$ each independently represents an integer of 1 or 2. Preferably, two or more of $q_1$, $q_2$, $q_3$ and $q_4$ are 2, and most preferably, $q_1=q_2=q_3=q_4=2$.

In formula (C-2), $Z_1$, $Z_2$, $Z_3$ and $Z_4$ each independently represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group and is preferably a substituted or unsubstituted alkyl group, a substituted or unsubstituted aryl group, or a substituted or unsubstituted heterocyclic group, more preferably a substituted alkyl group, a substituted aryl group, or a substituted heterocyclic group, and most preferably a substituted alkyl group, provided that at least one of $Z_1$, $Z_2$, $Z_3$ and $Z_4$ has an ionic hydrophilic group as the substituent.

In formula (C-2), $R_1$, $R_2$, $R_3$, $R_4$, $R_5$, $R_6$, $R_7$ and $R_8$ each independently represents a hydrogen, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfinyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group and is preferably a hydrogen, a halogen atom, an alkyl group, an aryl group, a heterocyclic group, a cyano group, a hydroxyl group, a nitro group, a carbamoyl group, a sulfamoyl group, a sulfinyl group, a sulfonyl group, an alkoxycarbonyl group, an aryloxycarbonyl group, a phosphoryl group, an acyl group or an ionic hydrophilic group, more preferably a hydrogen, a halogen atom, a cyano group, a hydroxyl group, a sulfamoyl group, a sulfinyl group, a sulfonyl group or an ionic hydrophilic group, and most preferably a hydrogen.

In formula (C-2), M has the same meaning as M in formula (C-1), and preferred examples thereof are also the same.

As for the preferred combination of substituents in the compound represented by formula (C-2), a compound where at least one of various substituents is the above-described preferred group is preferred, a compound where a larger number of various substituents are the above-described preferred groups is more preferred, and a compound where all substituents are the above-described preferred groups is most preferred.

In the present invention, the cyan-based dye used as the colorant in the cyan ink composition, represented by formula (C-2), is preferably a compound selected from the group consisting of a compound represented by the following formula (C-3) and a salt thereof.

Formula (C-3):

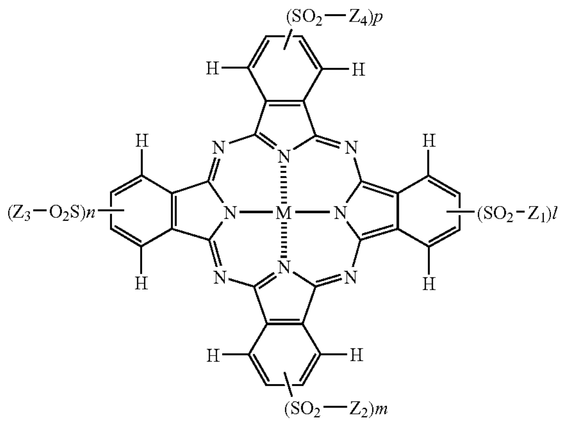

In formula (C-3), $Z_1$, $Z_2$, $Z_3$, $Z_4$, l, m, n, p and M have the same meanings as $Z_1$, $Z_2$, $Z_3$, $Z_4$, l, m, n, p and M in formula (C-2).

In the present invention, l, m, n and p in formula (C-3) each independently represents an integer of 1 or 2. Preferably, two or more of l, m, n and p are 1, and most preferably, l=m=n=p=1.

In formula (C-3), $Z_1$, $Z_2$, $Z_3$ and $Z_4$ each independently represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group and is preferably a substituted or unsubstituted alkyl group, a substituted or unsubstituted aryl group, or a substituted or unsubstituted heterocyclic group, more preferably a substituted alkyl group, a substituted aryl group or a substituted heterocyclic group, and most preferably a substituted alkyl group.

More specifically, $Z_1$, $Z_2$, $Z_3$ and $Z_4$ each is independently $Z_{11}$ ($Z_{11}$ represents —$(CH_2)_3SO_3M_2$, where $M_2$ represents an alkali metal atom) and/or $Z_{12}$ ($Z_{12}$ represents —$(CH_2)_3SO_2NHCH_2CH(OH)CH_3$). In particular, a dye mixture in which the molar ratio of $Z_{11}$ and $Z_{12}$ contained in the entire cyan dye represented by formula (C-3) is $Z_{11}/Z_{12}$=4/0, 3/1, 2/2 or 1/3 is preferred, and a dye mixture mainly composed of $Z_{11}/Z_{12}$=3/1 and/or a dye mixture mainly composed of $Z_{11}/Z_{12}$=2/2 are most preferred. Here, at least one of $Z_1$, $Z_2$, $Z_3$ and $Z_4$ has an ionic hydrophilic group and the counter ion of the ionic hydrophilic group contains a lithium ion.

In —$(CH_2)_3SO_3M_2$ represented by $Z_{11}$, $M_2$ is preferably a lithium ion or an alkali metal atom mixed salt mainly composed of a lithium ion, more preferably a lithium ion or a sodium or potassium ion mixed salt mainly composed of a lithium ion, and most preferably a lithium ion.

In formula (C-3), M has the same meaning as M in formula (C-2), and preferred examples thereof are also the same.

As for the preferred combination of substituents in the compound represented by formula (C-3), a compound where at least one of various substituents is the above-described preferred group is preferred, a compound where a larger number of various substituents are the above-described preferred groups is more preferred, and a compound where all substituents are the above-described preferred groups is most preferred.

The free copper ion concentration in the cyan ink composition using the cyan colorant represented by formula (C-1), (C-2) or (C-3) is, in view of solubility with aging of ink (suppressing the production of a precipitate derived from free copper ion, in the ink), preferably 20 ppm or less, more preferably 15 ppm or less, still more preferably 10 ppm or less, and most preferably 5 ppm or less.

In the present invention, the content of the cyan-based dye contained in the cyan ink composition is determined according to, for example, the kinds of $X_1$ to $X_4$ and $Y_1$ to $Y_4$ in formula (C-1) and the kind of solvent component used for the production of the ink composition, but in the present invention, the cyan-based dye represented by formula (C-1) (dye of formula (C-1)) is preferably contained in the cyan ink composition in a total amount of 1 to 10 wt %, more preferably from 2 to 6 wt %, based on the total weight of the cyan ink composition.

When the total amount of the dye of formula (C-1) contained in the cyan ink composition is 1 wt % or more, the ink on a recording medium after printing can exhibit good colorability and at the same time, the required image density can be ensured. Also, when the total amount of the dye of formula (C-1) contained in the cyan ink composition is 10 wt % or less, ejection property of the cyan ink composition can be made good in use for an inkjet recording method and moreover, an effect of, for example, scarcely causing clogging of an inkjet nozzle can be obtained.

In the ink set of the present invention, a cyan ink composition having a high color density (dark cyan ink composition) and a cyan ink composition having a low color density (light cyan ink composition) can be contained as the cyan ink composition.

In the case of containing a dark cyan ink composition and a light cyan ink composition in the ink set of the present invention, at least one of the dark cyan ink composition and the light cyan ink composition preferably contains at least one of dyes of formulae (C-1), (C-2) and (C-3) as the colorant.

Out of two kinds of cyan ink compositions differing in the color density, the colorant of the cyan ink composition having a low color density is preferably a dye mixture where in at least one member selected from the group consisting of a compound represented by formula (C-2) and a salt thereof, $Z_1$, $Z_2$, $Z_3$ and $Z_4$ each is independently a mixture selected from $Z_{11}$ ($Z_{11}$ represents —$(CH_2)_3SO_3M_2$, wherein $M_2$ represents an alkali metal atom) and/or $Z_{12}$ ($Z_{12}$ represents —$(CH_2)_3SO_2NHCH_2CH(OH)CH_3$), more preferably a dye mixture in which the molar ratio of $Z_1$ and $Z_{12}$ contained in the entire cyan dye represented by formula (C-3) is $Z_{11}/Z_{12}$=4/0, 3/1, 2/2 or 1/3, and most preferably a dye mixture mainly composed of $Z_{11}/Z_{12}$=2/2.

On the other hand, it is also preferred that, out of two kinds of cyan ink compositions differing in the color density, the cyan ink composition having a low color density contains at least one compound selected from the group consisting of a compound represented by the following formula (C-4) and a salt thereof.

Formula (C-4):

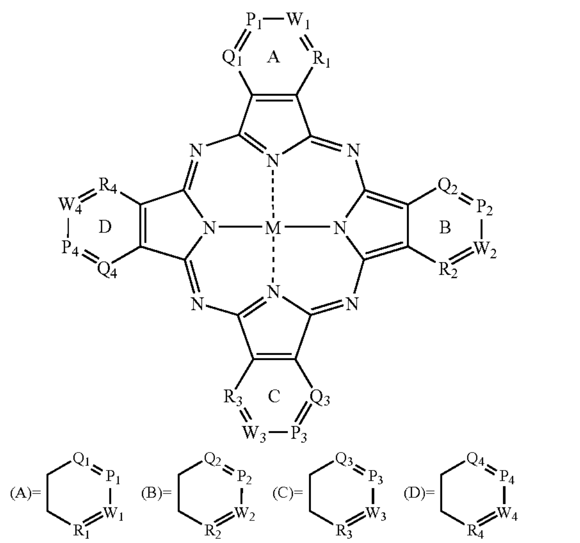

In formula (C-4), $Q_1$ to $Q_4$, $P_1$ to $P_4$, $W_1$ to $W_4$, and $R_1$ to $R_4$ each independently represents (=C($J_1$)- and/or —N=), (=C($J_2$)- and/or —N=), (=C($J_3$)- and/or —N=) or (=C($J_4$)- and/or —N=). $J_1$ to $J_4$ each independently represents a hydrogen and/or a substituent. Out of four rings {ring A: (A), ring B: (B), ring C: (C), and ring D: (D)} composed of ($Q_1$, $P_1$, $W_1$, $R_1$), ($Q_2$, $P_2$, $W_2$, $R_2$), ($Q_3$, $P_3$, $W_3$, $R_3$) or ($Q_4$, $P_4$, $W_4$, $R_4$), at least one ring is a heterocycle. Here, the compound represented by formula (C-4) or a salt thereof has at least one ionic hydrophilic group as the substituent, and the counter ion of the ionic hydrophilic group contains a lithium ion.

More specifically, in the cyan ink composition represented by formula (C-4), out of four rings {ring A: (A), ring B: (B), ring C: (C), and ring D: (D)} composed of ($Q_1$, $P_1$, $W_1$, $R_1$), ($Q_2$, $P_2$, $W_2$, $R_2$), (Q, $P_3$, $W_3$, $R_3$) or ($Q_4$, $P_4$, $W_4$, $R_4$), at least one heterocycle is preferably a nitrogen-containing heterocycle. The heterocycle is more preferably a pyridine ring, a pyrazine ring, a pyrimidine ring or a pyridazine ring, still more preferably a pyridine ring or a pyrazine ring, and most preferably a pyridine ring.

More preferably, in the cyan ink composition represented by formula (C-4), out of four rings {ring A: (A), ring B: (B), ring C: (C), and ring D: (D)} composed of ($Q_1$, $P_1$, $W_1$, $R_1$), ($Q_2$, $P_2$, $W_2$, $R_2$), ($Q_3$, $P_3$, $W_3$, $R_3$) or ($Q_4$, $P_4$, $W_4$, $R_4$), when any ring represents an aromatic ring, the aromatic ring is preferably represented by the following formula (I).

Formula (I):

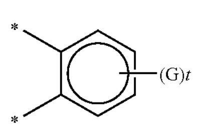

In formula (I), * represents a bonding position to the phthalocyanine skeleton. G represents —SO—$Z_1$, —$SO_2$—$Z_1$, —$SO_2NZ_2Z_3$, —$CONZ_2Z_3$, —$CO_2Z_1$, —$COZ_1$ or a sulfo group. t represents an integer of 1 to 4.

$Z_1$, which may be the same or different, represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

In formula (I), $Z_1$ is preferably a substituted or unsubstituted alkyl group, a substituted or unsubstituted aryl group, or a substituted or unsubstituted heterocyclic group, more preferably a substituted alkyl group or a substituted aryl group, and most preferably a substituted alkyl group.

$Z_2$ and $Z_3$, which may be the same or different, each represents a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

In formula (I), $Z_1$ and $Z_2$ each is independently preferably a hydrogen, a substituted or unsubstituted alkyl group, a substituted or unsubstituted aryl group, or a substituted or unsubstituted heterocyclic group, more preferably a hydrogen, a substituted alkyl group or a substituted aryl group, and it is most preferred that one of $Z_1$ and $Z_2$ represents a hydrogen and the other represents a substituted alkyl group or a substituted aryl group.

In formula (I), G is preferably —SO—$Z_1$, —$SO_2$—$Z_1$, —$SO_2NZ_2Z_3$, —$CONZ_2Z_3$, —$CO_2Z_1$ or —$COZ_1$, more preferably —SO—$Z_1$, —$SO_2$—$Z_1$ or —$SO_2NZ_2Z_3$, and most preferably —$SO_2$—$Z_1$.

In formula (I), t is preferably an integer of 1 to 3, more preferably an integer of 1 or 2, and most preferably t=1.

More specifically, in the cyan ink composition represented by formula (C-4), when any arbitrary ring of ring A, ring B, ring C and ring D is an aromatic ring, at least one aromatic ring is preferably a ring represented by the following formula (II):

Formula (II):

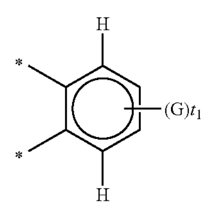

In formula (II), * represents a bonding position to the phthalocyanine skeleton.

In formula (II), G has the same meaning as in formula (I), and preferred examples thereof are also the same.

In formula (II), $t_1$ is 1 or 2, preferably $t_1$=1.

It is particularly preferred that both the dark cyan ink composition and the light cyan ink composition contain at least one of the dyes of formulae (C-1), (C-2), (C-3) and (C-4) as the colorant.

In the ink set of the present invention, out of two kinds of cyan ink compositions differing in the color density, the colorant of the cyan ink composition having a high color density is preferably a dye mixture where in at least one member selected from the group consisting of a compound represented by formula (C-2) and a salt thereof, $Z_1$, $Z_2$, $Z_3$ and $Z_4$ each is independently a mixture selected from $Z_{11}$ and $Z_{12}$ and at the same time, a cyan dye in which the molar ratio of $Z_{11}$ and $Z_{12}$ contained in the entire cyan dye represented by formula (C-3) is $Z_{11}/Z_{12}$=3/1 is the main component.

As described above, in the case of containing a dark cyan ink composition and a light cyan ink composition in the ink set, the colorant concentration in the light cyan ink composition can be arbitrarily determined according to the kind of the dye used as the colorant, such that good color balance is created when the light cyan ink composition is combined with the dark cyan ink composition.

Generally, in the light cyan ink composition, the colorant selected from the dyes of formulae (C-1), (C-2) and (C-3) is preferably contained in a total amount of 0.4 to 3.0 wt %, more preferably from 0.5 to 2.5 wt %, still more preferably from 1.0 to 2.5 wt %, yet still more preferably from 1.0 to 2.0 wt %, based on the total weight of the light cyan ink composition.

When the colorant concentration in the light cyan ink composition is 0.4 wt % or more, excellent colorability can be obtained, and when the colorant concentration is 3.0 wt % or less, the granular texture of an image recorded using the light cyan ink composition can be reduced.

On the other hand, in the dark cyan ink composition, the colorant selected from the dyes of formulae (C-1), (C-2) and (C-3) is preferably contained in a total amount of 2.0 to 12.0 wt %, more preferably from 2.0 to 10.0 wt %, still more preferably from 2.0 to 6.0 wt %, yet still more preferably from 2.5 to 5.5 wt %, based on the total weight of the dark cyan ink composition.

Furthermore, the ratio between the concentration (wt %) of the colorant contained in the light cyan ink composition and the concentration (wt %) of the colorant contained in the dark cyan ink composition is preferably from 1:2 to 1:8, more preferably from 1:2 to 1:5, still more preferably from 1:2 to 1:3.

By satisfying these conditions, good color balance is realized between the light cyan ink composition and the dark cyan ink composition and moreover, the inkjet nozzle can be prevented from clogging.

In the present invention, the mol number per ink unit weight of the lithium ion contained in the cyan ink composition can be arbitrarily determined according to the molecular weight of the compound (dye) used as the colorant, the number of ionic hydrophilic groups and the solid content concentration adopted, but the lithium ion is preferably contained in an amount of $5.0\times10^{-6}$ to $1.0\times10^{-3}$ mol/g, more preferably from $3.0\times10^{-5}$ to $8.5\times10^{-4}$ mol/g, still more preferably from $5.0\times10^{-5}$ to $5.0\times10^{-4}$ mol/g, and most preferably from $5.0\times10^{-5}$ to $4.0\times10^{-4}$ mol/g.

As described above, in the cyan ink composition or the dark and light cyan ink compositions of the ink set of the present invention, for example, other cyan-based dyes typified by a dye represented by the following formula (C-5) or a dye mixture can be used in combination so as to adjust the color tone or the like of ink, within the range not greatly impairing the light fastness/ozone fastness.

Formula (C-5):

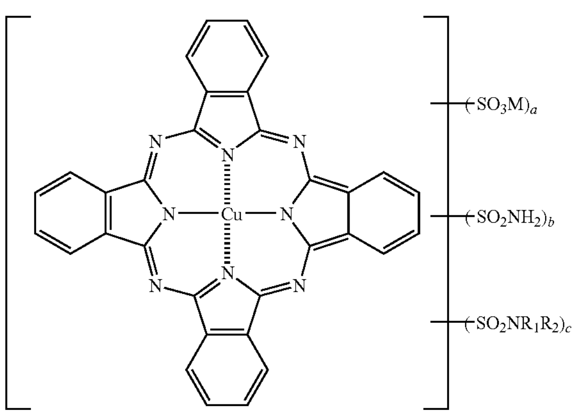

a + b + c ≈ 2~5
M = Li &/or Na &/or K &/or $NH_4$ $R_1$ and $R_2$ each independently represents a hydrogen or a monovalent substituent, and the monovalent substituent may further have a substituent. a represents an integer of 0 to 5, b represents an integer of 0 to 5, and c represents an integer of 0 to 5.

Examples of the other cyan-based dyes for use in the present invention include, but are not limited to C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326; C.I. Reactive Blue 2, 3, 5, 8, 10, 13, 14, 15, 17, 18, 19, 21, 25, 26, 27, 28, 29, 38; and C.I. Basic Blue 1, 3, 5, 7, 9, 22, 26, 41, 45, 46, 47, 54, 57, 60, 62, 65, 66, 69, 71.

The compounds represented by formulae (C-1) to (C-5) for use in the present invention can be synthesized using the method described, for example, in JP-A-2002-302623, JP-A-2005-179469 and JP-A-2006-124679.

The colorant used in the black ink composition constituting the ink set of the present invention is described below.

In the ink set of the present invention, the colorant used in the black ink composition is not limited to the colorant having a specific structure, but the difference between the light fastness/ozone fastness of other color ink compositions and the light fastness/ozone fastness of the black ink composition is preferably small.

The ink set of the present invention can be constituted, if desired, to contain a black ink composition.

By containing a black ink composition in the ink set of the present invention, an image having good contrast can be formed on a recording medium. Moreover, a good image free from occurrence of a bronze gross phenomenon in a single color portion and a mixed color portion can be formed.

In the present invention, examples of the black ink colorant for use in the black ink composition include black ink colorants described in JP-A-2005-139427 and JP-A-2005-146244. It is preferred that the black ink colorant has at least one ionic hydrophilic group, the counter ion of the ionic hydrophilic group contains a lithium ion, and the lithium concentration is 70 mol % or more based on all cations in the black ink composition. The lithium ion concentration is more preferably 80 mol % or more, more preferably 90 mol %, still more preferably 95 mol %, and the upper limit is preferably 100 mol %.

In the present invention, the concentration of the colorant contained in the black ink composition can be arbitrarily determined according to the color value of the compound (dye) used as the colorant, but in general, the colorant is preferably contained in the black ink composition in a total amount of 1.0 to 12.0 mass %, more preferably from 2.0 to 10.0 mass %, still more preferably from 3.0 to 10.0 mass %, yet still more preferably from 5.0 to 8.0 mass %, based on the total mass of the black ink composition.

When the concentration as a total amount of the colorant contained in the black ink composition is 1.0 mass % or more, good colorability can be obtained, and when the concentration as a total amount of the colorant is 12.0 mass % or less, properties required of the ink composition used for an inkjet recording method, such as ejectability from a nozzle, can be kept good and clogging of an ink nozzle can be prevented.

In the present invention, the mol number per ink unit weight of the lithium ion contained in the black ink composition can be arbitrarily determined according to the molecular weight of the compound (dye) used as the colorant, the number of ionic hydrophilic groups and the solid content concentration adopted, but the lithium ion is preferably contained in an amount of $5.0\times10^{-5}$ to $1.0\times10^{-3}$ mol/g, more preferably from $8.0\times10^{-5}$ to $9.0\times10^{-4}$ mol/g, still more preferably from $1.0\times10^{-4}$ to $6.0\times10^{-4}$ mol/g, and most preferably from $2.0\times10^{-}$ to $5.0\times10^{-4}$ mol/g.

While the colorant used for each ink composition in the present invention and the content of the colorant in the ink composition are described in the foregoing pages, other components contained in each ink composition are described below.

In the present invention, each ink composition can be obtained by dissolving the above-described colorant (dye) in an appropriate solvent. As for the solvent to dissolve the colorant in each ink composition, water or a mixed solution of water and a water-soluble organic solvent is preferably used as the main solvent. Examples of water which can be used include ion-exchanged water, ultrafiltration water, reverse osmosis water and distilled water. In view of long-term storage, water subjected to various chemical sterilization treatments such as UV irradiation and addition of hydrogen peroxide is preferably used. The content of water in each ink composition constituting the ink set of the present invention is preferably from 40 to 90 mass %, more preferably from 50 to 80 mass %, based on the ink composition.

In each ink composition for use in the present invention, as described above, a water-soluble organic solvent can be used as the solvent together with water. This water-soluble organic solvent is preferably a solvent having an ability of dissolving the dye and having a vapor pressure lower than that of pure water.

Preferred examples of the water-soluble organic solvent for use in the present invention include, but are not limited to, polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol and dipropylene glycol, ketones such as acetonyl acetone, esters such as γ-butyrolactone and triethyl phosphate, a furfuryl alcohol, a tetrahydrofurfuryl alcohol and a thiodiglycol. By using a water-soluble organic solvent together with water as the solvent of the ink composition, the ejection stability of the ink composition from an ink head can be enhanced, and adjustment, for example, to decrease the viscosity of the ink composition while scarcely changing other properties can be easily performed.

Also, each ink composition for use in the present invention may contain at least one humectant selected from sugars. By virtue of incorporating a humectant into the ink composition, when the ink composition is used in an inkjet recording method, evaporation of water from the ink can be suppressed and the ink can retain moisture. Preferred examples of the sugar for use in the present invention include maltitol, sorbitol, gluconolactone and maltose. Incidentally, the above-described water-soluble organic solvent sometimes works as a humectant.

The water-soluble organic solvent and/or the humectant can be contained in an amount of 5 to 50 mass %, more preferably from 5 to 30 mass %, still more preferably from 5 to 20 mass %, based on the ink composition. When the content thereof is 5 mass % or more, an ink with good moisture retentivity can be obtained, and when it is 50 mass % or less, the viscosity of the ink composition can be adjusted to a viscosity suitable for use in an inkjet recording method.

In the ink set of the present invention, each color ink composition preferably contains a betaine compound, if desired, and above all, the betaine compound is preferably a betaine-type surfactant having an oil-soluble group. Preferred examples of the betaine compound for use in the present invention include betaine compounds described in JP-A-2004-285269 and JP-A-2007-138124.

Other preferred additives added to the ink composition constituting the ink set of the present invention are described below.

The ink composition constituting the ink set of the present invention preferably contains a nonionic surfactant. Thanks to addition of a nonionic surfactant, excellent permeability of the ink composition into a recording medium is obtained, and the ink composition is swiftly fixed on a recording medium at the printing. Furthermore, one dot recorded on a recording medium by using the ink composition is preferably as close to a true circle as possible, and when a nonionic surfactant is incorporated into the ink composition, this produces an effect that the image formed by one dot can have higher circularity and the image quality of the obtained image can be enhanced.

Examples of various additives which are preferably used in the present invention include additives described in JP-A-2005-105261.

The ink composition constituting the ink set of the present invention is prepared to contain components arbitrarily selected from the above-described components, but the viscosity of the ink composition obtained is preferably less than 10 mPa·s at 20° C. Furthermore, in the present invention, the surface tension of the ink composition at 20° C. is preferably 45 mN/m or less, more preferably from 25 to 45 mN/m. By virtue of adjusting the viscosity and the surface tension in this way, an ink composition having preferred properties in use for an inkjet recording method can be obtained. The adjustment of the viscosity and surface tension can be performed by arbitrarily controlling and selecting the amounts added of the solvent and various additives contained in the ink composition, the kinds thereof, and the like.

The pH of the ink composition constituting the ink set of the present invention is preferably from 7.0 to 10.5, more preferably from 7.5 to 10.0, at 20° C. When the pH of the ink composition is 7.0 or more at 20° C., the codeposited plating of an inkjet head can be prevented from separation and at the same time, the ejection property of the ink composition from an inkjet head can be stabilized. Also, when the pH of the ink composition is 10.5 or less at 20° C., various members with which the ink composition comes into contact, for example, members constituting an ink cartridge or an inkjet head, can be prevented from deterioration.

Examples of the method for preparing the ink composition in the present invention include, but are not limited to, a method of thoroughly mixing various components which are contained in the ink composition, dissolving the mixture as uniformly as possible, filtering the resulting solution under pressure through a membrane filter having a pore diameter of 0.8 μm, and further subjecting the solution to a deaeration treatment using a vacuum pump.

The ink cartridge of the present invention is characterized in that the ink set is integrally or independently housed. The integrally or independently housed ink cartridge is preferred because of its easy handleability or the like. An ink cartridge constituted to contain an ink set is known in this technical filed, and an ink cartridge can be produced by arbitrarily using a known method.

The ink set or ink cartridge of the present invention can be used for general writing tool, recorder, pen plotter and the like but is preferably used particularly for an inkjet recording method.

The inkjet recording method is characterized by ejecting an ink constituting the ink set, thereby performing recording.

The inkjet recording method in which the ink set or ink cartridge of the present invention can be used includes all recording methods where an ink composition is ejected in the form of a liquid droplet from a fine nozzle and the liquid droplet is attached onto a recording medium. Specific examples of the inkjet recording method in which the ink composition of the present invention can be used are described below.

The first method is a method called an electrostatic suction system. The electrostatic suction system is a method where an intense electric field is applied between nozzles and an acceleration electrode placed in front of the nozzles to sequentially jet ink droplets from the nozzles, a print information signal is sent to deflection electrodes while the ink droplets are passing between the deflection electrodes, the ink droplets are thereby caused to fly toward a recording medium, and the ink is fixed on the recording medium to record an image, or a method where ink droplets are jetted according to a print information signal from the nozzles toward a recording medium without deflecting the ink droplets and an image is thereby fixed on the recording medium and recorded. The ink set or ink cartridge of the present invention is preferably used for a recording method by this electrostatic suction system.

The second method is a method where a pressure is applied to the ink liquid by means of a small pump and at the same time, the inkjet nozzles are mechanically vibrated using a crystal oscillator or the like to thereby forcedly jet ink droplets and where the ink droplets are charged when jetted and by sending a print information signal to deflection electrodes while the ink droplets are passing between the deflection electrodes, the ink droplets are caused to fly toward a recording medium, as a result, an image is recorded on the recording medium. The ink set or ink cartridge of the present invention is preferably used for this recording method.

The third method is a method where a pressure and a print information signal are simultaneously provided to the ink liquid by using a piezoelectric device and ink droplets are jetted from nozzles toward a recording medium, thereby recording an image on the recording medium. The ink set or ink cartridge of the present invention is preferably used for this recording method.

The fourth method is a method where the ink liquid is heated to form a bubble by using a microelectrode according to a print information signal and the bubble is caused to expand, as a result, the ink liquid is jetted from the nozzles toward a recording medium to record an image on the recording medium. The ink set or ink cartridge of the present invention is preferably used for this recording method.

In the inkjet recording method, an image is preferably formed on an image-receiving material including a support having thereon an ink-receiving layer containing a white inorganic pigment.

The recorded material of the present invention is recorded with the ink constituting the above-described ink set.

The ink set or ink cartridge of the present invention is particularly preferred as an ink composition for use in an image recording method where an image is recorded on a recording medium by an inkjet recording system including the above-described four methods. The recorded material recorded using the ink set of the present invention has excellent image quality and furthermore, is excellent in the ozone fastness.

EXAMPLES

The present invention is described in greater detail below by referring to Examples, but the present invention is not limited to these Examples.

Synthesis Example 1

The synthesis method of Dyestuff (YELLOW-1) is described in detail below.

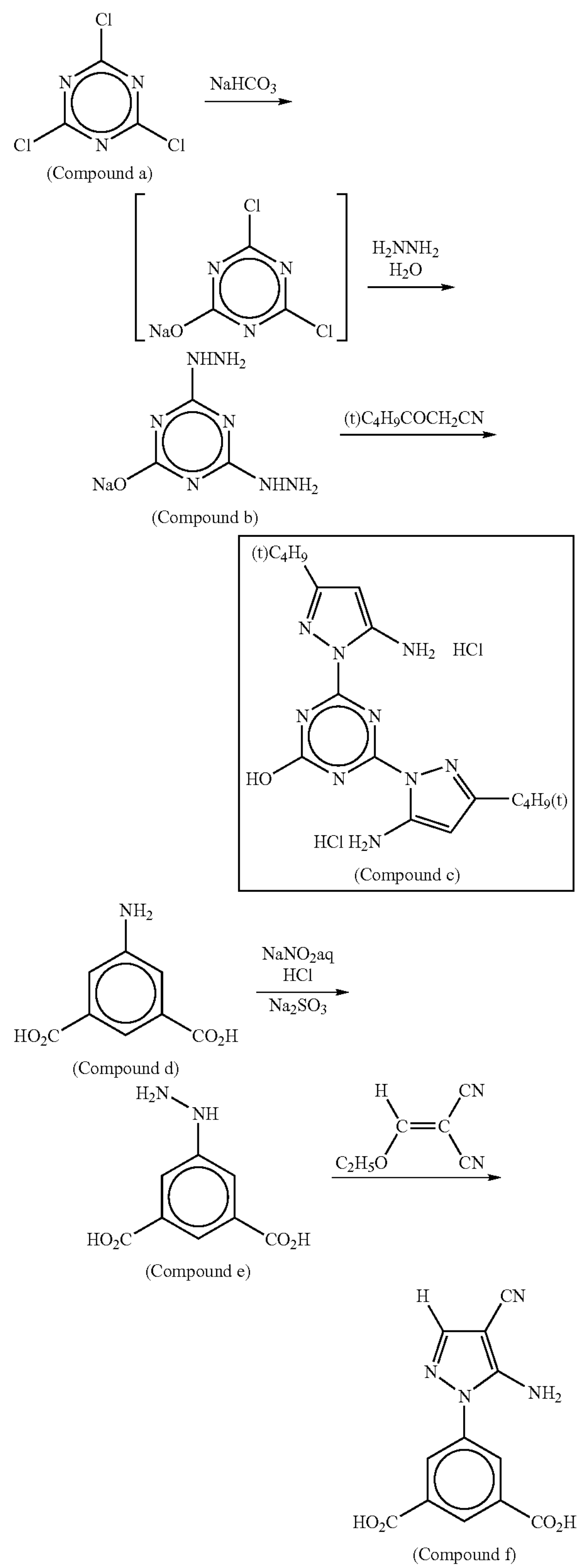

-continued

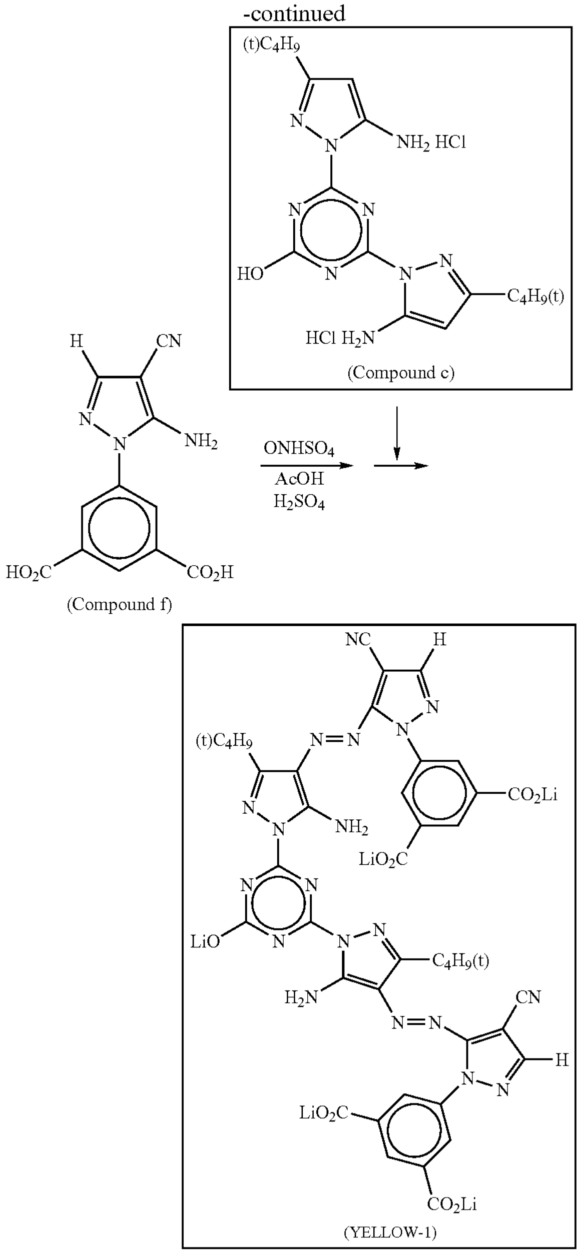

(Compound c)

(Compound f)

(YELLOW-1)

(1) Synthesis of Compound b:

25.5 Gram of sodium hydrogencarbonate and 150 ml of ion-exchanged water were heated at 40° C., and 25.0 g of cyanuric chloride (produced by Tokyo Chemical Industry Co., Ltd.) was added in five parts every 10 minutes, followed by stirring for 1 hour. The resulting solution was added dropwise to a mixed solution (8° C.) of 52.8 ml of hydrazine and 47 ml of ion-exchanged water while keeping the inner temperature from exceeding 10° C. The inner temperature was raised to 50° C., the solution was stirred for 30 minutes, and the precipitated crystal was filtered to obtain 23.4 g of Compound b (hydrazine derivative, m.p. >300° C.). The yield was 94.7%.

(2) Synthesis of Compound c:

35.0 Gram of Compound b (hydrazine derivative) was suspended in 420 ml of ethylene glycol, followed by stirring at an inner temperature of 50° C. Thereto, 59 ml of concentrated hydrochloric acid and subsequently, 60.1 g of pivaloyl acetonitrile (produced by Tokyo Chemical Industry Co., Ltd.) were added, and the mixture was stirred at 50° C. for 10 hours. Furthermore, 95 ml of concentrated hydrochloric acid and 145 ml of methanol were added, and the mixture was stirred for 8 hours. The resulting reaction solution was cooled to room temperature, and the precipitated crystal was filtered to obtain 81.6 g of Compound c (5-aminopyrazole derivative, m.p.=from 233 to 235° C.). The yield was 94.2%. $^1$H-NMR (DMSO-d6), δ value TMS standard: 1.2 to 1.3 (18H, s)

(3) Synthesis of Compound e:

90.57 Gram of Compound d (produced by Tokyo Chemical Industry Co., Ltd.) was suspended in 500 ml of $H_2O$, and 130 ml of concentrated hydrochloric acid was poured therein. The system was then cooled until the inner temperature became 5° C. or less. Subsequently, 70 ml of an aqueous solution containing 36.23 g of sodium nitrite was added dropwise at an inner temperature of 4 to 6° C., and the mixed solution was stirred at an inner temperature of 5° C. or less for 30 minutes. Thereafter, 159 g of sodium sulfite and 636 ml of $H_2O$ were poured therein while keeping the inner temperature at 20° C. or less, and 250 ml of concentrated hydrochloric acid was further poured at an inner temperature of 25° C. After stirring at an inner temperature of 90° C. for 1 hour, the system was cooled until the inner temperature became room temperature, and the reaction product was filtered, washed with 200 ml of water and air-dried to obtain 80.0 g of Compound e.

(4) Synthesis of Compound f:

After 28 ml of triethylamine was added dropwise to a suspension containing 23.3 g of Compound e and 209 ml of ethanol at room temperature, 12.2 g of ethoxymethylene malononitrile (a product of ALDRICH) was added in parts, and the system was refluxed for 3 hours. The resulting reaction solution was cooled to room temperature, then filtered, washed with 400 ml of isopropyl alcohol and dried to obtain 23.57 g of Compound f.

(5) Synthesis of YELLOW-1:

Into 32.4 ml of sulfuric acid, 145.56 ml of acetic acid was poured at an inner temperature of 4° C. or less, and 15.9 ml of 40% nitrosylsulfuric acid (a product of ALDRICH) was then added dropwise with stirring at an inner temperature of 7° C. or less.

Subsequently, 32.4 g of Compound f was added in parts with stirring at an inner temperature of 10° C., and the mixture was stirred at the same temperature for 60 minutes. Thereafter, 18.8 g of Compound c obtained by adding 1.83 g of urea to the reaction solution was suspended in 470 ml of methanol, and diazonium salt was added dropwise thereto at an inner temperature <0° C. The mixture was stirred at the same temperature for 30 minutes and after raising the inner temperature to room temperature, the reaction solution was filtered, washed with methanol and then washed with $H_2O$ to obtain a crude crystal. The crude crystal was suspended in 400 ml of methanol and after stirring under reflux for 1 hour, the reaction solution was cooled to room temperature, filtered, washed with methanol, then washed with water, further washed with methanol and dried at 75° C. overnight to obtain 34.4 g of DYE-11 as a free acid-type crystal. The obtained crystal was formed into 10 wt % aq. (pH at 25° C.: about 8.0, preparation of LiOH aq., Li ionization rate: 99.9% or more), and IPA was added thereto at an inner temperature of 50° C. The resulting solution was crystallized, cooled, filtered, washed with IPA and dried to obtain 35 g of YELLOW-1. $\lambda max=435.7$ nm ($H_2O$), $\epsilon$: $3.30\times10^4$ ($dm^3\cdot cm/mol$).

DYE-11:
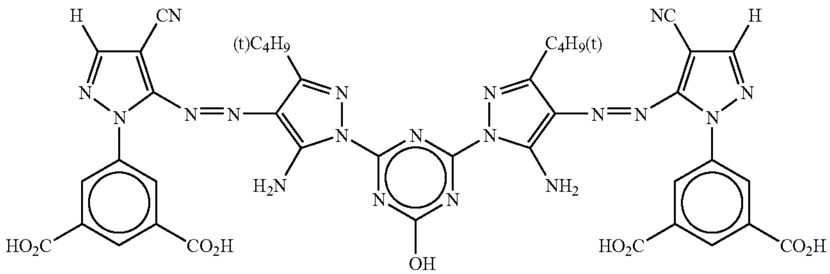
Synthesis Example 2
Yellow-2, Yellow-3, Yellow-4, Yellow-5, Yellow-6, Yellow-7 and Yellow-8 can be synthesized by combining the same method and the same operation as in the synthesis method of dyestuff above (YELLOW-1). Maximum absorption wavelength (λmax) and molecular extinction coefficient (ϵ value) in $H_2O$ of the dyestuffs synthesized are shown in Table 1.
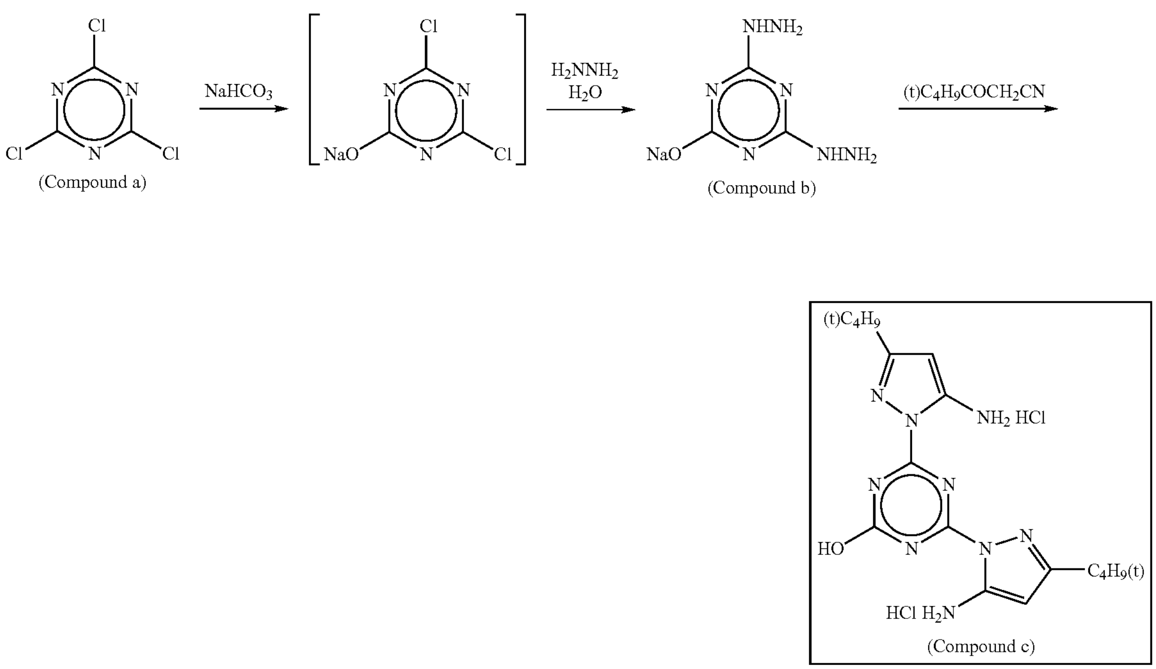
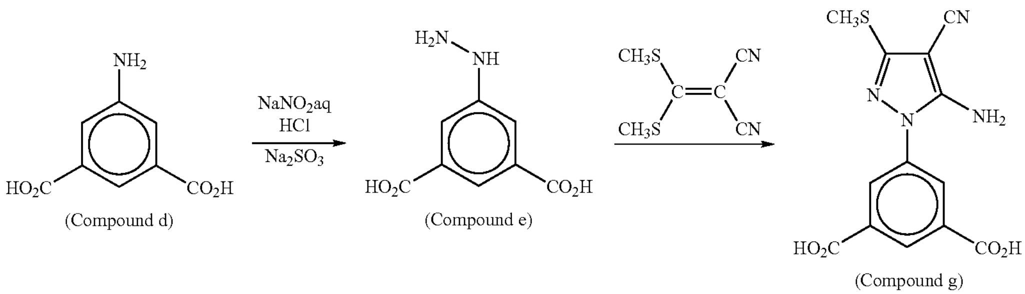

-continued
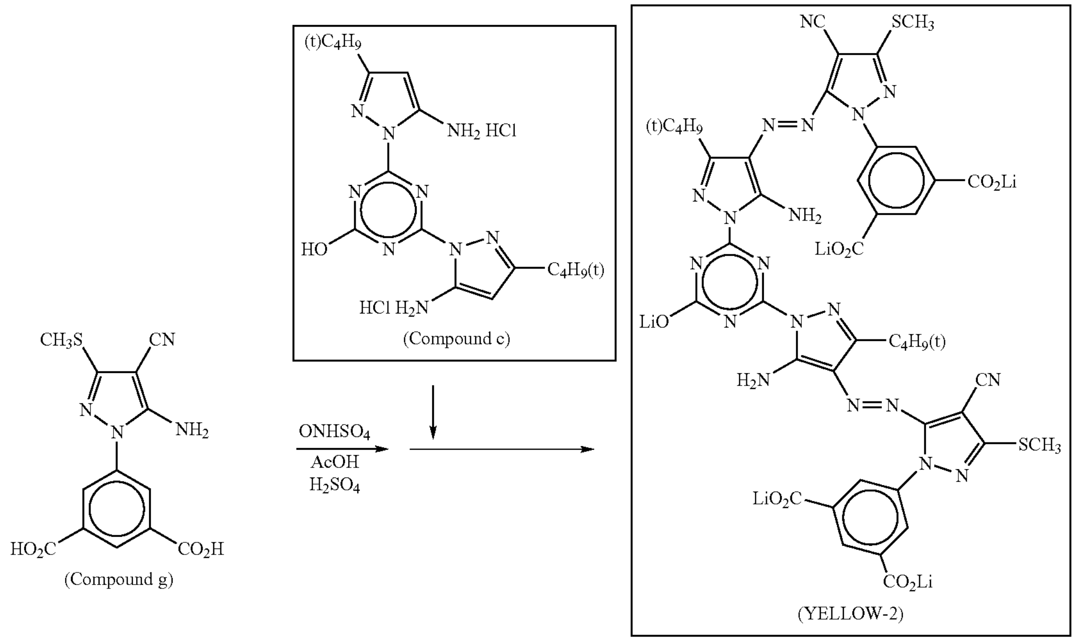
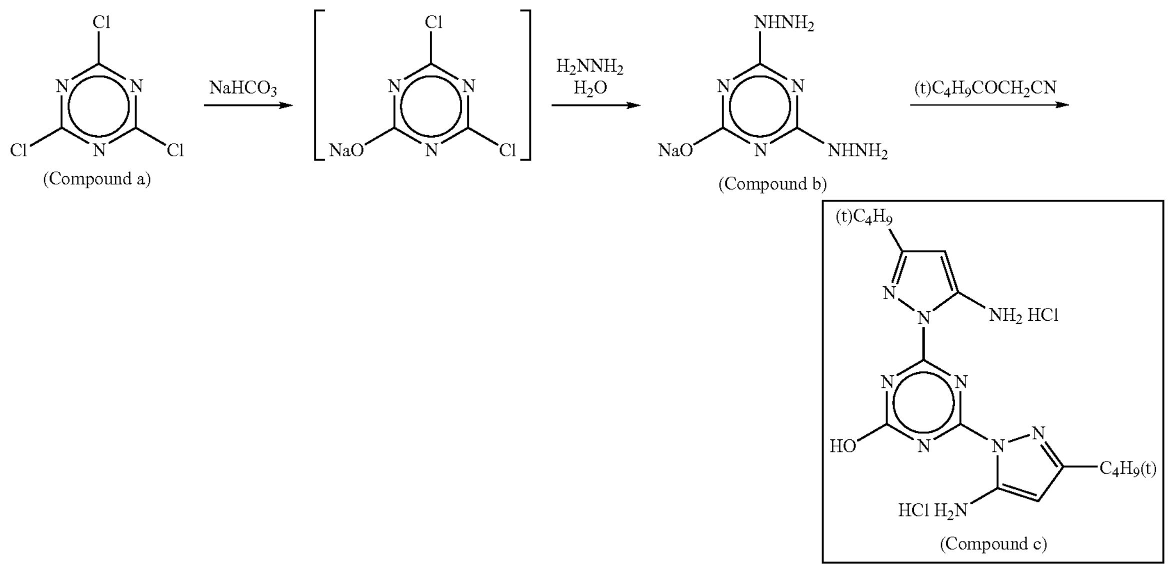
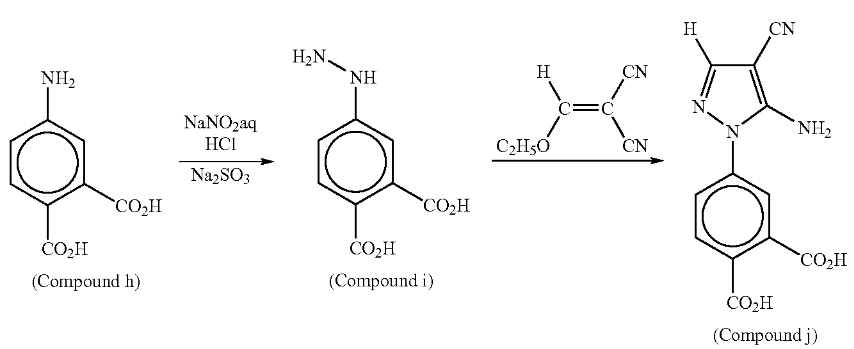

-continued
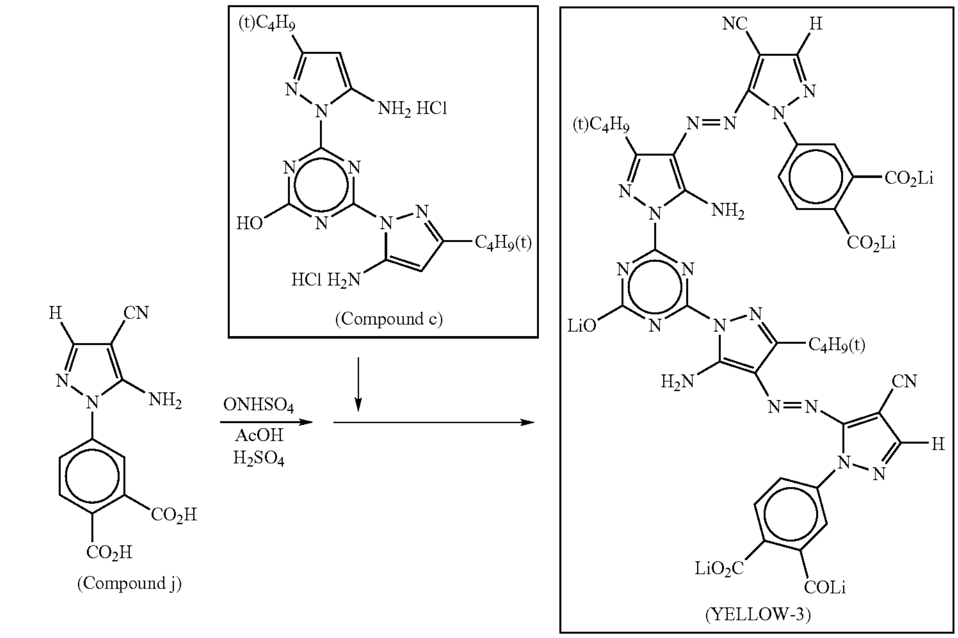
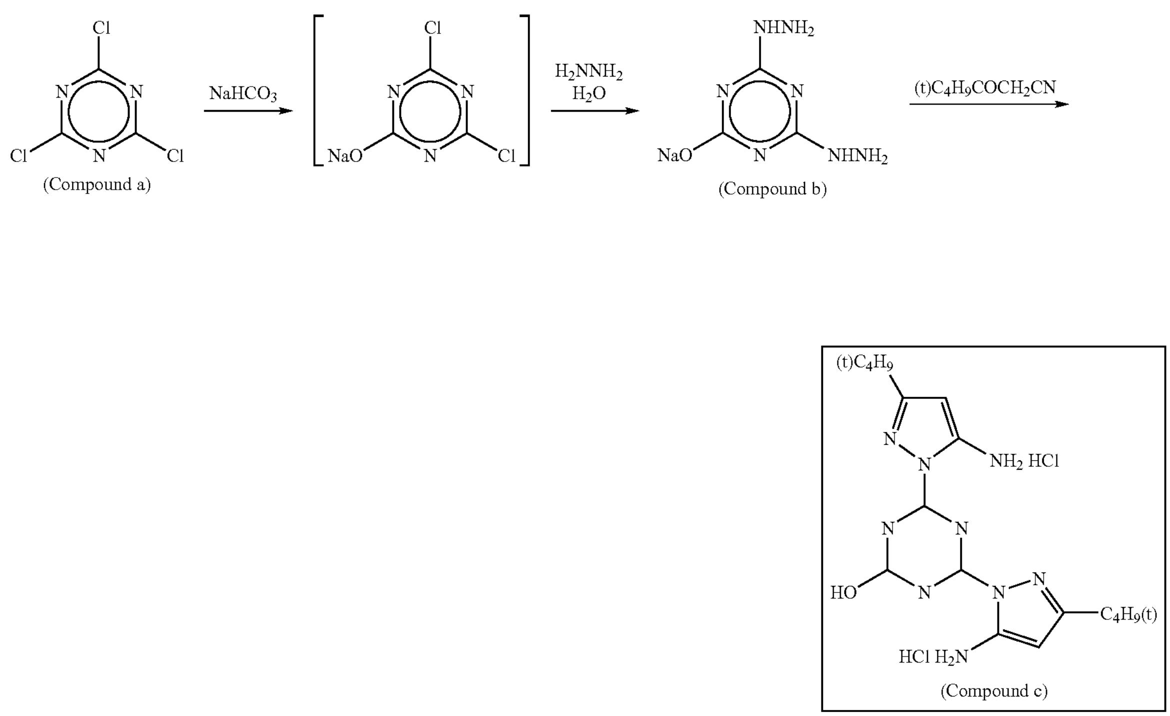

-continued
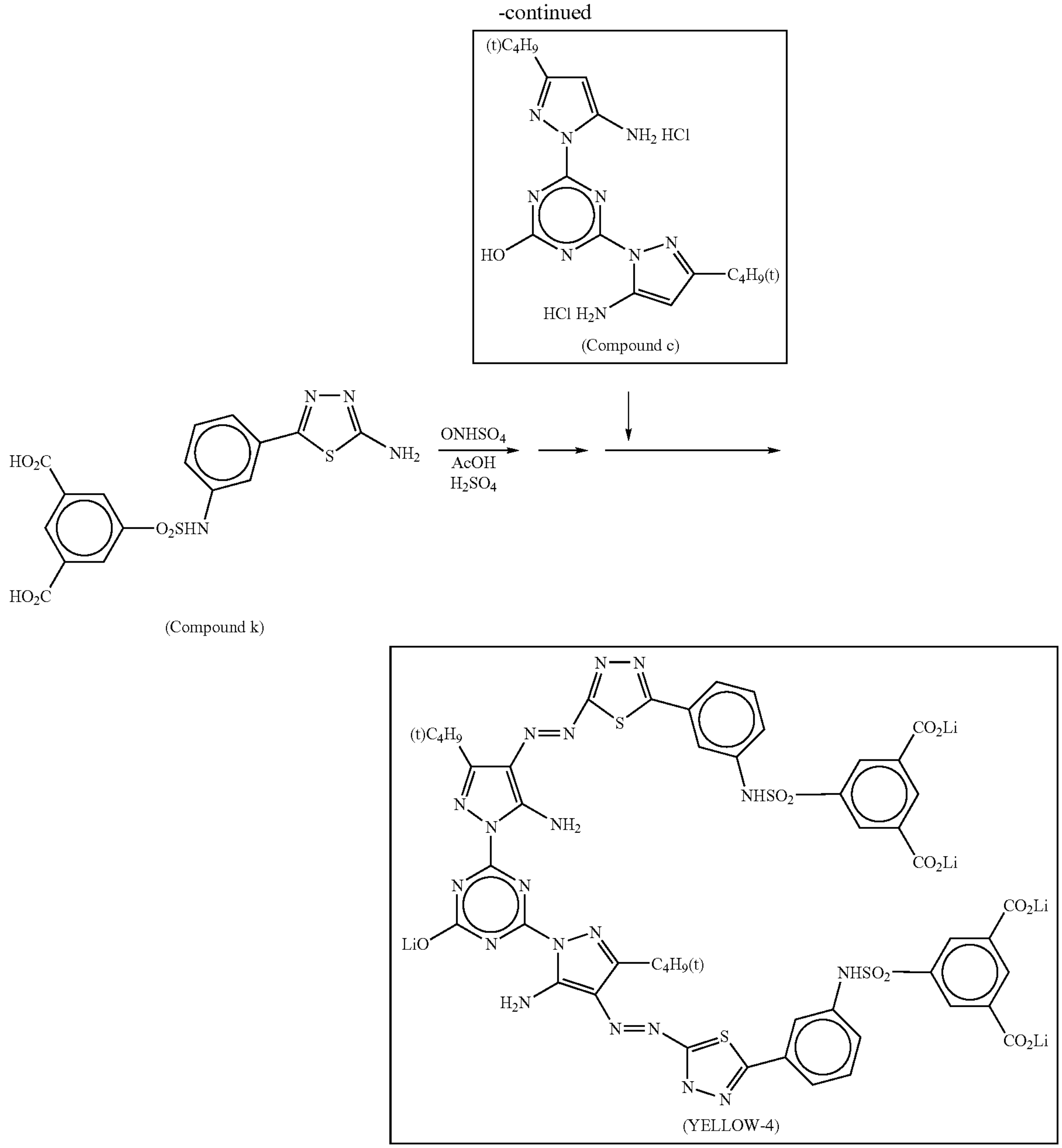
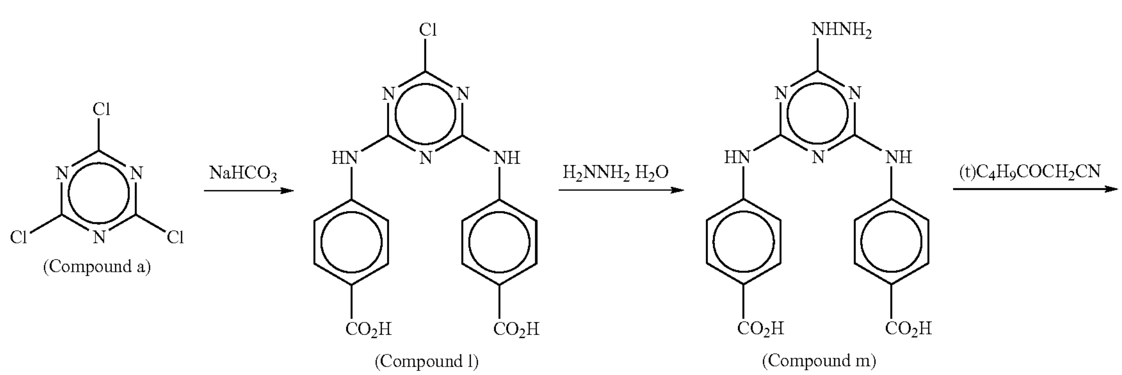

-continued
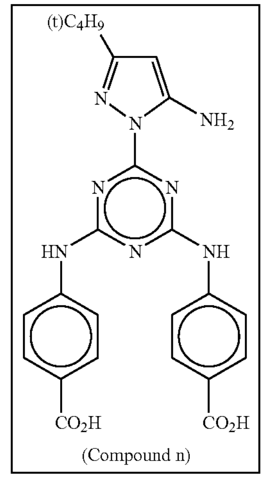
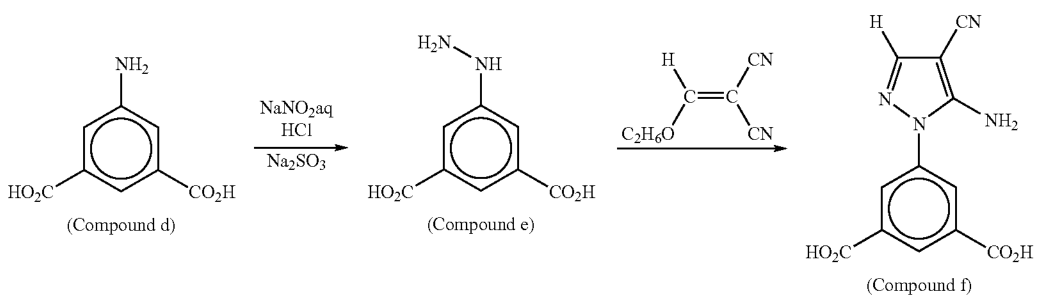
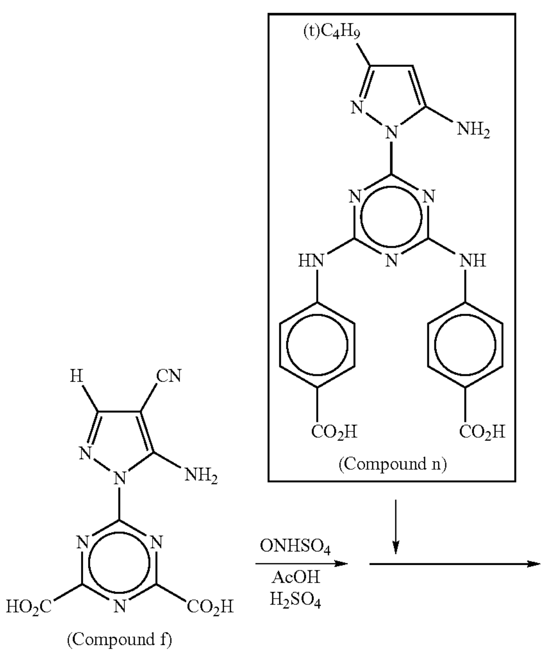

-continued
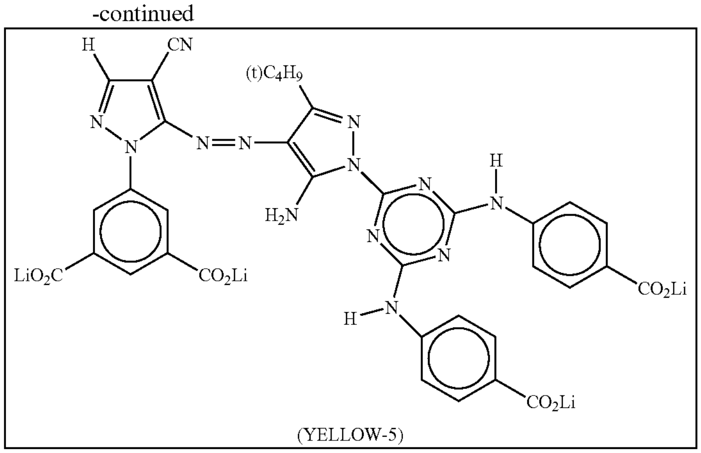
(YELLOW-5)
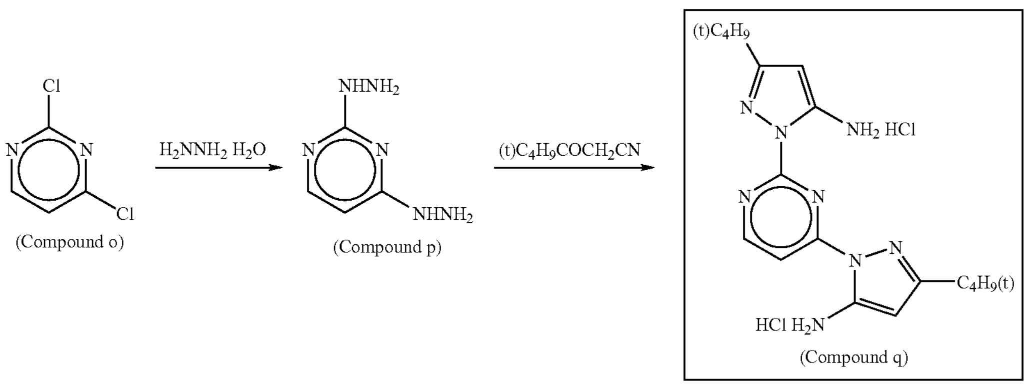
(Compound o) (Compound p) (Compound q)
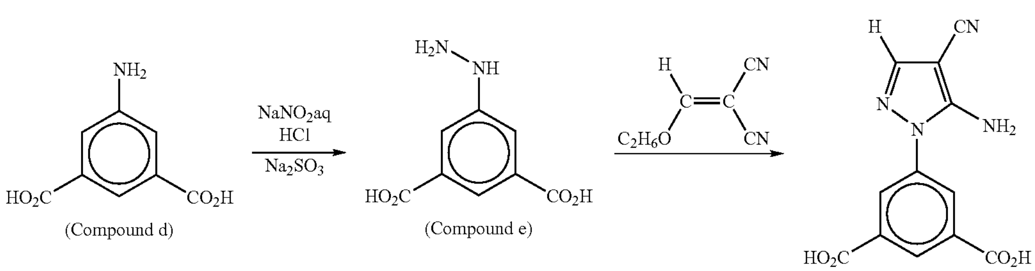
(Compound d) (Compound e) (Compound f)

-continued
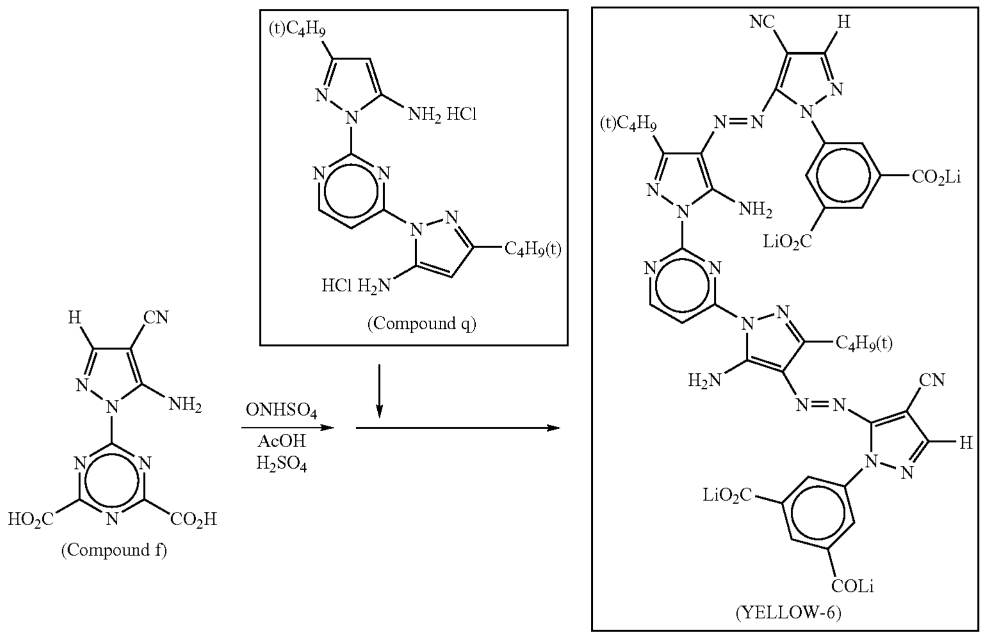
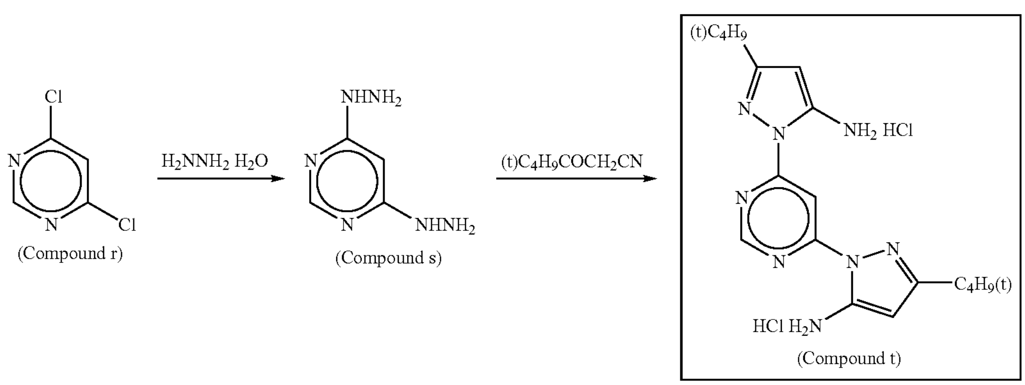
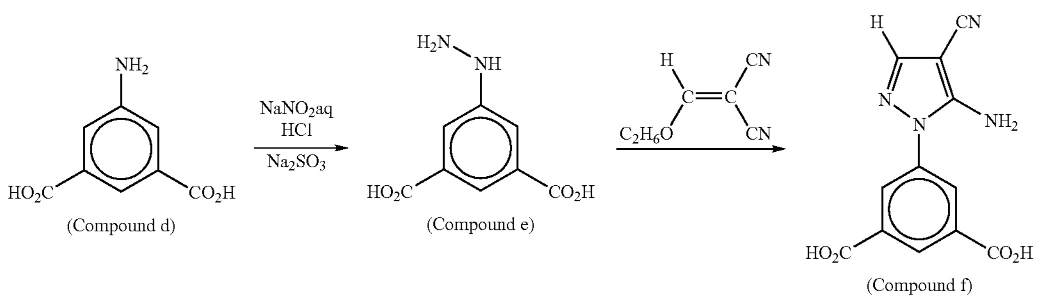

-continued
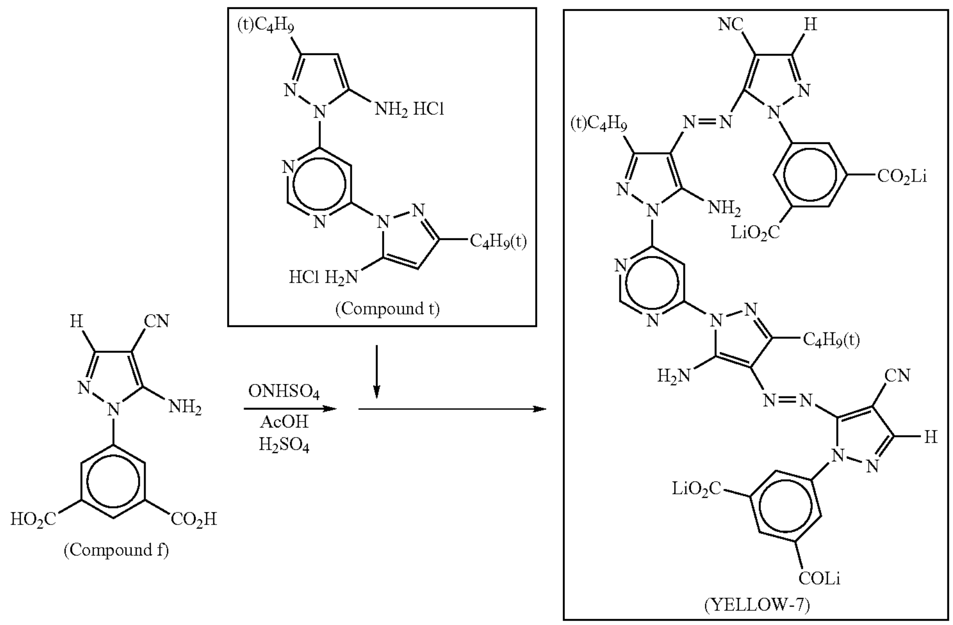
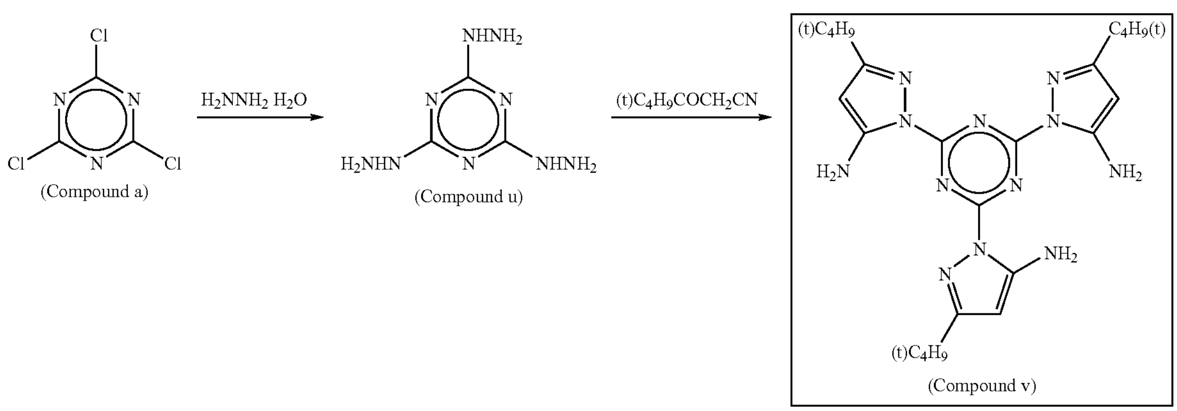
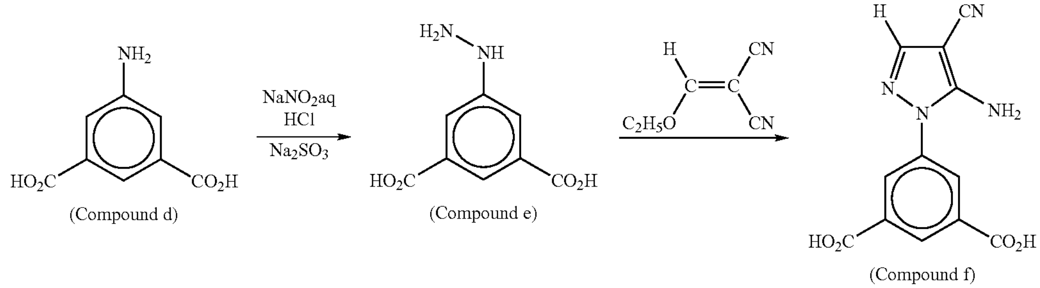

-continued
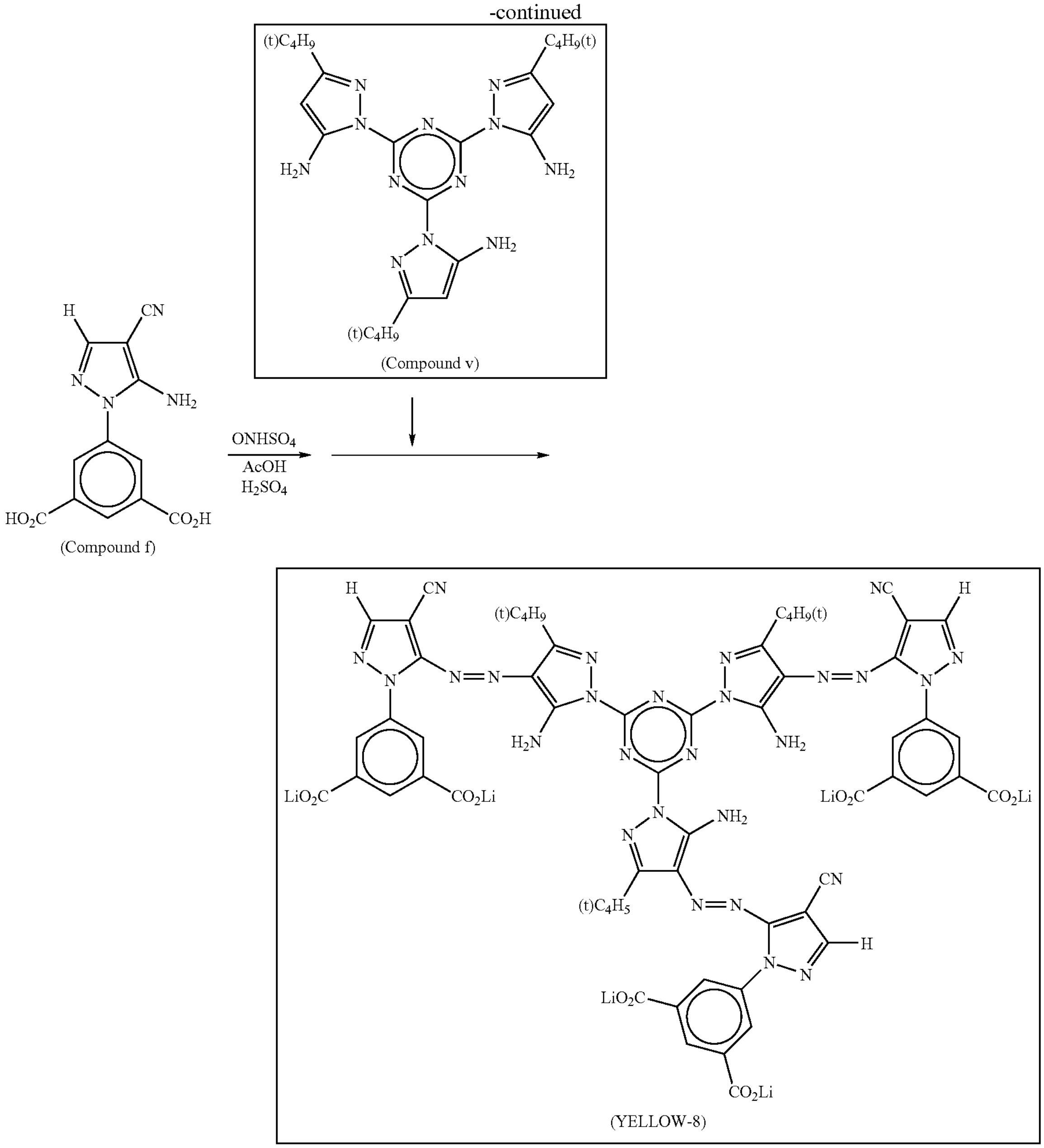
(Compound v)
(Compound f)
(YELLOW-8)
Synthesis Example 3
The synthesis method of Dyestuff (YELLOW-9) is described in detail below.
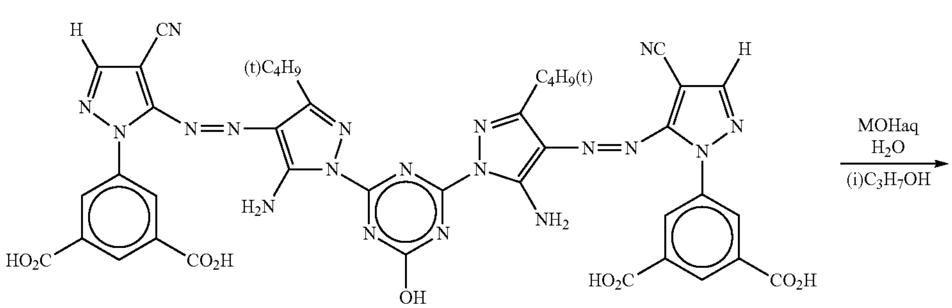

-continued

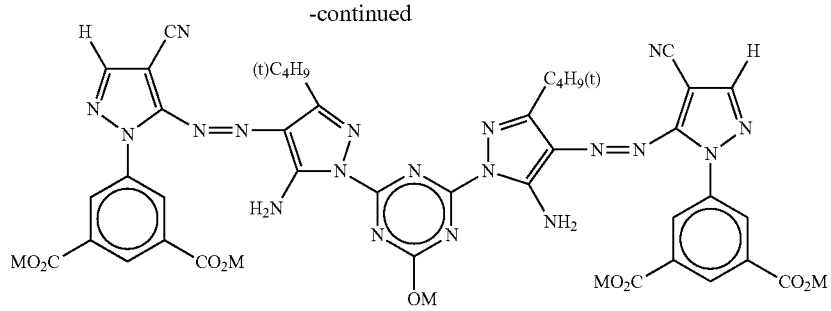

YELLOW-9

DYE-11 (free acid-type crystal) synthesized by the method described in Synthesis Example 1 was neutralized with MOH aq. {preparation of LiOH aq./KOH aq.=9/1 (mol/mol)} and formed into 10 wt % aq. (pH at 25° C.: about 8.0) and after adding IPA at an inner temperature of 50° C., the resulting solution was crystallized, cooled, filtered, washed with IPA and dried to obtain 35 g of YELLOW-9. The maximum absorption wavelength (λmax) and molecular extinction coefficient (ϵ value) in $H_2O$ of the dyestuff synthesized are shown in Table 1.

Synthesis Example 4

Yellow-10, Yellow-11, Yellow-12 and Yellow 13 can be synthesized by the same method as in the synthesis method of the dyestuff above (YELLOW-9) except for performing the neutralization with MOH aq. {preparation of LiOH aq./NaOH aq.=9/1 (mol/mol)}, MOH aq. {preparation of LiOH aq./$NH_4OH$ aq.=9/1 (mol/mol)}, MOH aq. {preparation of LiOH aq./KOH aq.=3/1 (mol/mol)} and MOH aq. {preparation of LiOH aq./NaOH aq.=2/1 (mol/mol)}, respectively. The maximum absorption wavelength (λmax) and molecular extinction coefficient (ϵ value) in $H_2O$ of the dyestuffs synthesized are shown in Table 1.

TABLE 1

| Dye-No. | λmax ($H_2O$) | ϵ ($H_2O$) | Counter Cation |
|---|---|---|---|
| YELLOW-1 | 435.7 nm | $3.30 \times 10^4$ | Li |
| YELLOW-2 | 437.3 nm | $3.20 \times 10^4$ | Li |
| YELLOW-3 | 445.0 nm | $3.90 \times 10^4$ | Li |
| YELLOW-4 | 455.8 nm | $6.10 \times 10^4$ | Li |
| YELLOW-5 | 436.5 nm | $1.90 \times 10^4$ | Li |
| YELLOW-6 | 430.6 nm | $3.24 \times 10^4$ | Li |
| YELLOW-7 | 437.8 nm | $3.80 \times 10^4$ | Li |
| YELLOW-8 | 433.3 nm | $4.48 \times 10^4$ | Li |
| YELLOW-9 | 435.6 nm | $3.35 \times 10^4$ | Li/K = 9/1 |
| YELLOW-10 | 436.0 nm | $3.38 \times 10^4$ | Li/Na = 9/1 |
| YELLOW-11 | 436.4 nm | $3.56 \times 10^4$ | Li/$NH_4$ = 9/1 |
| YELLOW-12 | 435.8 nm | $3.33 \times 10^4$ | Li/K = 3/1 |
| YELLOW-13 | 435.5 nm | $3.35 \times 10^4$ | Li/K = 2/1 |

[Preparation of Each Ink Composition]

Each ink composition was obtained by stirring respective components according to the formulation shown in Tables 2 to 5 below at ordinary temperature for 30 minutes, and filtering the obtained solution through a membrane filter having an opening of 1.0 μm. Here, in Table 1, the numerical value for each component indicates mass % taking the mass of the ink composition as 100%, and "bal." showing the amount of water indicates the amount to make 100% in total with the components other than water.

Also, in Tables 2 to 5, Y indicates a yellow ink composition, LM indicates a light magenta ink composition (pale magenta ink composition), M indicates a magenta ink composition, LC indicates a light cyan ink composition (pale cyan ink composition), C indicates a cyan ink composition, and K indicates a black ink composition.

In Tables 2 and 5, as for the yellow dye, formulae (YELLOW-1), (YELLOW-2) and (YELLOW-3) shown below were used as examples of the compound represented by formula (Y-6-I), formula (YELLOW-4) shown below was used as examples of the compound represented by formula (Y-9), and formulae (YELLOW-5), (YELLOW-6), (YELLOW-7), (YELLOW-8), (YELLOW-9), (YELLOW-10), (YELLOW-11), (YELLOW-12) and (YELLOW-13) shown below were used as examples of the compound represented by formula (Y-I).

(YELLOW-1):

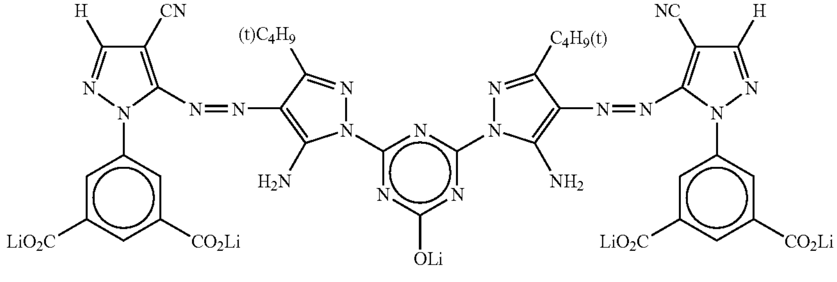

-continued
(YELLOW-2):
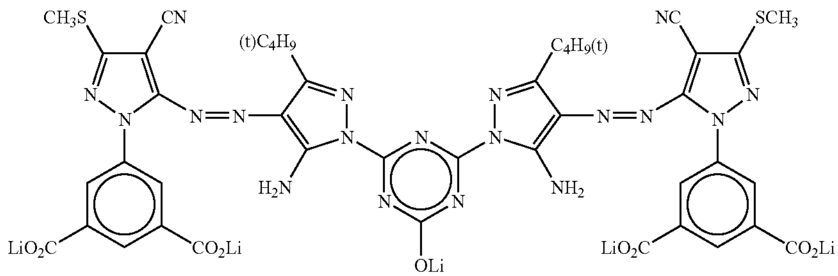
(YELLOW-3):
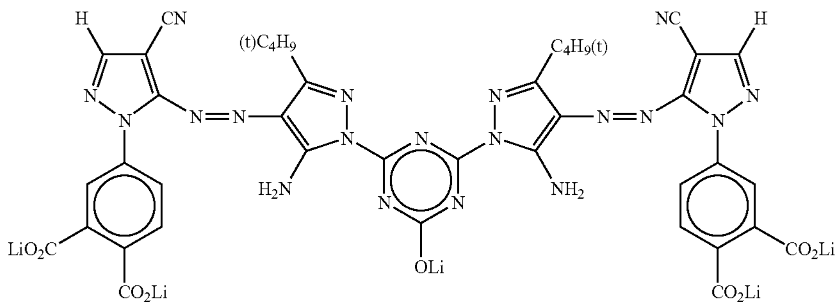
(YELLOW-4):
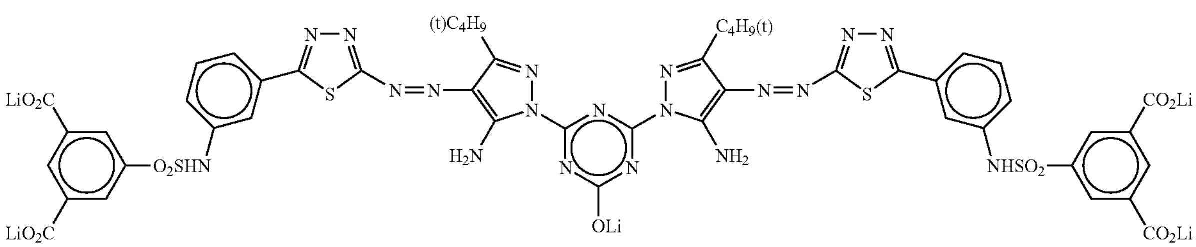
(YELLOW-5):
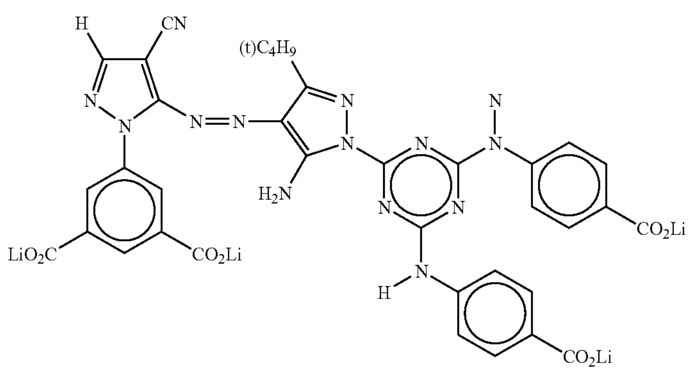
(YELLOW-6):
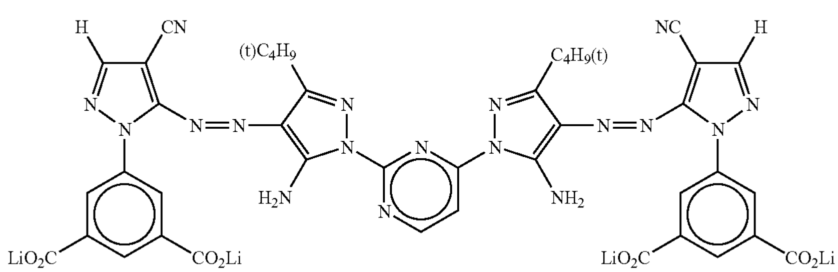

-continued
(YELLOW-7):
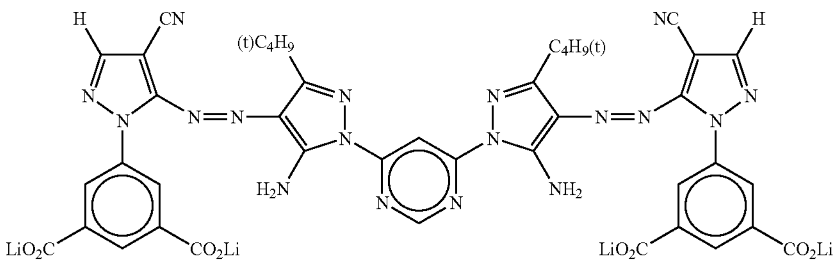
(YELLOW-8):
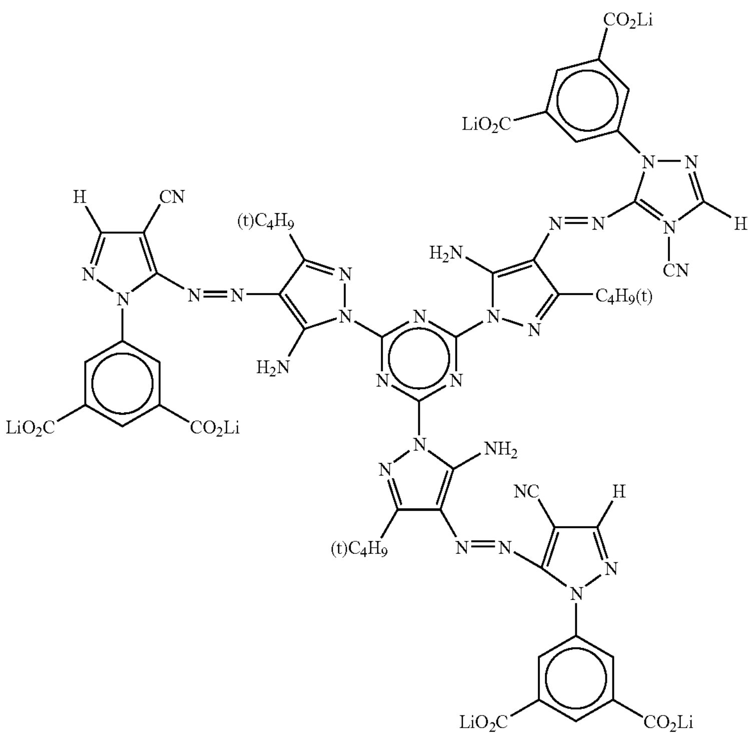
(YELLOW-9):
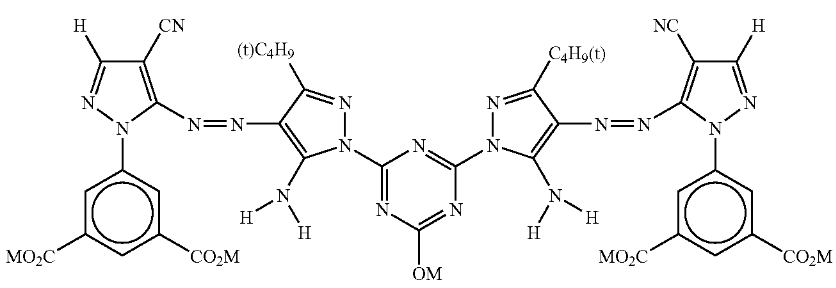
M = Li or Na
Li/Na = 9/1 (mol/mol)

-continued
(YELLOW-10):
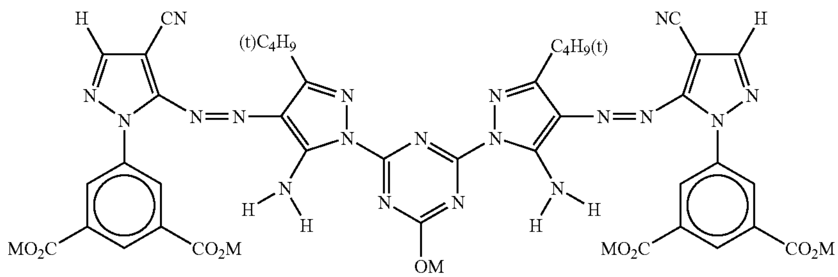
M = Li or K
Li/K = 9/1 (mol/mol)
(YELLOW-11):
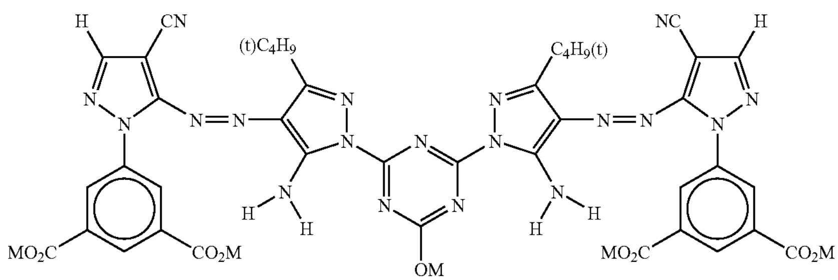
M = Li or $NH_4$
Li/$NH_4$ = 9/1 (mol/mol)
(YELLOW-12):
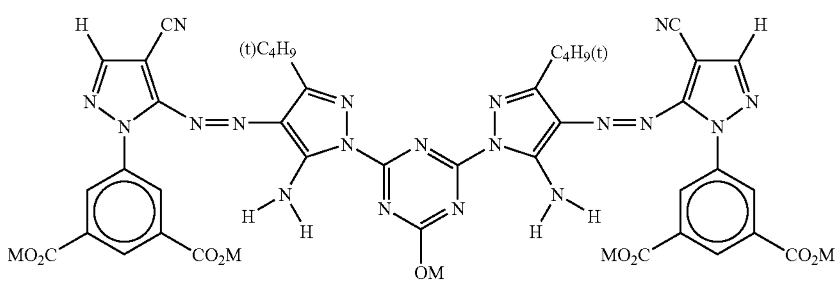
M = Li or K
Li/K = 3/1 (mol/mol)
(YELLOW-13):
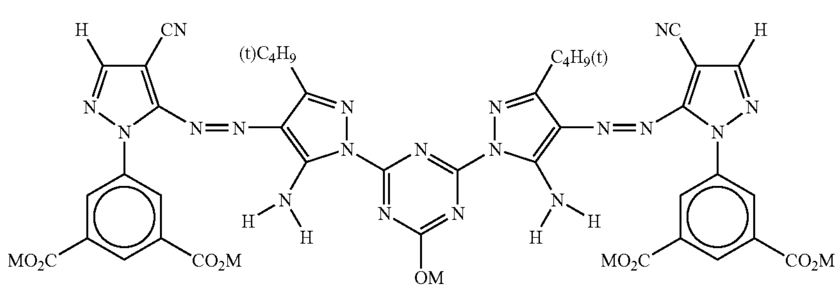
M = Li or K
Li/Na = 2/1 (mol/mol)
As for comparative examples of the yellow dye, formulae (YELLOW-21), (YELLOW-22), (YELLOW-23), (YELLOW-24), (YELLOW-25) and (YELLOW-26) shown below were used.

(YELLOW-21):
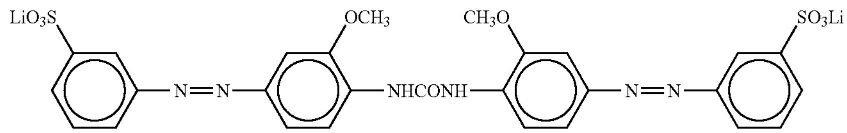
(YELLOW-22):
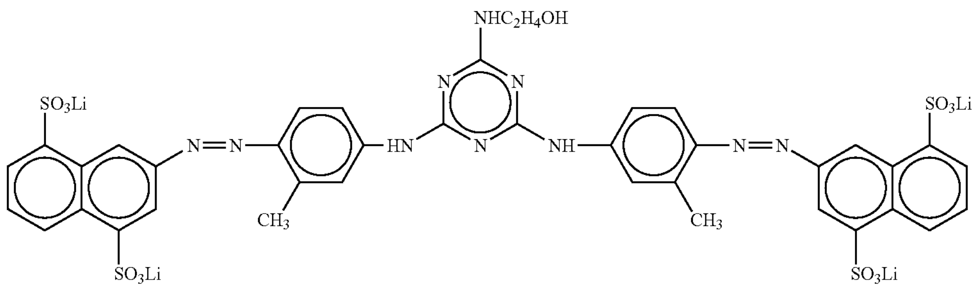
(YELLOW-23):
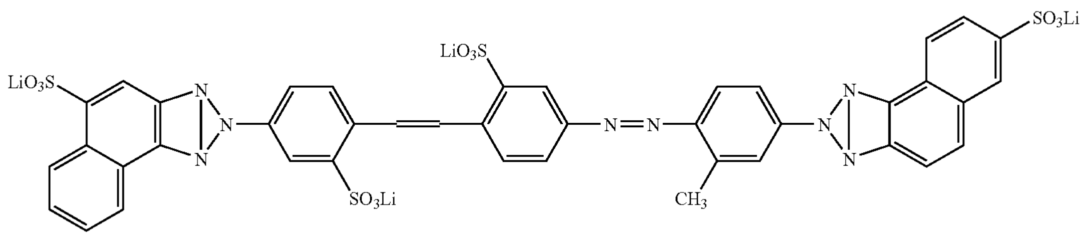
(YELLOW-24):
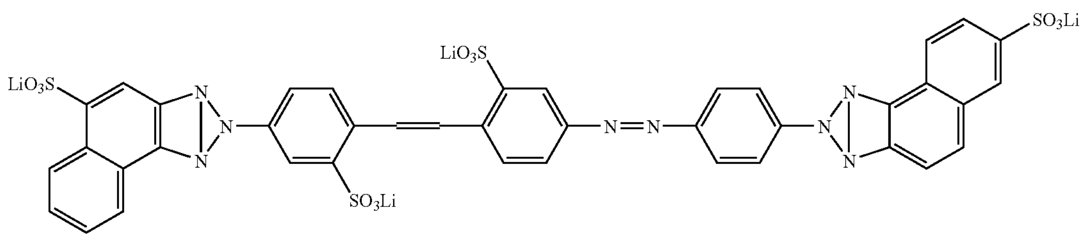
(YELLOW-25):
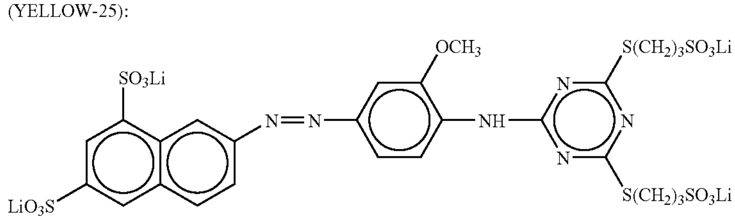
(YELLOW-26):
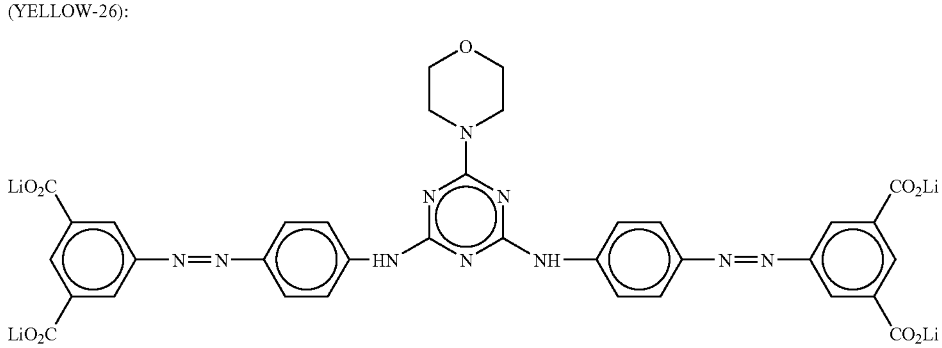

In Tables 3 and 5, as for the magenta dye, formulae (MAGENTA-1) and (MAGENTA-2) shown below were used as examples of the compound represented by formula (M-3).
(MAGENTA-1):
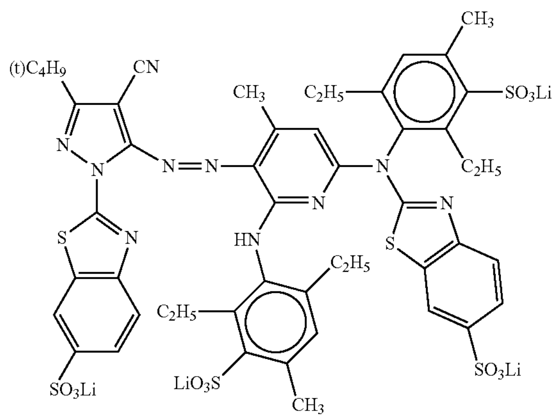
-continued
(MAGENTA-2):
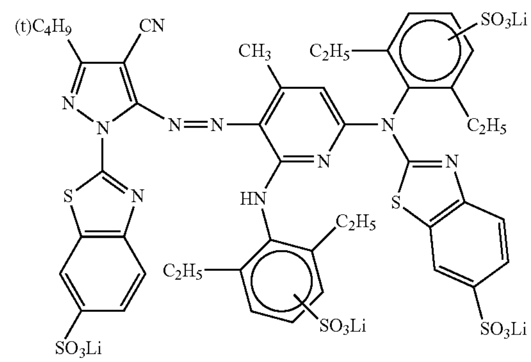
In addition, formulae (MAGENTA-4), (MAGENTA-5) and (MAGENTA-6) shown below were used as examples of the magenta dye other than the dyes shown by (MAGENTA-1) and (MAGENTA-2).
(MAGENTA-4):
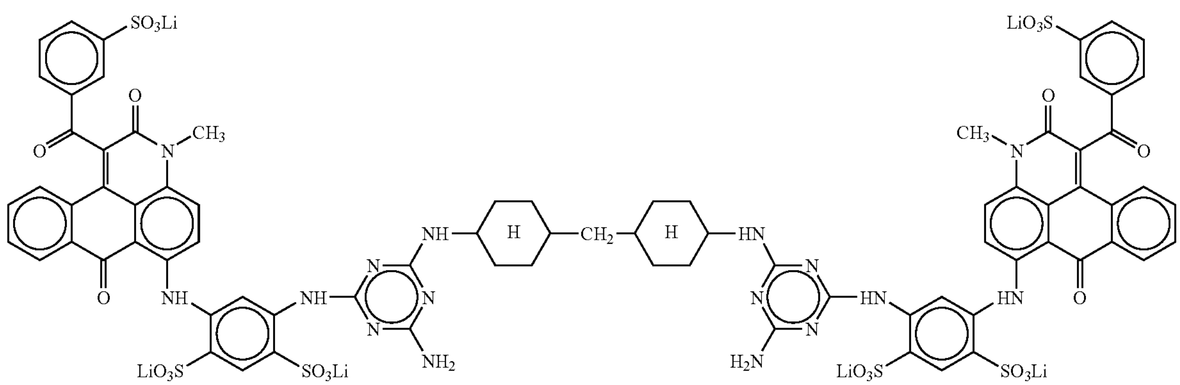
(MAGENTA-5):
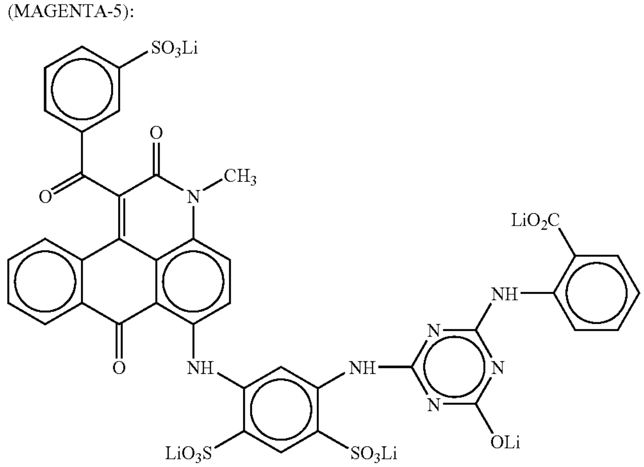

-continued (MAGENTA-6):

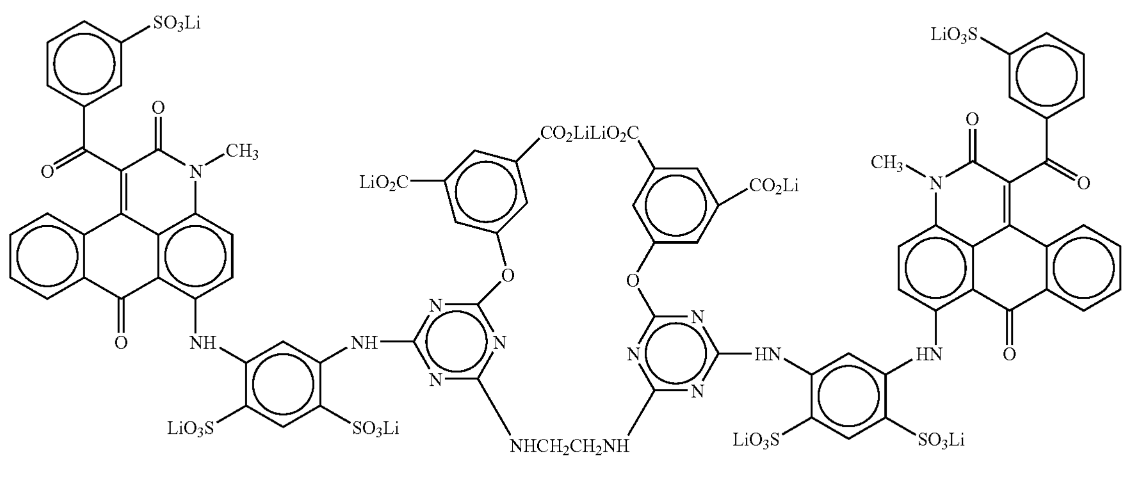

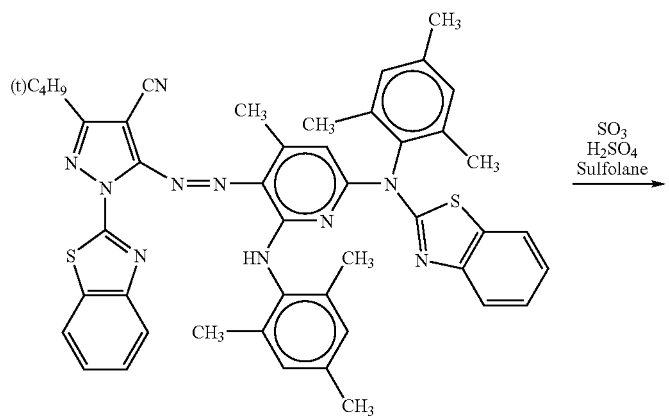

(MAGENTA-11)

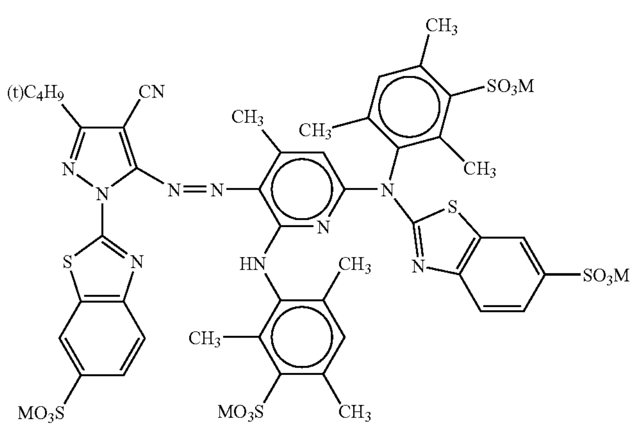

M = Li or K
4M = 3Li + K

Also, (MAGENTA-1) obtained by the method described in JP-A-2006-143989 was dissolved in water, and the resulting solution was passed at 25° C. through a packed tower prepared by packing 200 ml of a lithium/potassium=3/1 (mol/mol) type strong acidic cation exchange resin (a resin obtained by converting Amberlite IR-120B, trade name, produced by Organo Corporation, into a lithium/potassium=3/1 (mol/mol) type) in a cylindrical column. The aqueous solution passed was adjusted to a pH of 7 by using a dilute aqueous lithium/potassium hydroxide (=3/1 mol/mol) solution and then filtered through a membrane filter having an average pore size of 0.22 μm, and the filtrate was concentrated and desiccated under reduced pressure by using a rotary evaporator to obtain (MAGENTA-11) {counter ion in the magenta dye: Li/K=3/1 (mol/mol)}.

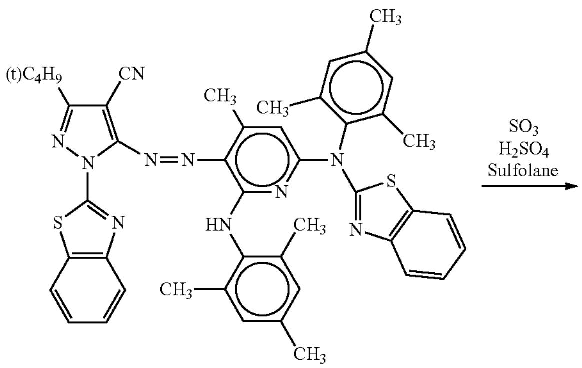

(MAGENTA-12)

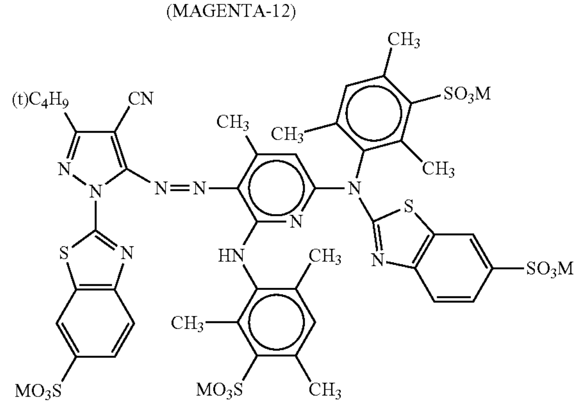

M = Li or K M: Li/K = 2/1

Also, (MAGENTA-1) obtained by the method described in JP-A-2006-143989 was dissolved in water, and the resulting solution was passed at 25° C. through a packed tower prepared by packing 200 ml of a lithium/potassium=2/1 (mol/mol) type strong acidic cation exchange resin (a resin obtained by converting Amberlite IR-120B, trade name, produced by Organo Corporation, into a lithium/potassium=2/1 (mol/mol) type) in a cylindrical column. The aqueous solution passed was adjusted to a pH of 7 by using a dilute aqueous lithium/potassium hydroxide (=2/1 mol/mol) solution and then filtered through a membrane filter having an average pore size of 0.22 and the filtrate was concentrated and desiccated under reduced pressure by using a rotary evaporator to obtain (MAGENTA-11) {counter ion in the magenta dye: Li/K=2/1 (mol/mol)}.

Furthermore, as for the additive (betaine) used in combination with the magenta dye, formula (Betaine-1) shown below was used as an example of formula (W-2).

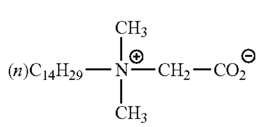

(Betaine-1)

The additive (Betaine-1) is a known compound and can be synthesized and purified by using various production methods individually or in combination.

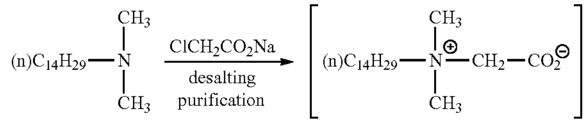

The above-described additive (Betaine-1) for use in the present invention was used by heating with stirring a tertiary amine (N,N-dimethyl-n-tetradecylamine, produced by Kao Corporation) and sodium chloroacetate (produced by Wako Pure Chemical Industries, Ltd.) in an alcohol-based solvent to derive crude Betaine-1, removing the solvent by distillation, and purifying the residue into the desired high-purity product by a combination of the method described in JP-A-2004-285269.

The purity analysis results of Betaine-1 (after purification) used in the present invention are as follows.

HPLC area %=about 98% ($CH_3CN/H_2O$=95/5 v/v, 1 ml/min, detect: 200 nm)

m.p.=from 205 to 206° C.

pH=about 8.33 (20 wt % aq., at 25° C.)

$^1$H-NMR (DMSO-d6): δ value TMS standard: 0.86 (3H, t); 1.23 (22H, m); 1.60 (2H, m); 3.07 (6H, s); 3.44 (2H, m); 3.49 (2H, s).

Ion chromatography ($Cl^-$): N.D. at a concentration equivalent to 20 w % aq.

Ion chromatography ($SO_4^{2-}$): N.D. at a concentration equivalent to 20 w % aq.

In Tables 1 and 2, as for the cyan dye, the compounds shown by the following formulae (CYAN-1) and (CYAN-2) were used as examples of the compound represented by formula (C-3), and the compound shown by (CYAN-3) was used as an example of the compound represented by formula (C-4).

(CYAN-1):

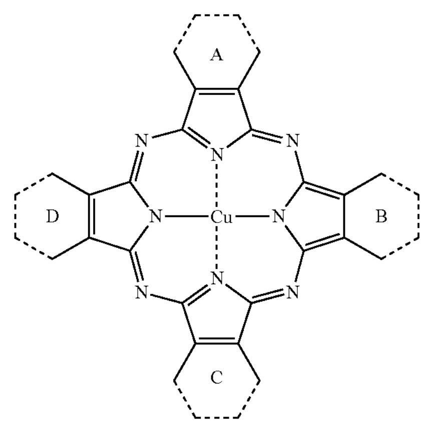

One of rings A to D is

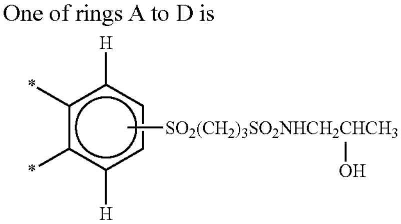

Remaining three rings are

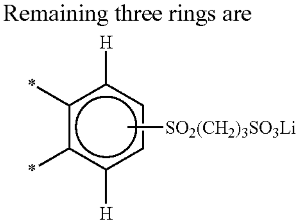

* is a bonding position of the phthalocyanine ring.

(CYAN-2):
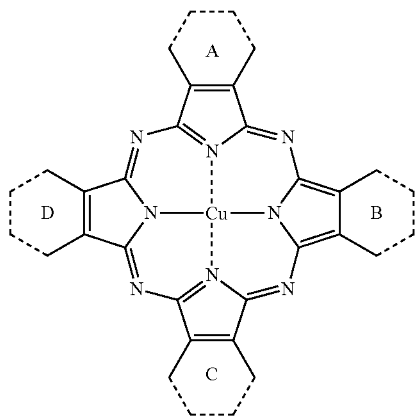
Two of rings A to D are
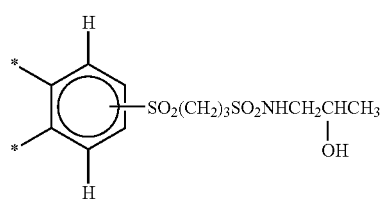
Remaining two rings are
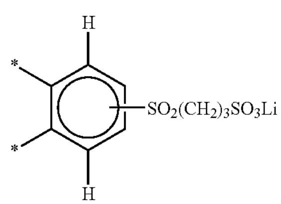
* is a bonding position of the phthalocyanine ring.
(CYAN-3):
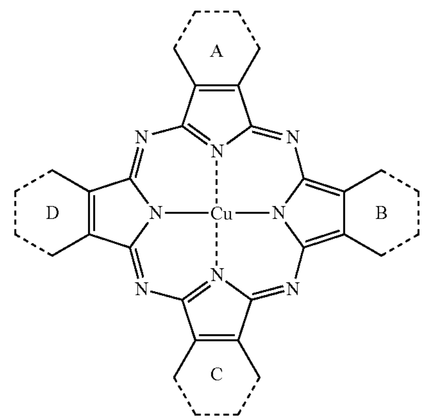
One of rings A to D is
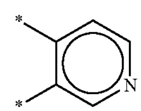
Remaining three rings are
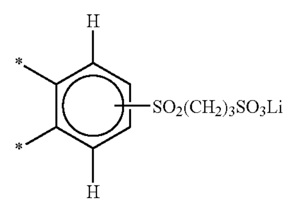
* is a bonding position of the phthalocyanine ring.
In addition, formulae (CYAN-4) and (CYAN-5) were used as examples of the cyan dye other than the dyes shown by (CYAN-1), (CYAN-2) and (CYAN-3).
(CYAN-4):
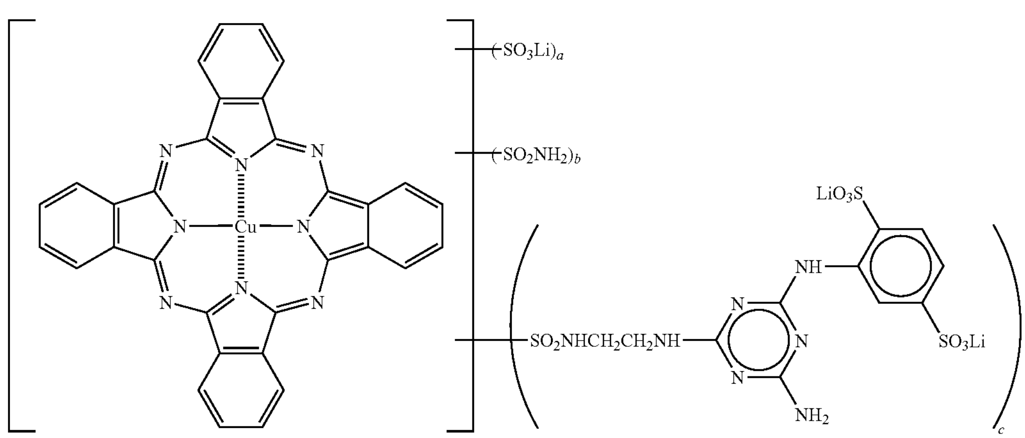

A mixture mainly composed of a=1, b=1 and c=1; a=2, b=1 and c=1; a=1, b=2 and c=1; and a=1, b=1 and c=2.

(CYAN-5):

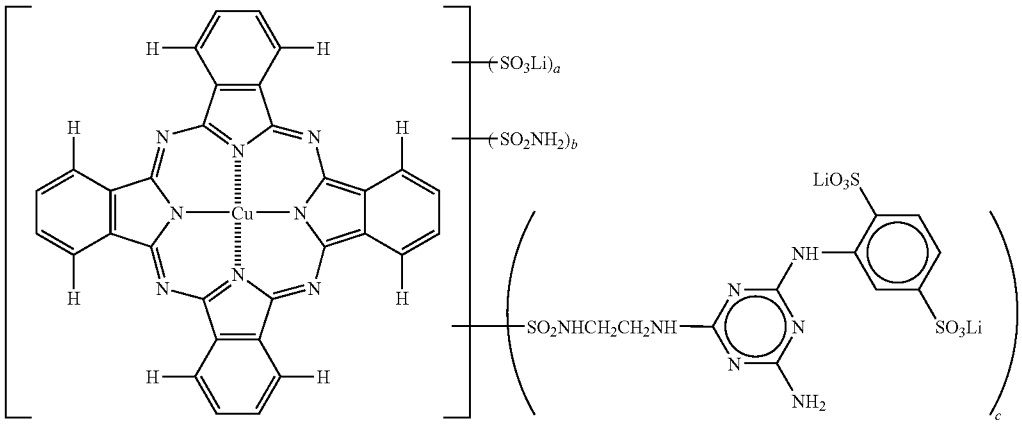

A mixture mainly composed of a=2, b=1 and c=1; a=1, b=2 and c=1; and a=1, b=1 and c=2.

Also, (CYAN-1) was dissolved in water, and the resulting solution was passed at 25° C. through a packed tower prepared by packing 200 ml of a lithium/sodium=3/1 (mol/mol) type strong acidic cation exchange resin (a resin obtained by converting Amberlite IR-120B, trade name, produced by Organo Corporation, into a lithium/sodium=3/1 (mol/mol) type) in a cylindrical column. The aqueous solution passed was adjusted to a pH of 7 by using a dilute aqueous lithium/sodium hydroxide (=3/1 mol/mol) solution and then filtered through a membrane filter having an average pore size of 0.22 μm, and the filtrate was concentrated and desiccated under reduced pressure by using a rotary evaporator to obtain (CYAN-11) {counter ion in the cyan dye: Li/Na=3/1 (mol/mol)}.

(CYAN-11):

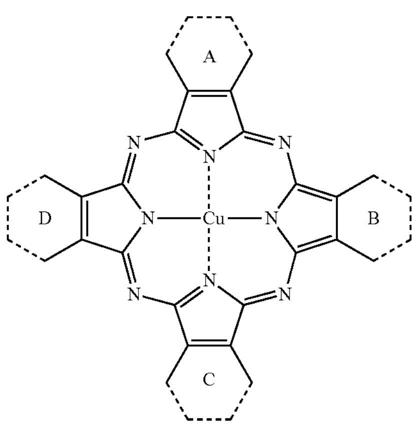

One of rings A to D is

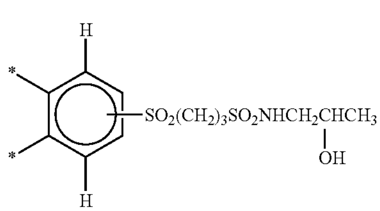

Remaining three rings are

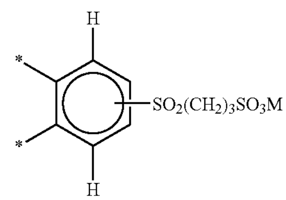

M = Li/Na
Li/Na = 3/1(mol/mol)

* is a bonding position of the phthalocyanine ring.

Furthermore, (CYAN-12) {counter ion in the cyan dye: Li/Na=2/1 (mol/mol)} was obtained by the same operation as in the synthesis method of (CYAN-11) except for dissolving (CYAN-1) in water and passing the resulting solution through a column packed with 200 ml of a lithium/sodium=2/1 (mol/mol) type strong acidic cation exchange resin (a resin obtained by converting Amberlite IR-120B, trade name, produced by Organo Corporation, into a lithium/sodium=2/1 (mol/mol) type).

(CYAN-12):

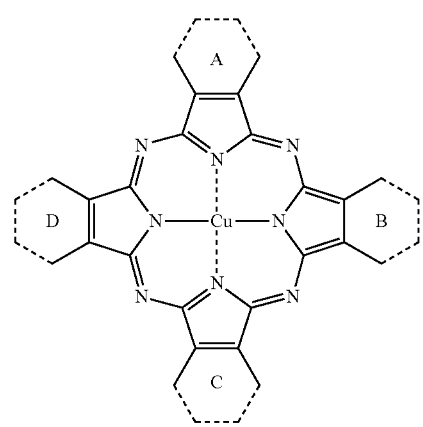

One of rings A to D is

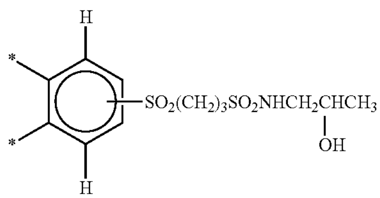

Remaining three rings are

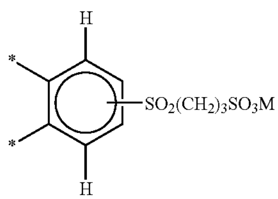

-continued

M = Li/Na
Li/Na = 2/1(mol/mol)

* is a bonding position of the phthalocyanine ring.

Furthermore, formula (Add.-1) shown below was used as an example of the additive used in combination with the cyan dye.

Formula (Add.-1):

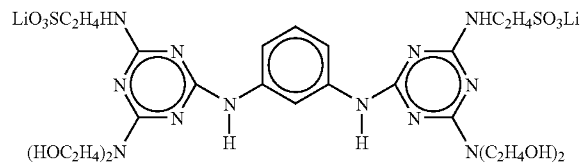

In Table 5, as for the black dye, compounds shown by the following formulae (BLACK-1) and (BLACK-2) were used. Also, in view of adjusting the color hue, compounds shown by the following formulae (BLACK-3) and (BLACK-4) were used in combination as the complementary dye.

(BLACK-1):

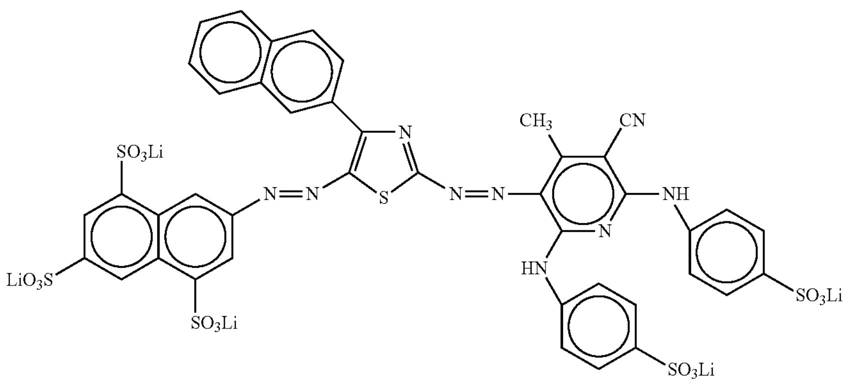

(BLACK-2):

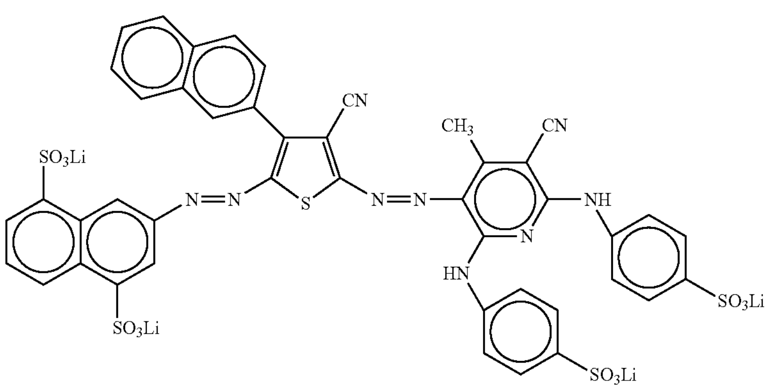

(BLACK-3):

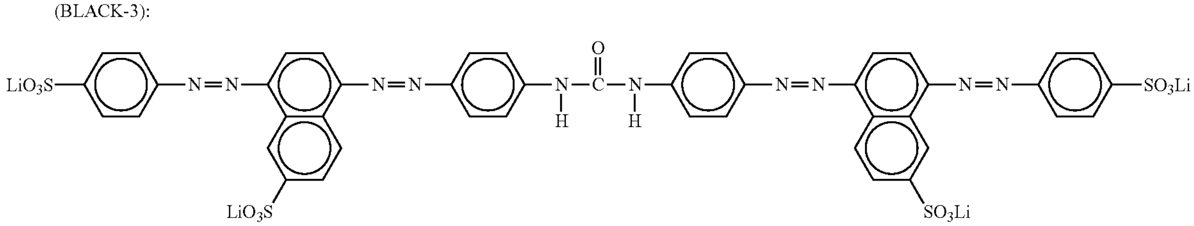

-continued (BLACK-4):

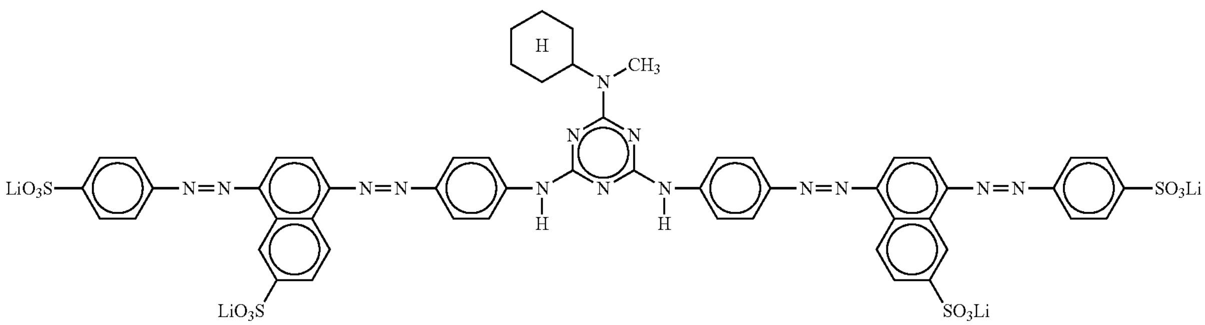

In addition, formulae (BLACK-5) and (BLACK-6) shown below were used as examples of the black dye other than the dyes shown by (BLACK-1), (BLACK-2), (BLACK-3) and (BLACK-4).

Formula (BLACK-5):

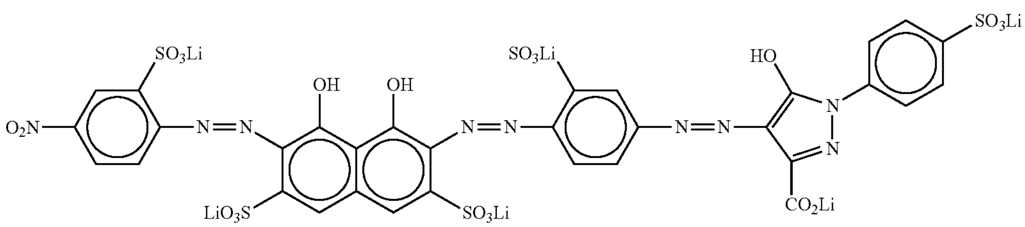

Formula (BLACK-6):

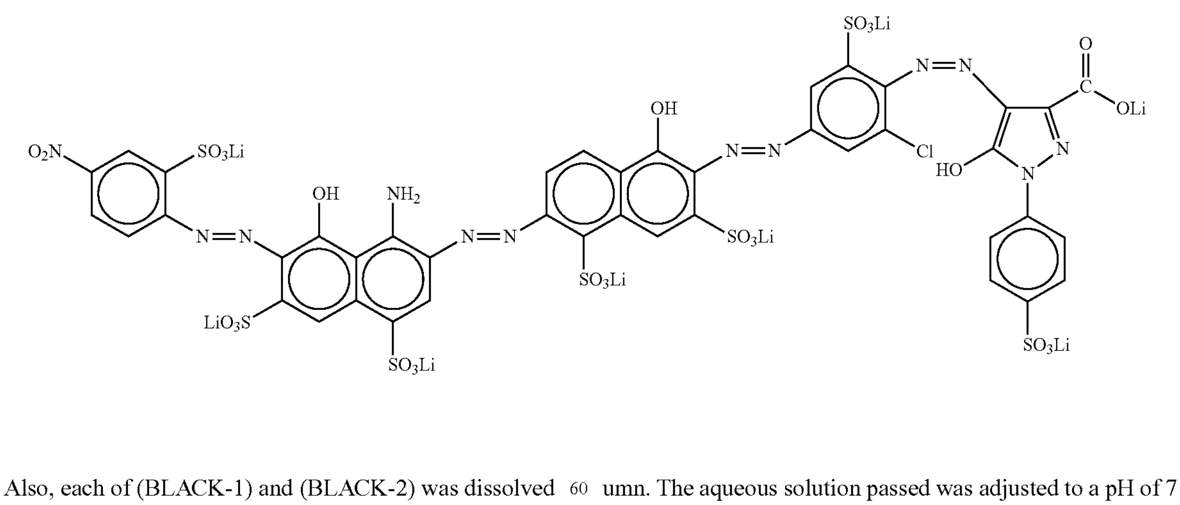

Also, each of (BLACK-1) and (BLACK-2) was dissolved in water, and the resulting solution was passed at 25° C. through a packed tower prepared by packing 200 ml of a lithium/sodium=4/1 (mol/mol) type strong acidic cation exchange resin (a resin obtained by converting Amberlite IR-120B, trade name, produced by Organo Corporation, into a lithium/sodium=4/1 (mol/mol) type) in a cylindrical column. The aqueous solution passed was adjusted to a pH of 7 by using a dilute aqueous lithium/sodium hydroxide (=4/1 mol/mol) solution and then filtered through a membrane filter having an average pore size of 0.22 μm, and the filtrate was concentrated and desiccated under reduced pressure by using a rotary evaporator to obtain (BLACK-11) and (BLACK-12) {counter ion in the black dye: Li/Na=4/1 (mol/mol)}.

Formula (BLACK-11):
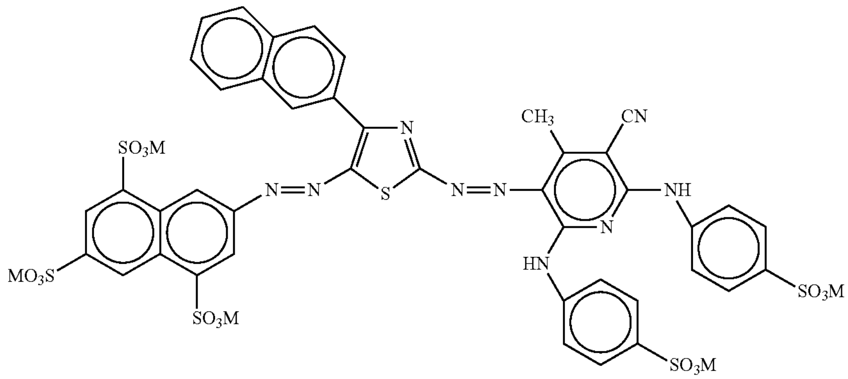
Formula (BLACK-12):
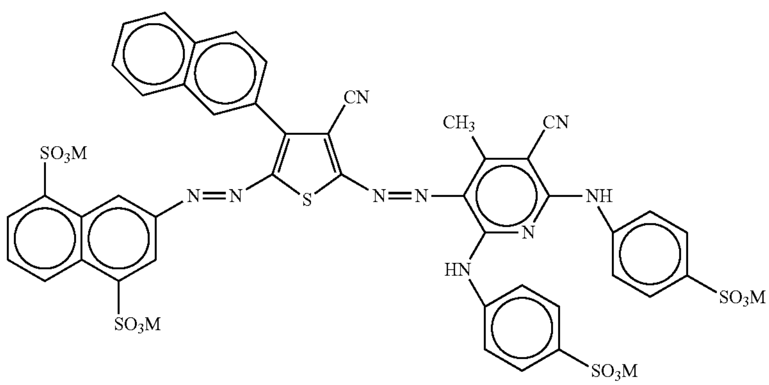
M = Li/Na
TABLE 2
| | Y-01 | Y-02 | Y-03 | Y-04 | Y-05 | Y-06 | Y-07 | Y-08 | Y-09 | Y-10 |
|---|---|---|---|---|---|---|---|---|---|---|
| YELLOW-1 | 5.0 | | | 4.5 | | | | | | |
| YELLOW-2 | | 5.0 | | | | | | | | |
| YELLOW-3 | | | 5.0 | | | | | | | |
| YELLOW-4 | | | | 0.5 | | | | | | |
| YELLOW-5 | | | | | 7.0 | | | | | |
| YELLOW-6 | | | | | | 5.0 | | | | |
| YELLOW-7 | | | | | | | 5.0 | | | |
| YELLOW-8 | | | | | | | | 4.0 | | |
| YELLOW-9 | | | | | | | | | 5.0 | |
| YELLOW-10 | | | | | | | | | | 5.0 |
| YELLOW-11 | | | | | | | | | | |
| YELLOW-12 | | | | | | | | | | |
| YELLOW-13 | | | | | | | | | | |
| YELLOW-21 | | | | | | | | | | |
| YELLOW-22 | | | | | | | | | | |
| YELLOW-23 | | | | | | | | | | |
| YELLOW-24 | | | | | | | | | | |
| YELLOW-25 | | | | | | | | | | |
| YELLOW-26 | | | | | | | | | | |
| Glycerin | 8.0 | 8.0 | 8.0 | 8.0 | 8.0 | 8.0 | 8.0 | 8.0 | 8.0 | 8.0 |
| Triethylene glycol | 10.0 | 10.0 | 10.0 | 10.0 | 10.0 | 10.0 | 10.0 | 10.0 | 10.0 | 10.0 |
| Propylene glycol | 1.0 | 1.0 | 1.0 | 1.0 | 1.0 | 1.0 | 1.0 | 1.0 | 1.0 | 1.0 |
| TEGmBE | 10.0 | 10.0 | 10.0 | 10.0 | 10.0 | 10.0 | 10.0 | 10.0 | 10.0 | 10.0 |
| Olfine E1010(*1) | 1.0 | 1.0 | 1.0 | 1.0 | 1.0 | 1.0 | 1.0 | 1.0 | 1.0 | 1.0 |
| Urea | 1.0 | 1.0 | 1.0 | 1.0 | 1.0 | 1.0 | 1.0 | 1.0 | 1.0 | 1.0 |
| Li Ion mol/100 g | 0.02584 | 0.023592 | 0.02584 | 0.025234 | 0.034635 | 0.021173 | 0.021173 | 0.017419 | 0.022876 | 0.023064 |
| Water | bal. | bal. | bal. | bal. | bal. | bal. | bal. | bal. | bal. | bal. |

TABLE 2-continued

| | Y-11 | Y-12 | Y-13 | Y-21 | Y-22 | Y-23 | Y-24 | Y-25 | Y-26 |
|---|---|---|---|---|---|---|---|---|---|
| YELLOW-1 | | | | | | | | | |
| YELLOW-2 | | | | | | | | | |
| YELLOW-3 | | | | | | | | | |
| YELLOW-4 | | | | | | | | | |
| YELLOW-5 | | | | | | | | | |
| YELLOW-6 | | | | | | | | | |
| YELLOW-7 | | | | | | | | | |
| YELLOW-8 | | | | | | | | | |
| YELLOW-9 | | | | | | | | | |
| YELLOW-10 | | | | | | | | | |
| YELLOW-11 | 5.0 | | | | | | | | |
| YELLOW-12 | | 5.0 | | | | | | | |
| YELLOW-13 | | | 5.0 | | | | | | |
| YELLOW-21 | | | | 5.0 | | | | | |
| YELLOW-22 | | | | | 5.0 | | | | 2.0 |
| YELLOW-23 | | | | | | 5.0 | | | 1.0 |
| YELLOW-24 | | | | | | | 5.0 | | |
| YELLOW-25 | | | | | | | | 5.0 | |
| YELLOW-26 | | | | | | | | | 2.0 |
| Glycerin | 8.0 | 8.0 | 8.0 | 8.0 | 8.0 | 8.0 | 8.0 | 8.0 | 8.0 |
| Triethylene glycol | 10.0 | 10.0 | 10.0 | 10.0 | 10.0 | 10.0 | 10.0 | 10.0 | 10.0 |
| Propylene glycol | 1.0 | 1.0 | 1.0 | 1.0 | 1.0 | 1.0 | 1.0 | 1.0 | 1.0 |
| TEGmBE | 10.0 | 10.0 | 10.0 | 10.0 | 10.0 | 10.0 | 10.0 | 10.0 | 10.0 |
| Olfine E1010(*1) | 1.0 | 1.0 | 1.0 | 1.0 | 1.0 | 1.0 | 1.0 | 1.0 | 1.0 |
| Urea | 1.0 | 1.0 | 1.0 | 1.0 | 1.0 | 1.0 | 1.0 | 1.0 | 1.0 |
| Li Ion mol/100 g | 0.023123 | 0.018607 | 0.016322 | 0.015326 | 0.019946 | 0.020477 | 0.020776 | 0.023567 | 0.02265 |
| Water | bal. | bal. | bal. | bal. | bal. | bal. | bal. | bal. | bal. |

(*1)produced by Nissin Chemical Industry Co., Ltd.
*2: produced by Air Products and Chemicals, Inc.

TABLE 3

| | M-01 | M-02 | M-03 | M-04 | M-05 | M-06 | M-11 | M-12 |
|---|---|---|---|---|---|---|---|---|
| MAGENTA-1 | 4.0 | | 4.0 | | | | | |
| MAGENTA-2 | | 4.0 | | | | | | |
| MAGENTA-4 | | | | 4.0 | | | | |
| MAGENTA-5 | | | | | 7.0 | | | |
| MAGENTA-6 | | | | | | 4.0 | | |
| MAGENTA-11 | | | | | | | 4.0 | |
| MAGENTA-12 | | | | | | | | 4.0 |
| Glycerin | 10.0 | 10.0 | 10.0 | 10.0 | 10.0 | 10.0 | 10.0 | 10.0 |
| Triethylene glycol | 2.0 | 2.0 | 2.0 | 2.0 | 2.0 | 2.0 | 2.0 | 2.0 |
| Propylene glycol | 1.0 | 1.0 | 1.0 | 1.0 | 1.0 | 1.0 | 1.0 | 1.0 |
| TEGmBE | 10.0 | 10.0 | 10.0 | 10.0 | 10.0 | 10.0 | 10.0 | 10.0 |
| Urea | 0.5 | 0.5 | 0.5 | 0.5 | 0.5 | 0.5 | 0.5 | 0.5 |
| Betaine 1 | 2.0 | 2.0 | | | | | 2.0 | 2.0 |
| Li Ion mol/100 g | 0.01332 | 0.01364 | 0.01332 | 0.01295 | 0.03603 | 0.01944 | 0.00973 | 0.00857 |
| Water | bal. | bal. | bal. | bal. | bal. | bal. | bal. | bal. |

*1: produced by Nissin Chemical Industry Co., Ltd.
*2: produced by Air Products and Chemicals, Inc.

TABLE 4

| | C-01 | C-02 | C-03 | C-04 | C-05 | C-11 | C-12 |
|---|---|---|---|---|---|---|---|
| CYAN-1 | 5.0 | 4.0 | 4.0 | | | | |
| CYAN-2 | | 1.0 | | | | | |
| CYAN-3 | | | 1.0 | | | | |
| CYAN-4 | | | | 5.0 | | | |
| CYAN-5 | | | | | 5.0 | | |
| CYAN-11 | | | | | | 5.0 | |
| CYAN-12 | | | | | | | 5.0 |
| Glycerin | 10.0 | 10.0 | 10.0 | 10.0 | 10.0 | 10.0 | 10.0 |
| Triethylene glycol | 2.0 | 2.0 | 2.0 | 2.0 | 2.0 | 2.0 | 2.0 |
| Propylene glycol | 0.5 | 0.5 | 0.5 | 0.5 | 0.5 | 0.5 | 0.5 |
| 1,2-Hexanediol | 2.0 | 2.0 | 2.0 | 2.0 | 2.0 | 2.0 | 2.0 |
| TEGmBE | 10.0 | 10.0 | 10.0 | 10.0 | 10.0 | 10.0 | 10.0 |
| Olfine E1010(*1) | 1.5 | 1.5 | 1.5 | 1.5 | 1.5 | 1.5 | 1.5 |
| 2-Pyrrolidone | 3.0 | 3.0 | 3.0 | 3.0 | 3.0 | 3.0 | 3.0 |
| Urea | 0.5 | 0.5 | 0.5 | 0.5 | 0.5 | 0.5 | 0.5 |

TABLE 4-continued

| | C-01 | C-02 | C-03 | C-04 | C-05 | C-11 | C-12 |
|---|---|---|---|---|---|---|---|
| Add. 1 | 2.0 | 2.0 | 2.0 | 2.0 | 2.0 | 2.0 | 2.0 |
| Aminoguanidine hydrochloride | 2.0 | 2.0 | 2.0 | 2.0 | 2.0 | 2.0 | 2.0 |
| Li Ion mol/100 g | 0.01622 | 0.01545 | 0.01667 | 0.01905 | 0.01905 | 0.01347 | 0.01256 |
| Water | bal. | bal. | bal. | bal. | bal. | bal. | bal. |

(*1)produced by Nissin Chemical Industry Co., Ltd.

TABLE 5

| | B-01 | B-02 | B-03 | B-04 | B-05 | B-11 | B-12 | LM-01 |
|---|---|---|---|---|---|---|---|---|
| BLACK-1 | 6.0 | 6.0 | | | | | | |
| BLACK-2 | | | 6.0 | 2.0 | | | | |
| BLACK-3 | 1.0 | | | 1.0 | 0.5 | 1.0 | | |
| BLACK-4 | | 1.0 | 1.0 | | | | 1.0 | |
| BLACK-5 | | | | | 6.5 | | | |
| BLACK-6 | | | | 4.0 | | | | |
| BLACK-11 | | | | | | 6.0 | | |
| BLACK-12 | | | | | | | 6.0 | |
| MAGENTA-1 | | | | | | | | 1.5 |
| MAGENTA-2 | | | | | | | | |
| MAGENTA-4 | | | | | | | | |
| MAGENTA-5 | | | | | | | | |
| MAGENTA-6 | | | | | | | | |
| MAGENTA-11 | | | | | | | | |
| MAGENTA-12 | | | | | | | | |
| CYAN-1 | | | | | | | | |
| CYAN-2 | | | | | | | | |
| CYAN-3 | | | | | | | | |
| CYAN-4 | | | | | | | | |
| CYAN-5 | | | | | | | | |
| CYAN-11 | | | | | | | | |
| CYAN-12 | | | | | | | | |
| Glycerin | 8.0 | 8.0 | 8.0 | 8.0 | 8.0 | 8.0 | 8.0 | 10.0 |
| Triethylene glycol | 1.0 | 1.0 | 1.0 | 1.0 | 1.0 | 1.0 | 1.0 | 4.0 |
| Propylene glycol | 0.5 | 0.5 | 0.5 | 0.5 | 0.5 | 0.5 | 0.5 | 0.5 |
| 1,2-Hexanediol | 2.0 | 2.0 | 2.0 | 2.0 | 2.0 | 2.0 | 2.0 | 1.0 |
| TEGmBE | 8.0 | 8.0 | 8.0 | 8.0 | 8.0 | 8.0 | 8.0 | 10.0 |
| Olfine E1010(*1) | 1.5 | 1.5 | 1.5 | 1.5 | 1.5 | 1.5 | 1.5 | |
| 2-Pyrrolidone | 4.0 | 4.0 | 4.0 | 4.0 | 4.0 | 4.0 | 4.0 | 4.0 |
| Urea | | | | | | | | 2.0 |
| Betaine 1 | | | | | | | | 1.5 |
| Add. 1 | | | | | | | | |
| Aminoguanidine hydrochloride | | | | | | | | |
| Li Ion mol/100 g | 0.030472 | 0.029983 | 0.025882 | 0.0332694 | 0.037993 | 0.024822 | 0.021139 | 0.004995 |
| Water | bal. | bal. | bal. | bal. | bal. | bal. | bal. | bal. |

| | LM-02 | LM-03 | LM-04 | LC-01 | LC-02 | LC-03 | LC-04 |
|---|---|---|---|---|---|---|---|
| BLACK-1 | | | | | | | |
| BLACK-2 | | | | | | | |
| BLACK-3 | | | | | | | |
| BLACK-4 | | | | | | | |
| BLACK-5 | | | | | | | |
| BLACK-6 | | | | | | | |
| BLACK-11 | | | | | | | |
| BLACK-12 | | | | | | | |
| MAGENTA-1 | | | | | | | |
| MAGENTA-2 | 1.5 | 0.5 | | | | | |
| MAGENTA-4 | | | | | | | |
| MAGENTA-5 | | | | | | | |
| MAGENTA-6 | | | 2.5 | | | | |
| MAGENTA-11 | | 1.0 | | | | | |
| MAGENTA-12 | | | | | | | |
| CYAN-1 | | | | | | | |
| CYAN-2 | | | | 2.0 | | | |
| CYAN-3 | | | | | 2.0 | | |
| CYAN-4 | | | | | | | |
| CYAN-5 | | | | | | 2.0 | |
| CYAN-11 | | | | | | | 2.0 |
| CYAN-12 | | | | | | | |
| Glycerin | 10.0 | 10.0 | 10.0 | 10.0 | 10.0 | 10.0 | 10.0 |
| Triethylene glycol | 4.0 | 4.0 | 9.0 | 5.0 | 5.0 | 5.0 | 5.0 |
| Propylene glycol | 0.5 | 0.5 | | | | | |
| 1,2-Hexanediol | 1.0 | 1.0 | | 2.0 | 2.0 | 2.0 | 2.0 |

TABLE 5-continued

| | | | | | | | |
|---|---|---|---|---|---|---|---|
| TEGmBE | 10.0 | 10.0 | 10.0 | 10.0 | 10.0 | 10.0 | 10.0 |
| Olfine E1010(*1) | | | 1.0 | 1.0 | 1.0 | 1.0 | 1.0 |
| 2-Pyrrolidone | 4.0 | 4.0 | 4.0 | 3.0 | 3.0 | 3.0 | 3.0 |
| Urea | 2.0 | 2.0 | 2.0 | | | | |
| Betaine 1 | 1.5 | 1.5 | | | | | |
| Add. 1 | | | | 1.0 | 1.0 | 1.0 | 1.0 |
| Aminoguanidine hydrochloride | | | | 1.0 | 1.0 | 1.0 | 1.0 |
| Li Ion mol/100 g | 0.005115 | 0.004137 | 0.012153 | 0.005502 | 0.007939 | 0.008166 | 0.005934 |
| Water | bal. | bal. | bal. | bal. | bal. | bal. | bal. |

unit: mass %
(*1)produced by Nissin Chemical Industry Co., Ltd.

The ink sets of Examples 1 to 25 and Comparative Examples 1 to 9 were produced using the prepared respective ink compositions by the combination shown in Table 6. Incidentally, the ink sets by the combination shown in Table 6 contain no light ink composition, that is, no light magenta ink composition and no light cyan ink composition.

TABLE 6

| Ink Set | Composition No. | Li Ion Concentration | Li Ion mol/100 g | Composition No. | Li Ion Concentration | Li Ion mol/100 g |
|---|---|---|---|---|---|---|
| | Yellow | | | Magenta | | |
| Example 1 | Y-01 | 99.9 | 0.025839526 | M-01 | 99.9 | 0.013321011 |
| Example 2 | Y-02 | 99.9 | 0.023592028 | M-01 | 99.9 | 0.013321011 |
| Example 3 | Y-03 | 99.9 | 0.025839526 | M-01 | 99.9 | 0.013321011 |
| Example 4 | Y-04 | 99.9 | 0.025233578 | M-01 | 99.9 | 0.013321011 |
| Example 5 | Y-05 | 99.9 | 0.034635033 | M-01 | 99.9 | 0.013321011 |
| Example 6 | Y-06 | 99.9 | 0.021173207 | M-01 | 99.9 | 0.013321011 |
| Example 7 | Y-07 | 99.9 | 0.021173207 | M-01 | 99.9 | 0.013321011 |
| Example 8 | Y-08 | 99.9 | 0.017418695 | M-01 | 99.9 | 0.013321011 |
| Example 9 | Y-09 | 90 | 0.022875618 | M-01 | 99.9 | 0.013321011 |
| Example 10 | Y-10 | 90 | 0.023064386 | M-01 | 99.9 | 0.013321011 |
| Example 11 | Y-11 | 90 | 0.023123169 | M-01 | 99.9 | 0.013321011 |
| Example 12 | Y-12 | 75 | 0.018606728 | M-01 | 99.9 | 0.013321011 |
| Example 13 | Y-01 | 99.9 | 0.025839526 | M-11 | 75 | 0.009730229 |
| Example 14 | Y-01 | 99.9 | 0.025839526 | M-01 | 99.9 | 0.013321011 |
| Example 15 | Y-01 | 99.9 | 0.025839526 | M-01 | 99.9 | 0.013321011 |
| Example 16 | Y-01 | 99.9 | 0.025839526 | M-02 | 99.9 | 0.013639541 |
| Example 17 | Y-01 | 99.9 | 0.025839526 | M-03 | 99.9 | 0.013321011 |
| Example 18 | Y-01 | 99.9 | 0.025839526 | M-01 | 99.9 | 0.013321011 |
| Example 19 | Y-01 | 99.9 | 0.025839526 | M-01 | 99.9 | 0.013321011 |
| Example 20 | Y-01 | 99.9 | 0.025839526 | M-01 | 99.9 | 0.013321011 |
| Example 21 | Y-01 | 99.9 | 0.025839526 | M-01 | 99.9 | 0.013321011 |
| Example 22 | Y-01 | 99.9 | 0.025839526 | M-01 | 99.9 | 0.013321011 |
| Example 23 | Y-01 | 99.9 | 0.025839526 | M-04 | 99.9 | 0.012948755 |
| Example 24 | Y-01 | 99.9 | 0.025839526 | M-05 | 100.9 | 0.03602565 |
| Example 25 | Y-01 | 99.9 | 0.025839526 | M-06 | 101.9 | 0.019444566 |
| Comp. Ex. 1 | Y-13 | 67 | 0.016322267 | M-01 | 99.9 | 0.013321011 |
| Comp. Ex. 2 | Y-01 | 99.9 | 0.025839526 | M-12 | 67 | 0.008574904 |
| Comp. Ex. 3 | Y-01 | 99.9 | 0.025839526 | M-01 | 99.9 | 0.013321011 |
| Comp. Ex. 4 | Y-21 | 99.9 | 0.01532567 | M-01 | 99.9 | 0.013321011 |
| Comp. Ex. 5 | Y-22 | 99.9 | 0.019945549 | M-01 | 99.9 | 0.013321011 |
| Comp. Ex. 6 | Y-23 | 99.9 | 0.020477326 | M-01 | 99.9 | 0.013321011 |
| Comp. Ex. 7 | Y-24 | 99.9 | 0.020775767 | M-01 | 99.9 | 0.013321011 |
| Comp. Ex. 8 | Y-25 | 99.9 | 0.023567397 | M-01 | 99.9 | 0.013321011 |
| Comp. Ex. 9 | Y-26 | 99.9 | 0.022650099 | M-01 | 99.9 | 0.013321011 |
| | Cyan | | | Black | | |
| Example 1 | C-01 | 99.9 | 0.016221635 | B-01 | 99.9 | 0.030472319 |
| Example 2 | C-01 | 99.9 | 0.016221635 | B-01 | 99.9 | 0.030472319 |
| Example 3 | C-01 | 99.9 | 0.016221635 | B-01 | 99.9 | 0.030472319 |
| Example 4 | C-01 | 99.9 | 0.016221635 | B-01 | 99.9 | 0.030472319 |
| Example 5 | C-01 | 99.9 | 0.016221635 | B-01 | 99.9 | 0.030472319 |
| Example 6 | C-01 | 99.9 | 0.016221635 | B-01 | 99.9 | 0.030472319 |
| Example 7 | C-01 | 99.9 | 0.016221635 | B-01 | 99.9 | 0.030472319 |
| Example 8 | C-01 | 99.9 | 0.016221635 | B-01 | 99.9 | 0.030472319 |
| Example 9 | C-01 | 99.9 | 0.016221635 | B-01 | 99.9 | 0.030472319 |
| Example 10 | C-01 | 99.9 | 0.016221635 | B-01 | 99.9 | 0.030472319 |
| Example 11 | C-01 | 99.9 | 0.016221635 | B-01 | 99.9 | 0.030472319 |
| Example 12 | C-01 | 99.9 | 0.016221635 | B-01 | 99.9 | 0.030472319 |
| Example 13 | C-01 | 99.9 | 0.016221635 | B-01 | 99.9 | 0.030472319 |
| Example 14 | C-11 | 75 | 0.013465994 | B-01 | 99.9 | 0.030472319 |
| Example 15 | C-01 | 99.9 | 0.016221635 | B-11 | 80 | 0.024821783 |
| Example 16 | C-01 | 99.9 | 0.016221635 | B-01 | 99.9 | 0.030472319 |
| Example 17 | C-01 | 99.9 | 0.016221635 | B-01 | 99.9 | 0.030472319 |
| Example 18 | C-02 | 99.9 | 0.015454515 | B-01 | 99.9 | 0.030472319 |

TABLE 6-continued

| Ink Set | Composition No. | Li Ion Concentration | Li Ion mol/100 g | Composition No. | Li Ion Concentration | Li Ion mol/100 g |
|---|---|---|---|---|---|---|
| Example 19 | C-03 | 99.9 | 0.016673162 | B-01 | 99.9 | 0.030472319 |
| Example 20 | C-01 | 99.9 | 0.016221635 | B-02 | 99.9 | 0.029982529 |
| Example 21 | C-01 | 99.9 | 0.016221635 | B-03 | 99.9 | 0.025882216 |
| Example 22 | C-01 | 99.9 | 0.016221635 | B-04 | 99.9 | 0.033269365 |
| Example 23 | C-01 | 99.9 | 0.016221635 | B-01 | 99.9 | 0.030472319 |
| Example 24 | C-04 | 99.9 | 0.019046613 | B-01 | 99.9 | 0.030472319 |
| Example 25 | C-05 | 99.9 | 0.019046613 | B-05 | 99.9 | 0.037993491 |
| Comp. Ex. 1 | C-01 | 99.9 | 0.016221635 | B-01 | 99.9 | 0.030472319 |
| Comp. Ex. 2 | C-01 | 99.9 | 0.016221635 | B-01 | 99.9 | 0.030472319 |
| Comp. Ex. 3 | C-12 | 67 | 0.012558009 | B-12 | 80 | 0.021138768 |
| Comp. Ex. 4 | C-01 | 99.9 | 0.016221635 | B-01 | 99.9 | 0.030472319 |
| Comp. Ex. 5 | C-01 | 99.9 | 0.016221635 | B-01 | 99.9 | 0.030472319 |
| Comp. Ex. 6 | C-01 | 99.9 | 0.016221635 | B-01 | 99.9 | 0.030472319 |
| Comp. Ex. 7 | C-01 | 99.9 | 0.016221635 | B-01 | 99.9 | 0.030472319 |
| Comp. Ex. 8 | C-01 | 99.9 | 0.016221635 | B-01 | 99.9 | 0.030472319 |
| Comp. Ex. 9 | C-01 | 99.9 | 0.016221635 | B-01 | 99.9 | 0.030472319 |

A single color image pattern for respective colors and green, red and gray image patterns, which are composed of yellow, magenta, cyan and black (black was included only when the ink set contains a black ink composition) and in which the density was stepwise changed to give an OD value of 0.7 to 1.8 for each color, were printed on an inkjet exclusive recording medium {Photographic paper <KOTAKU> (trade name, produced by Seiko Epson Corporation)} by using an inkjet printer, Stylus Color 880 (trademark) (trade name, manufactured by Seiko Epson Corporation), and using the ink set shown in Table 6, and the image fastness (light fastness/ozone gas resistance) and image quality (bronze gloss) were evaluated.

[Ozone Fastness Test Method]

The recorded material was exposed to an ozone gas for 7 days under the conditions set to an ozone gas concentration of 5 ppm (25° C., 60% RH). The ozone gas concentration was set using an ozone gas monitor (Model: OZG-EM-01) manufactured by APPLICS. The OD value of each of colors recorded in each printed material was measured using a reflection densitometer (X-Rite 310TR) every time a fixed period passed from the initiation of exposure. Incidentally, the reflection density was measured at 3 points of 0.7, 1.0 and 1.8.

The residual ratio of optical density (ROD) was determined from the obtained results according to the formula: ROD $(\%)=(D/D_0)\times100$.

(In the formula, D indicates the OD value after the exposure test, and $D_0$ indicates the OD value before the exposure test.)

Based on the test results above, the ozone fastness of each of colors recorded in the recorded material was ranked on a scale of A to D by using the following criteria for judgment.

[Criteria for Judgment]

Rank A: ROD after 7 days from the initiation of test is 85% or more at all points of density.

Rank B: ROD after 7 days from the initiation of test is less than 85% at any one point of density.

Rank C: ROD after 7 days from the initiation of test is less than 85% at any two points of density.

Rank D: ROD after 7 days from the initiation of test is less than 85% at all points of density.

In this test, a recorded material causing little reduction in ROD even when exposed to ozone for a long period time is excellent. The results obtained are shown as "Ozone Gas Fastness" in Table 7.

[Light Fastness Test Method]

Xenon light (100,000 lux) was irradiated on the image for 14 days by using a weather meter (manufactured by Atlas). The OD value of each of colors recorded in each printed material was measured using a reflection densitometer (X-Rite 310TR) every time a fixed period passed from the initiation of irradiation. Incidentally, the reflection density was measured at 3 points of 0.7, 1.0 and 1.8.

The residual ratio of optical density (ROD) was determined from the obtained results according to the formula: ROD $(\%)=(D/D_0)\times100$.

(In the formula, D indicates the OD value after the exposure test, and $D_0$ indicates the OD value before the exposure test.)

Based on the test results above, the light fastness of each of colors recorded in the recorded material was ranked on a scale of A to D by using the following criteria for judgment.

[Criteria for Judgment]

Rank A: ROD after 14 days from the initiation of test is 85% or more at all points of density.

Rank B: ROD after 14 days from the initiation of test is less than 85% at any one point of density.

Rank C: ROD after 14 days from the initiation of test is less than 85% at any two points of density.

Rank D: ROD after 14 days from the initiation of test is less than 85% at all points of density.

In this test, a recorded material causing little reduction in ROD even when exposed to light for a long period time is excellent. The results obtained are shown in Table 7.

TABLE 7

| | Ozone Gas Fastness | | | | | | | | Light Fastness | | | | | | | |
|---|---|---|---|---|---|---|---|---|---|---|---|---|---|---|---|---|
| | Yellow | Magenta | Cyan | Red | Green | Blue | Gray | Black | Yellow | Magenta | Cyan | Red | Green | Blue | Gray | Black |
| Example 1 | A | A | A | A | A | A | A | A | A | A | A | A | A | A | A | A |
| Example 2 | A | A | A | A | A | A | A | A | A | A | A | A | A | A | A | A |
| Example 3 | A | A | A | A | A | A | A | A | A | A | A | A | A | A | A | A |
| Example 4 | A | A | A | A | A | A | A | A | A | A | A | A | A | A | A | A |
| Example 5 | A | A | A | A | A | A | A | A | A | A | A | A | A | A | A | A |
| Example 6 | A | A | A | A | A | A | A | A | A | A | A | A | A | A | A | A |

TABLE 7-continued

| | Ozone Gas Fastness | | | | | | | | Light Fastness | | | | | | | |
|---|---|---|---|---|---|---|---|---|---|---|---|---|---|---|---|---|
| | Yellow | Magenta | Cyan | Red | Green | Blue | Gray | Black | Yellow | Magenta | Cyan | Red | Green | Blue | Gray | Black |
| Example 7 | A | A | A | A | A | A | A | A | A | A | A | A | A | A | A | A |
| Example 8 | A | A | A | A | A | A | A | A | A | A | A | A | A | A | A | A |
| Example 9 | A | A | A | A | A | A | A | A | A | A | A | A | A | A | A | A |
| Example 10 | A | A | A | A | A | A | A | A | A | A | A | A | A | A | A | A |
| Example 11 | A | A | A | A | A | A | A | A | A | A | A | A | A | A | A | A |
| Example 12 | A | A | A | A | A | A | A | A | A | A | A | A | A | A | A | A |
| Example 13 | A | A | A | A | A | A | A | A | A | A | A | A | A | A | A | A |
| Example 14 | A | A | A | A | A | A | A | A | A | A | A | A | A | A | A | A |
| Example 15 | A | A | A | A | A | A | A | A | A | A | A | A | A | A | A | A |
| Example 16 | A | A | A | A | A | A | A | A | A | A | A | A | A | A | A | A |
| Example 17 | A | B | A | A | A | A | B | A | A | B | A | A | A | A | B | A |
| Example 18 | A | A | A | A | A | A | A | A | A | A | A | A | A | A | A | A |
| Example 19 | A | A | A | A | A | A | A | A | A | A | A | A | A | A | A | A |
| Example 20 | A | A | A | A | A | A | A | A | A | A | A | A | A | A | A | A |
| Example 21 | A | A | A | A | A | A | A | A | A | A | A | A | A | A | A | A |
| Example 22 | A | A | A | A | A | A | A | B | A | A | A | A | A | A | A | A |
| Comp. Ex. 1 | A | A | A | A | A | A | A | A | A | A | A | A | A | A | A | A |
| Comp. Ex. 2 | A | A | A | A | A | A | A | A | A | A | A | A | A | A | A | A |
| Comp. Ex. 3 | A | A | A | A | A | A | A | A | A | A | A | A | A | A | A | A |
| Comp. Ex. 4 | C | A | A | C | C | A | B | A | D | A | A | D | D | A | A | A |
| Comp. Ex. 5 | C | A | A | C | C | A | B | A | C | A | A | C | C | A | A | A |
| Comp. Ex. 6 | D | A | A | D | D | A | C | A | B | A | A | B | B | A | A | A |
| Comp. Ex. 7 | D | A | A | D | D | A | C | A | B | A | A | B | B | A | A | A |
| Comp. Ex. 8 | D | A | A | D | D | A | C | A | B | A | A | B | B | A | A | A |
| Comp. Ex. 9 | B | A | A | B | B | A | A | A | D | A | A | D | D | A | C | A |

Furthermore, the following bronze evaluation was performed.

[Bronze Evaluation]

With respect to the ink sets of Examples 1 to 25 and Comparative Examples 1 to 9, a solid image of cyan or blue (cyan+magenta) was printed on an inkjet exclusive recording medium (Photographic Paper <KOTAKU>) to give a shooting amount of 1.5 to 2.2 mg per square inch. The obtained printed material was measured (measuring angle: 60°) using a gloss meter (PG-1M, manufactured by Nippon Denshoku Industries Co., Ltd.) to determine the glossiness. The print was evaluated in an environment of 25° C. and 50% RH. The obtained glossiness and the elevation value calculated according to the following formula were used as the standard for judging the degree of bronze phenomenon generation, and judgment was performed based on the following criteria for judgment.

Elevation value=glossiness(printed material)−glossiness(recording medium)

[Criteria for Judgment]

Rank A: less than 15

Rank B: from 15 to less than 35

Rank C: from 35 to less than 55

Rank D: 55 or more

The results obtained are shown as “Bronze Gloss” in Table 8.

TABLE 8

| | Bronze Gloss | | | | | | | |
|---|---|---|---|---|---|---|---|---|
| | Yellow | Magenta | Cyan | Red | Green | Blue | Gray | Black |
| Example 1 | A | A | A | A | A | A | A | A |
| Example 2 | A | A | A | A | A | A | A | A |
| Example 3 | A | A | A | A | A | A | A | A |
| Example 4 | A | A | A | A | B | A | A | A |
| Example 5 | A | A | A | A | A | A | A | A |
| Example 6 | A | A | A | A | A | A | A | A |
| Example 7 | A | A | A | A | A | A | A | A |
| Example 8 | A | A | A | A | A | A | A | A |
| Example 9 | A | A | A | A | A | A | A | A |
| Example 10 | A | A | A | A | A | A | A | A |
| Example 11 | A | A | A | A | A | A | A | A |
| Example 12 | A | A | A | A | B | B | B | A |
| Example 13 | A | A | A | A | A | B | B | A |
| Example 14 | A | A | A | A | A | A | A | A |
| Example 15 | A | A | A | A | A | A | A | B |
| Example 16 | A | A | A | A | A | A | A | A |
| Example 17 | A | A | A | A | A | A | A | A |
| Example 18 | A | A | A | A | A | A | A | A |
| Example 19 | A | A | A | A | A | A | A | A |
| Example 20 | A | A | A | A | A | A | A | A |
| Example 21 | A | A | A | A | A | A | A | A |
| Example 22 | A | A | A | A | A | A | A | A |
| Example 23 | A | A | A | A | A | A | A | A |
| Example 24 | A | A | A | A | A | A | A | A |
| Example 25 | A | A | A | A | A | A | A | A |

TABLE 8-continued

| | Bronze Gloss | | | | | | | |
|---|---|---|---|---|---|---|---|---|
| | Yellow | Magenta | Cyan | Red | Green | Blue | Gray | Black |
| Comparative Example 1 | C | A | A | B | D | A | B | A |
| Comparative Example 2 | A | B | A | B | A | C | B | A |
| Comparative Example 3 | A | A | C | A | D | D | B | D |
| Comparative Example 4 | A | A | A | A | A | A | A | A |
| Comparative Example 5 | A | A | A | A | A | A | A | A |
| Comparative Example 6 | A | A | A | A | A | A | A | A |
| Comparative Example 7 | A | A | A | A | A | A | A | A |
| Comparative Example 8 | A | A | A | A | A | A | A | A |
| Comparative Example 9 | A | A | A | A | A | A | A | A |

INDUSTRIAL APPLICABILITY

Thanks to the ink set of the present invention, a good image where in addition to the colorability, fastness and storability of a single color part of an image on a recorded material obtained by printing, a bronze phenomenon is at the same time improved at a high level also in a mixed color portion, particularly, in a region where a yellow dye and a cyan dye are printed, can be formed.

While the invention has been described in detail and with reference to specific embodiments thereof, it will be apparent to one skilled in the art that various changes and modifications can be made therein without departing from the spirit and scope thereof.

The invention claimed is:

1. An ink set, comprising:

at least a yellow ink composition; a magenta ink composition; and a cyan ink composition, wherein the yellow ink composition contains, as a yellow colorant, at least one member selected from the group consisting of a compound represented by the following formula (Y-I) and a salt thereof, each of a yellow colorant, a magenta colorant and a cyan colorant contained in the yellow ink composition, the magenta ink composition and the cyan ink composition, respectively, has at least one ionic hydrophilic group, a counter ion of the ionic hydrophilic group contains a lithium ion, and a lithium ion concentration is 70 mol % or more based on total cations in each ink composition:

Formula (Y-I):

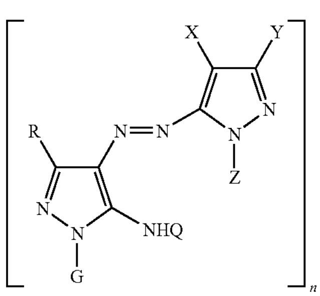

wherein G represents a heterocyclic group;

n represents an integer of 1 to 3;

when n is 1, R, X, Y, Z, Q and G each represents a monovalent group;

when n is 2, R, X, Y, Z, Q and G each represents a monovalent or divalent substituent, and at least one member represents a divalent substituent; and when n is 3, R, X, Y, Z, Q and G each represents a monovalent, divalent or trivalent substituent, and at least two members represent a divalent substituent or at least one member represents a trivalent substituent, provided that formula (Y-I) has at least one ionic hydrophilic group and a counter ion of the ionic hydrophilic group contains a lithium ion.

2. An ink set, comprising:

at least a yellow ink composition; a magenta ink composition; and a cyan ink composition, wherein the yellow ink composition contains, as a yellow colorant, at least one member selected from the group consisting of a compound represented by the following formula (Y-I) and a salt thereof, each of a yellow colorant, a magenta colorant and a cyan colorant contained in the yellow ink composition, the magenta ink composition and the cyan ink composition, respectively, has at least one ionic hydrophilic group, a counter ion of the ionic hydrophilic group contains a lithium ion, a mol number per ink unit weight of the lithium ion contained in the yellow ink composition is from $2.0\times10^{-5}$ to $1.0\times10^{-3}$ mol/g, a mol number per ink unit weight of the lithium ion contained in the magenta ink composition is from $2.0\times10^{-6}$ to $1.0\times10^{-3}$ mol/g, and a mol number per ink unit weight of the lithium ion contained in the cyan ink composition is from $5.0\times10^{-6}$ to $1.0\times10^{-3}$ mol/g:

Formula (Y-I):

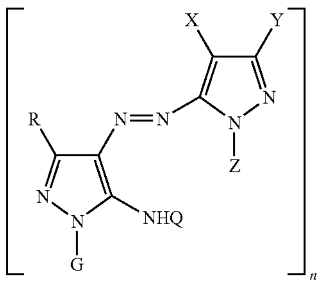

wherein G represents a heterocyclic group;
n represents an integer of 1 to 3;
when n is 1, R, X, Y, Z, Q and G each represents a monovalent group;
when n is 2, R, X, Y, Z, Q and G each represents a monovalent or divalent substituent, and at least one member represents a divalent substituent; and
when n is 3, R, X, Y, Z, Q and G each represents a monovalent, divalent or trivalent substituent, and at least two members represent a divalent substituent or at least one member represents a trivalent substituent,
provided that formula (Y-I) has at least one ionic hydrophilic group and a counter ion of the ionic hydrophilic group contains a lithium ion.

3. The ink set according to claim 1,
wherein the compound represented by formula (Y-I) or a salt thereof is any one of compounds represented by the following formulae (Y-1), (Y-2), (Y-3), (Y-4) and (Y-5) and salts thereof:

Formula (Y-1):

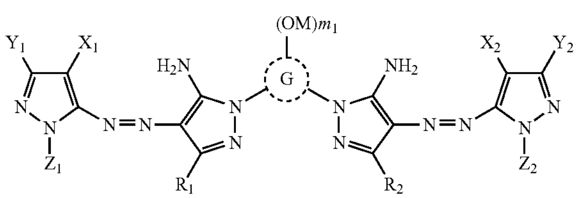

wherein $R_1$, $R_2$, $X_1$, $X_2$, $Y_1$, $Y_2$, $Z_1$ and $Z_2$ each represents a monovalent group,
G represents an atomic group necessary to complete a 5- to 8-membered nitrogen-containing heterocycle,
M represents a hydrogen or a cation, and
$m_1$ represents an integer of 0 to 3,
provided that formula (Y-1) has at least one ionic hydrophilic group and a counter ion of the ionic hydrophilic group contains a lithium ion;

Formula (Y-2):

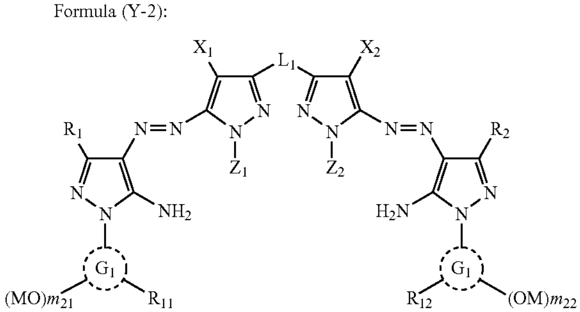

wherein $R_1$, $R_2$, $R_{11}$, $R_{12}$, $X_1$, $X_2$, $Z_1$ and $Z_2$ each represents a monovalent group,
$L_1$ represents a divalent linking group,
$G_1$ and $G_2$ each independently represents an atomic group necessary to complete a 5- to 8-membered nitrogen-containing heterocycle,
M represents a hydrogen or a cation, and
$m_{21}$ and $m_{22}$ each independently represents an integer of 0 to 3,
provided that formula (Y-2) has at least one ionic hydrophilic group and a counter ion of the ionic hydrophilic group contains a lithium ion;

Formula (Y-3):

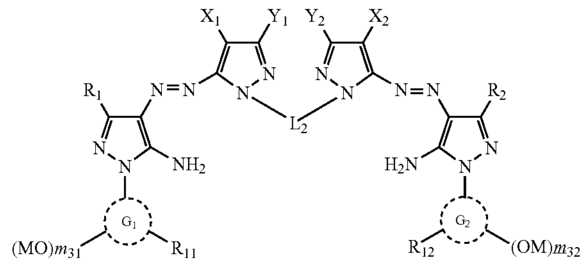

wherein $R_1$, $R_2$, $R_{11}$, $R_{12}$, $X_1$, $X_2$, $Y_1$ and $Y_2$ each represents a monovalent group,
$L_2$ represents a divalent linking group,
$G_1$ and $G_2$ each independently represents an atomic group necessary to complete a 5- to 8-membered nitrogen-containing heterocycle,
M represents a hydrogen or a cation, and
$m_{31}$ and $m_{32}$ each independently represents an integer of 0 to 3,
provided that formula (Y-3) has at least one ionic hydrophilic group and a counter ion of the ionic hydrophilic group contains a lithium ion;

Formula (Y-4):

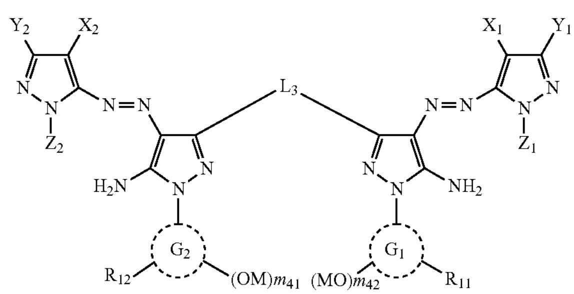

wherein $R_{11}$, $R_{12}$, $X_1$, $X_2$, $Y_1$, $Y_2$, $Z_1$ and $Z_2$ each represents a monovalent group,
$L_3$ represents a divalent linking group,
$G_1$ and $G_2$ each independently represents an atomic group necessary to complete a 5- to 8-membered nitrogen-containing heterocycle,
M represents a hydrogen or a cation, and
$m_{41}$ and $m_{42}$ each independently represents an integer of 0 to 3,
provided that formula (Y-4) has at least one ionic hydrophilic group and a counter ion of the ionic hydrophilic group contains a lithium ion;

Formula (Y-5):

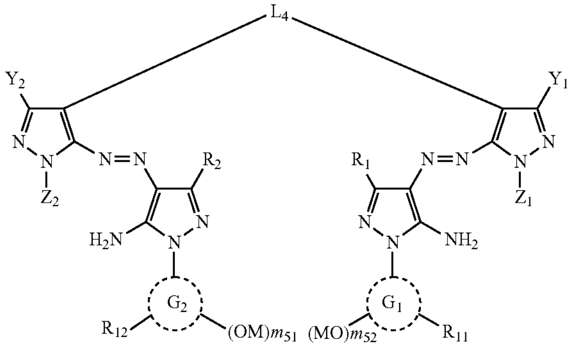

wherein $R_1$, $R_2$, $R_{11}$, $R_{12}$, $Y_1$, $Y_2$, $Z_1$ and $Z_2$ each represents a monovalent group, $L_4$ represents a divalent linking group, $G_1$ and $G_2$ each independently represents an atomic group necessary to complete a 5- to 8-membered nitrogen-containing heterocycle, M represents a hydrogen or a cation, and $m_{51}$ and $m_{52}$ each independently represents an integer of 0 to 3, provided that formula (Y-5) has at least one ionic hydrophilic group and a counter ion of the ionic hydrophilic group contains a lithium ion.

4. The ink set according to claim 3, wherein, in formulae (Y-1), (Y-2), (Y-3), (Y-4) and (Y-5), the nitrogen-containing heterocycle constituted by G, $G_1$ or $G_2$ is an S-triazine ring.

5. The ink set according to claim 3, wherein the compound represented by formula (Y-1) and a salt thereof are a compound represented by the following formula (Y-6) and a salt thereof:

Formula (Y-6):

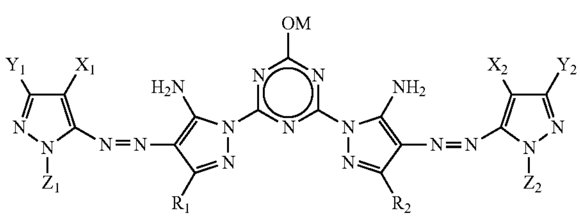

wherein $R_1$, $R_2$, $Y_1$ and $Y_2$ each represents a monovalent group;

$X_1$ and $X_2$ each independently represents an electron-withdrawing group having a Hammett's σp value of 0.20 or more;

$Z_1$ and $Z_2$ each independently represents a hydrogen, a substituted or unsubstituted alkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group; and M represents a hydrogen or a cation, provided that formula (Y-6) has at least one ionic hydrophilic group and a counter ion of the ionic hydrophilic group contains a lithium ion.

6. The ink set according to claim 2, wherein the compound represented by formula (Y-I) or a salt thereof is any one of compounds represented by the following formulae (Y-1), (Y-2), (Y-3), (Y-4) and (Y-5) and salts thereof:

Formula (Y-1):

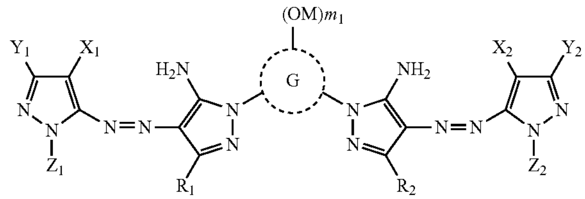

wherein $R_1$, $R_2$, $X_1$, $X_2$, $Y_1$, $Y_2$, $Z_1$ and $Z_2$ each represents a monovalent group, G represents an atomic group necessary to complete a 5- to 8-membered nitrogen-containing heterocycle, M represents a hydrogen or a cation, and $m_1$ represents an integer of 0 to 3, provided that formula (Y-1) has at least one ionic hydrophilic group and a counter ion of the ionic hydrophilic group contains a lithium ion;

Formula (Y-2):

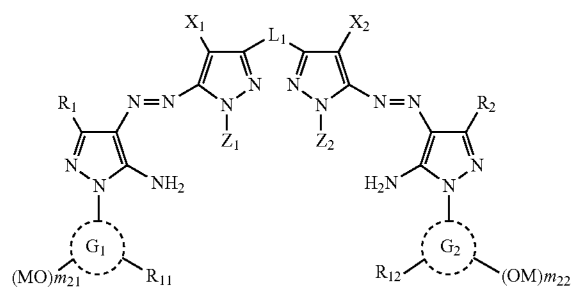

wherein $R_1$, $R_2$, $R_{11}$, $R_{12}$, $X_1$, $X_2$, $Z_1$ and $Z_2$ each represents a monovalent group, $L_1$ represents a divalent linking group, $G_1$ and $G_2$ each independently represents an atomic group necessary to complete a 5- to 8-membered nitrogen-containing heterocycle, M represents a hydrogen or a cation, and $m_{21}$ and $m_{22}$ each independently represents an integer of 0 to 3, provided that formula (Y-2) has at least one ionic hydrophilic group and a counter ion of the ionic hydrophilic group contains a lithium ion;

Formula (Y-3):

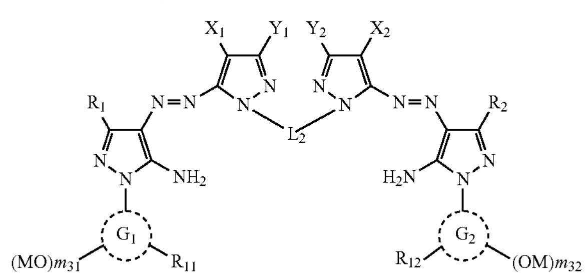

wherein $R_1$, $R_2$, $R_{11}$, $R_{12}$, $X_1$, $X_2$, $Y_1$ and $Y_2$ each represents a monovalent group, $L_2$ represents a divalent linking group, $G_1$ and $G_2$ each independently represents an atomic group necessary to complete a 5- to 8-membered nitrogen-containing heterocycle, M represents a hydrogen or a cation, and $m_{31}$ and $m_{32}$ each independently represents an integer of 0 to 3, provided that formula (Y-3) has at least one ionic hydrophilic group and a counter ion of the ionic hydrophilic group contains a lithium ion;

Formula (Y-4):

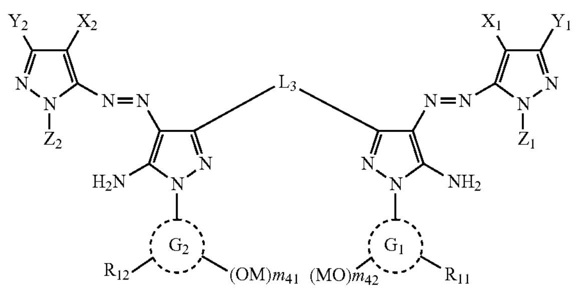

wherein $R_{11}$, $R_{12}$, $X_1$, $X_2$, $Y_1$, $Y_2$, $Z_1$ and $Z_2$ each represents a monovalent group, $L_3$ represents a divalent linking group, $G_1$ and $G_2$ each independently represents an atomic group necessary to complete a 5- to 8-membered nitrogen-containing heterocycle, M represents a hydrogen or a cation, and $m_{41}$ and $m_{42}$ each independently represents an integer of 0 to 3, provided that formula (Y-4) has at least one ionic hydrophilic group and a counter ion of the ionic hydrophilic group contains a lithium ion;

Formula (Y-5):

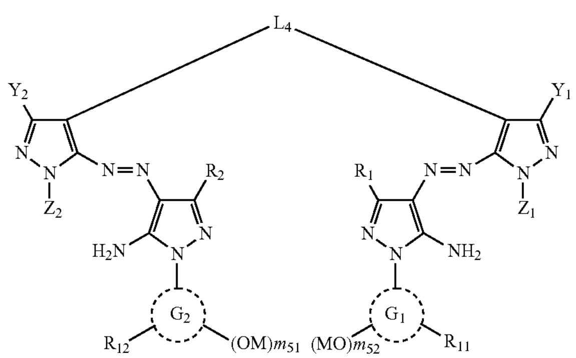

wherein $R_1$, $R_2$, $R_{11}$, $R_{12}$, $Y_1$, $Y_2$, $Z_1$ and $Z_2$ each represents a monovalent group, $L_4$ represents a divalent linking group, $G_1$ and $G_2$ each independently represents an atomic group necessary to complete a 5- to 8-membered nitrogen-containing heterocycle, M represents a hydrogen or a cation, and $m_{51}$ and $m_{52}$ each independently represents an integer of 0 to 3, provided that formula (Y-5) has at least one ionic hydrophilic group and a counter ion of the ionic hydrophilic group contains a lithium ion.

7. The ink set according to claim 6, wherein, in formulae (Y-1), (Y-2), (Y-3), (Y-4) and (Y-5), the nitrogen-containing heterocycle constituted by G, $G_1$ or $G_2$ is an S-triazine ring.

8. The ink set according to claim 6, wherein the compound represented by formula (Y-1) and a salt thereof are a compound represented by the following formula (Y-6) and a salt thereof:

Formula (Y-6):

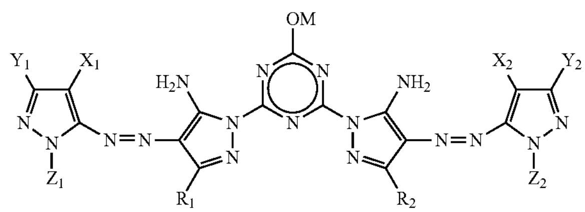

wherein $R_1$, $R_2$, $Y_1$ and $Y_2$ each represents a monovalent group;

$X_1$ and $X_2$ each independently represents an electron-withdrawing group having a Hammett's σp value of 0.20 or more;

$Z_1$ and $Z_2$ each independently represents a hydrogen, a substituted or unsubstituted alkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group; and M represents a hydrogen or a cation, provided that formula (Y-6) has at least one ionic hydrophilic group and a counter ion of the ionic hydrophilic group contains a lithium ion.

9. The ink set according to claim 1, wherein the yellow ink composition further contains, as a colorant, at least one member selected from the group consisting of a compound represented by the following formula (Y-7) and a salt thereof:

Formula (Y-7):

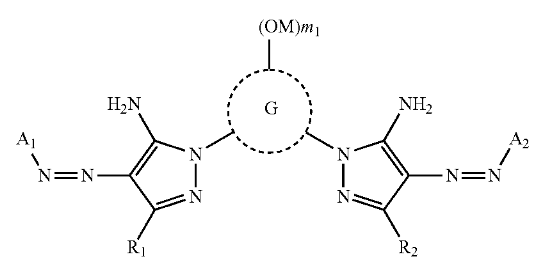

wherein $A_1$ and $A_2$ each represents a substituted or unsubstituted aryl group and/or a substituted or unsubstituted 5- or 6-membered heterocyclic group;

$R_1$ and $R_2$ each represents a monovalent group;

G represents an atomic group necessary to complete a 5- to 8-membered nitrogen-containing heterocycle;

M represents a hydrogen or a cation; and $m_1$ represents an integer of 0 to 3, provided that formula (Y-7) has at least one ionic hydrophilic group and a counter ion of the ionic hydrophilic group contains a lithium ion and that when $A_1$ and $A_2$ each represents a 5-membered heterocyclic group, a pyrazole ring is excluded.

10. The ink set according to claim 9, wherein the compound represented by formula (Y-7) and a salt thereof are a compound represented by the following formula (Y-8) and a salt thereof:

Formula (Y-8):

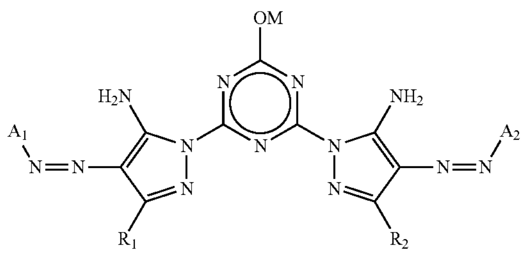

wherein $A_1$, $A_2$, $R_1$, $R_2$ and M have the same meanings as $A_1$, $A_2$, $R_1$, $R_2$ and M in formula (Y-7), provided that formula (Y-8) has at least one ionic hydrophilic group and a counter ion of the ionic hydrophilic group contains a lithium ion and that when $A_1$ and $A_2$ each represents a 5-membered heterocyclic group, a pyrazole ring is excluded.

11. The ink set according to claim 10, wherein the compound represented by formula (Y-8) and a salt thereof are a compound represented by the following formula (Y-9) and a salt thereof:

Formula (Y-9):

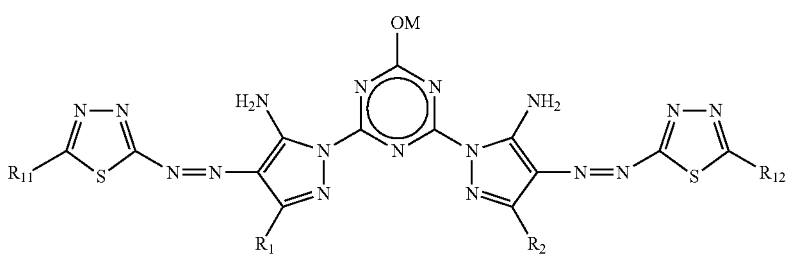

wherein $R_1$, $R_2$, $R_{11}$ and $R_{12}$ each represents a monovalent group; and M represents a hydrogen or a cation, provided that formula (Y-9) has at least one ionic hydrophilic group and a counter ion of the ionic hydrophilic group contains a lithium ion.

12. The ink set according to claim 2, wherein the yellow ink composition further contains, as a colorant, at least one member selected from the group consisting of a compound represented by the following formula (Y-7) and a salt thereof:

Formula (Y-7):

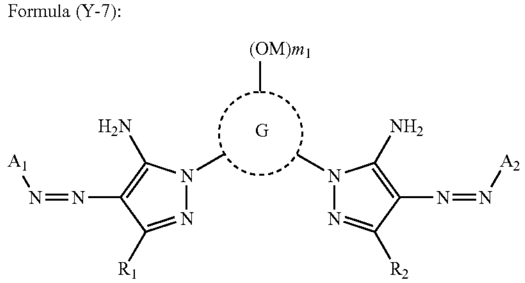

wherein $A_1$ and $A_2$ each represents a substituted or unsubstituted aryl group and/or a substituted or unsubstituted 5- or 6-membered heterocyclic group;

$R_1$ and $R_2$ each represents a monovalent group;

G represents an atomic group necessary to complete a 5- to 8-membered nitrogen-containing heterocycle;

M represents a hydrogen or a cation; and $m_1$ represents an integer of 0 to 3, provided that formula (Y-7) has at least one ionic hydrophilic group and a counter ion of the ionic hydrophilic group contains a lithium ion and that when $A_1$ and $A_2$ each represents a 5-membered heterocyclic group, a pyrazole ring is excluded.

13. The ink set according to claim 12, wherein the compound represented by formula (Y-7) and a salt thereof are a compound represented by the following formula (Y-8) and a salt thereof:

Formula (Y-8):

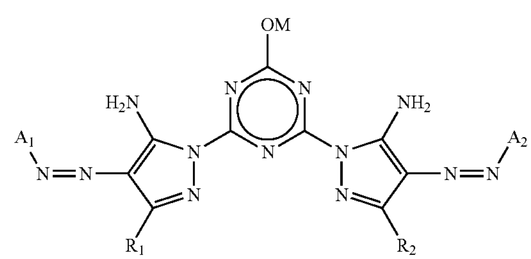

wherein $A_1$, $A_2$, $R_1$, $R_2$ and M have the same meanings as $A_1$, $A_2$, $R_1$, $R_2$ and M in formula (Y-7), provided that formula (Y-8) has at least one ionic hydrophilic group and a counter ion of the ionic hydrophilic group contains a lithium ion and that when $A_1$ and $A_2$ each represents a 5-membered heterocyclic group, a pyrazole ring is excluded.

14. The ink set according to claim 13, wherein the compound represented by formula (Y-8) and a salt thereof are a compound represented by the following formula (Y-9) and a salt thereof:

Formula (Y-9):

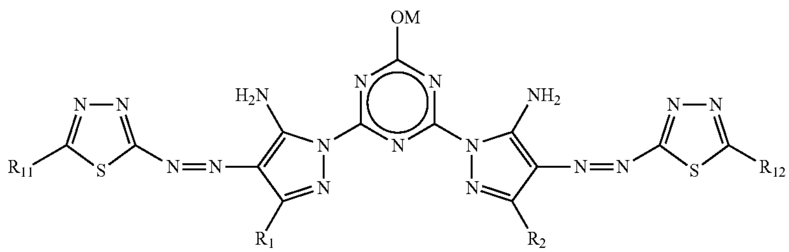

wherein $R_1$, $R_2$, $R_{11}$ and $R_{12}$ each represents a monovalent group; and M represents a hydrogen or a cation, provided that formula (Y-9) has at least one ionic hydrophilic group and a counter ion of the ionic hydrophilic group contains a lithium ion.

15. The ink set according to claim 9, wherein the yellow ink composition contains, as a colorant, at least one member selected from the group consisting of a compound represented by formula (Y-I) and a salt thereof; or contains, as a colorant, at least one member selected from the group consisting of a compound represented by formula (Y-I) and a salt thereof and at least one member selected from the group consisting of a compound represented by formula (Y-7) and a salt thereof; and contains the colorants in a total amount of 1 to 8 wt % based on a total weight of the yellow ink composition.

16. The ink set according to claim 15, wherein a ratio between a concentration (wt %) of at least one colorant selected from the group consisting of a compound represented by formula (Y-I) and a salt thereof and a concentration (wt %) of at least one colorant selected from the group consisting of a compound represented by formula (Y-7) and a salt thereof, contained in the yellow ink composition, is from 4:1 to 10:1.

17. The ink set according to claim 12, wherein the yellow ink composition contains, as a colorant, at least one member selected from the group consisting of a compound represented by formula (Y-I) and a salt thereof; or contains, as a colorant, at least one member selected from the group consisting of a compound represented by formula (Y-I) and a salt thereof and at least one member selected from the group consisting of a compound represented by formula (Y-7) and a salt thereof; and contains the colorants in a total amount of 1 to 8 wt % based on a total weight of the yellow ink composition.

18. The ink set according to claim 17, wherein a ratio between a concentration (wt %) of at least one colorant selected from the group consisting of a compound represented by formula (Y-I) and a salt thereof and a concentration (wt %) of at least one colorant selected from the group consisting of a compound represented by formula (Y-7) and a salt thereof, contained in the yellow ink composition, is from 4:1 to 10:1.

19. An ink cartridge housing integrally or independently the ink set according to claim 1.

20. An inkjet recording method, comprising:

ejecting an ink constituting the ink set according to claim 1, thereby performing recording.

21. The inkjet recording method according to claim 20, wherein an image is formed on an image-receiving material including a support having thereon an ink-receiving layer containing a white inorganic pigment.

22. A recorded material that is recorded with an ink constituting the ink set according to claim 1.

23. An ink cartridge housing integrally or independently the ink set according to claim 2.

24. An inkjet recording method, comprising:

ejecting an ink constituting the ink set according to claim 2, thereby performing recording.

25. The inkjet recording method according to claim 24, wherein an image is formed on an image-receiving material including a support having thereon an ink-receiving layer containing a white inorganic pigment.

26. A recorded material that is recorded with an ink constituting the ink set according to claim 2.

* * * * *